(12) United States Patent
Yoshioka et al.

(10) Patent No.: US 7,379,812 B2
(45) Date of Patent: May 27, 2008

(54) MAP INFORMATION UPDATING APPARATUS AND MAP INFORMATION UPDATING METHOD

(75) Inventors: Mototaka Yoshioka, Osaka (JO); Jun Ozawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/790,400

(22) Filed: Apr. 25, 2007

(65) Prior Publication Data

US 2007/0198184 A1  Aug. 23, 2007

Related U.S. Application Data

(63) Continuation of application No. PCT/JP2006/07129, filed on Apr. 4, 2006.

(30) Foreign Application Priority Data

Apr. 8, 2005 (JP) ............... 2005-112793

(51) Int. Cl.
*G01C 21/00* (2006.01)
*G09B 29/00* (2006.01)
(52) U.S. Cl. ............ 701/208; 701/202; 701/209; 340/995.19
(58) Field of Classification Search ........ 701/200, 701/202, 209, 210, 208, 211; 340/995.1, 340/995.12, 995.19, 995.24
See application file for complete search history.

(56) References Cited

U.S. PATENT DOCUMENTS 6,662,105 B1 * 12/2003 Tada et al. .............. 701/209
6,721,653 B2 * 4/2004 Watanabe et al. ........... 701/208
6,970,786 B2 * 11/2005 Hayama et al. ............ 701/209
6,980,907 B2   12/2005 Umezu et al.
2003/0055558 A1 * 3/2003 Watanabe et al. .......... 701/208
2006/0293845 A1 * 12/2006 Watanabe .................. 701/208

FOREIGN PATENT DOCUMENTS

| JP | 2000-121371 | 4/2000 |
| JP | 2000-205869 | 7/2000 |
| JP | 2002-181576 | 6/2002 |
| JP | 2003-296348 | 10/2003 |
| JP | 2004-295207 | 10/2004 |

* cited by examiner

*Primary Examiner*—Tan Q Nguyen
(74) *Attorney, Agent, or Firm*—Wenderoth, Lind & Ponack, LLP

(57) ABSTRACT

Provided is a map information updating apparatus which can automatically select map information optimal for the user from among plural map information, and update an original map using the selected map information. The map information updating apparatus includes: a map information storage unit which stores map information; a position information detecting unit which detects a current position; a movement history storage unit which stores a series of detected positions as movement histories; a map information selecting unit which selects one of a first update map information providing unit and a second update map information providing unit; a map information updating unit which obtains update map information from the selected providing unit; an update map information storage unit which stores the obtained update map information; and a combining/displaying unit which combines the map information stored in the map information storage unit and the update map information stored in the updated map information storage unit, and displays the combined map information.

20 Claims, 90 Drawing Sheets

FIG. 3

| Date and time | East longitude | North latitude |
|---|---|---|
| May 10, 2004(Sun), 8:10 | 135' 20" 35 | 34' 44" 35 |
| May 10, 2004(Sun), 8:10 | 135' 20" 36 | 34' 44" 35 |
| May 10, 2004(Sun), 8:10 | 135' 20" 38 | 34' 44" 35 |
| May 10, 2004(Sun), 8:10 | 135' 20" 40 | 34' 44" 36 |
| May 10, 2004(Sun), 8:10 | 135' 20" 44 | 34' 44" 37 |
| May 10, 2004(Sun), 8:10 | 135' 20" 48 | 34' 44" 39 |
| May 10, 2004(Sun), 8:10 | 135' 20" 49 | 34' 44" 39 |
| May 10, 2004(Sun), 8:10 | : | : |
| May 10, 2004(Sun), 8:10 | 135' 19" 48 | 34' 42" 38 |
| May 10, 2004(Sun), 19:10 | 135' 22" 16 | 34' 44" 78 |

FIG. 8

| Movement history ID | Date and time | Destination |
|---|---|---|
| 001 | May 10, 2004(Sun), 10:00 | L51 (Maruyama golf course) |
| 002 | May 17, 2004(Sun), 10:11 | L51 (Maruyama golf course) |
| 003 | May 24, 2004(Sun), 10:20 | L51 (Maruyama golf course) |
| 004 | May 31, 2004(Sun), 10:20 | L51 (Maruyama golf course) |
| .. | .. | .. |

FIG. 20A
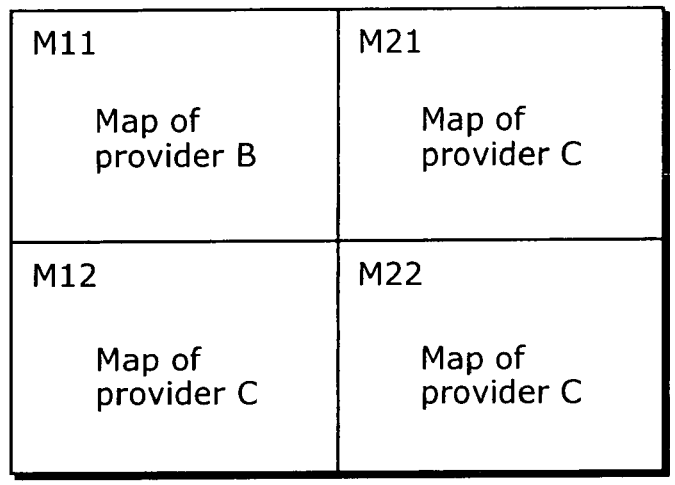
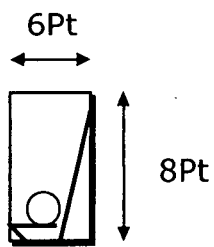
Icon of landmark of facility related to golfing on map of provider B
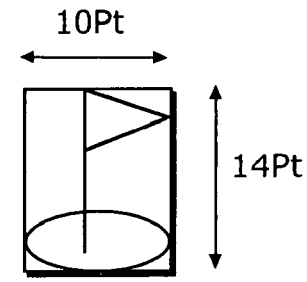
Icon of landmark of facility related to golfing on map of provider C
FIG. 20B
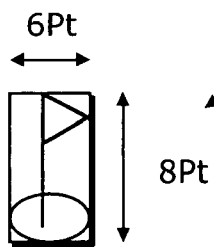
Reduce icon
Icon of landmark modified to size of landmark of provider B

FIG. 35

| Movement history ID | Date and time | Departure point | Destination | Route | | | | | | |
|---|---|---|---|---|---|---|---|---|---|---|
| | | | | L11 | L12 | ... | L30 | L31 | L32 |
| 001 | September 20, 2004 | N100 (Home) | N81 (ABC firm) | Narrow road | Narrow road | ... | Narrow road | National highway | National highway |
| 002 | September 27, 2004 | N100 (Home) | N81 (ABC firm) | L11 Narrow road | ... | ... | ... | ... | ... |
| 003 | September 28, 2004 | N100 (Home) | N81 (ABC firm) | L11 Narrow road | ... | ... | ... | ... | ... |
| 004 | October 8, 2004 | N100 (Home) | N81 (ABC firm) | L11 Narrow road | ... | ... | ... | ... | ... |
| ... | ... | ... | ... | ... | ... | ... | ... | ... | ... |

FIG. 48

| Movement history ID | Date and time | Departure point(Time) | Destination (Time) | Required time | Route | | |
|---|---|---|---|---|---|---|---|
| 001 | September 20, 2004 | Home (7:10) | Office (7:42) | 32 minutes | L099 | L105 | ⋮ |
| 002 | September 20, 2004 | Office (19:20) | Home (20:12) | 52 minutes | ⋮ | ⋮ | ⋮ |
| 003 | September 21, 2004 | Home (11:18) | Supermarket (11:32) | 14 minutes | ⋮ | ⋮ | ⋮ |
| 004 | September 21, 2004 | Supermarket (13:15) | Restaurant A (13:38) | 23 minutes | ⋮ | ⋮ | ⋮ |
| 005 | September 21, 2004 | Restaurant A (14:15) | Home (14:27) | 12 minutes | ⋮ | ⋮ | ⋮ |
| 006 | September 24, 2004 | Home (6:31) | Maruyama golf course(8:12) | 101 minutes | L099 | L105 | ⋮ |
| 007 | September 24, 2004 | Maruyama golf course(16:42) | Home (18:15) | 93 minutes | L501 | L301 | ⋮ |
| ⋮ | ⋮ | ⋮ | ⋮ | ⋮ | ⋮ | ⋮ | ⋮ |

FIG. 49

| Movement history | Departure point | Destination | Required time | Passing route | | | | | |
|---|---|---|---|---|---|---|---|---|---|
| First map | Home | Maruyama golf course | 101 minutes | L099 | L105 | L104 | L300 | L301 | L501 |
| Second map | Home | Maruyama golf course | 105 minutes | L099 | L105 | L104 | L300 | L301 | L501 |
| Third map | Home | Maruyama golf course | 85 minutes | L099 | L102 | L299 | L300 | L301 | L501 |
| Fourth map | Home | Maruyama golf course | 99 minutes | L099 | L105 | L104 | L300 | L301 | L501 |
| | Home | Maruyama golf course | 90 minutes | L099 | L102 | L299 | L300 | L301 | L501 |

FIG. 52

| Map type | Point | | Reading of intersection | Map updated date and time |
|---|---|---|---|---|
| | Latitude | Longitude | | |
| First map information | 34' 44" 35 | 135' 20" 35 | Azuma Kousaten | Oct. 2004 |
| Second map information | 34' 44" 35 | 135' 20" 35 | Higashi Kousaten | Aug. 2003 |
| Third map information | 34' 44" 35 | 135' 20" 35 | Azuma Kousaten | Sep. 2003 |
| Fourth map information | 34' 44" 35 | 135' 20" 35 | Azuma Kousaten | Jan. 2004 |

FIG. 54

| Movement history ID | Date and time | Departure point | Destination |
|---|---|---|---|
| 001 | September 20, 2003(Sun) | L100(Home) 6:45 | L51(Maruyama golf course) 8:50 |
| 002 | September 20, 2003(Sun) | L51(Maruyama golf course) 16:45 | L100(Home) 19:05 |
| 003 | September 21, 2003(Mon) | L100(Home) 7:10 | L61(Office) 7:55 |
| .. | .. | .. | .. |
| 021 | October 27, 2003(Sun) | L100(Home) 6:40 | L51(Maruyama golf course) 8:40 |
| .. | .. | .. | .. |
| 025 | October 28, 2003(Mon) | L100(Home) 19:15 | L71(Daiei A) 19:30 |
| .. | .. | .. | .. |
| 031 | November 8, 2003(Mon) | L100(Home) 19:20 | L72(Yokado A) 19:33 |
| .. | .. | .. | .. |

FIG. 56

|  | Point ID | Stay frequency | Average period of stay | Primary base point |
|---|---|---|---|---|
| 001 | Home (N100) | 320 | 16 hours 20 minutes | Yes |
| 002 | Office (N61) | 189 | 12 hours 20 minutes | Yes |
| : | : | : | : | : |

FIG. 57

| Movement history ID | Date and time | Departure point | Destination |
|---|---|---|---|
| 001 | September 20, 2003(Sun) | L100(Home) | L51(Maruyama golf course) |
| | | 6:45 | 8:50 |
| 003 | September 21, 2003(Mon) | L100(Home) | L61(Office) |
| | | 7:10 | 7:55 |
| 021 | October 27, 2003(Sun) | L100(Home) | L51(Maruyama golf course) |
| | | 6:40 | 8:40 |
| 025 | October 28, 2003(Mon) | L100(Home) | L71(Daiei A) |
| | | 19:15 | 19:30 |
| 031 | November 8, 2003(Mon) | L100(Home) | L72(Yokado A) |
| | | 19:20 | 19:33 |
| ‥ | | ‥ | ‥ |

FIG. 61

| Base point | Destination category | Expected range |
|---|---|---|
| Home | Golf facility | 20km |
| | Movie theater | 10km |
| | Supermarket | 5km |
| | Bookstore | 5km |
| | ... | ... |

FIG. 70

| Base point | Destination category | Expected range |
|---|---|---|
| Home | .. | .. |
| Office | Restaurant | 7km |
| | Supermarket | 3km |
| | .. | .. |

FIG. 77
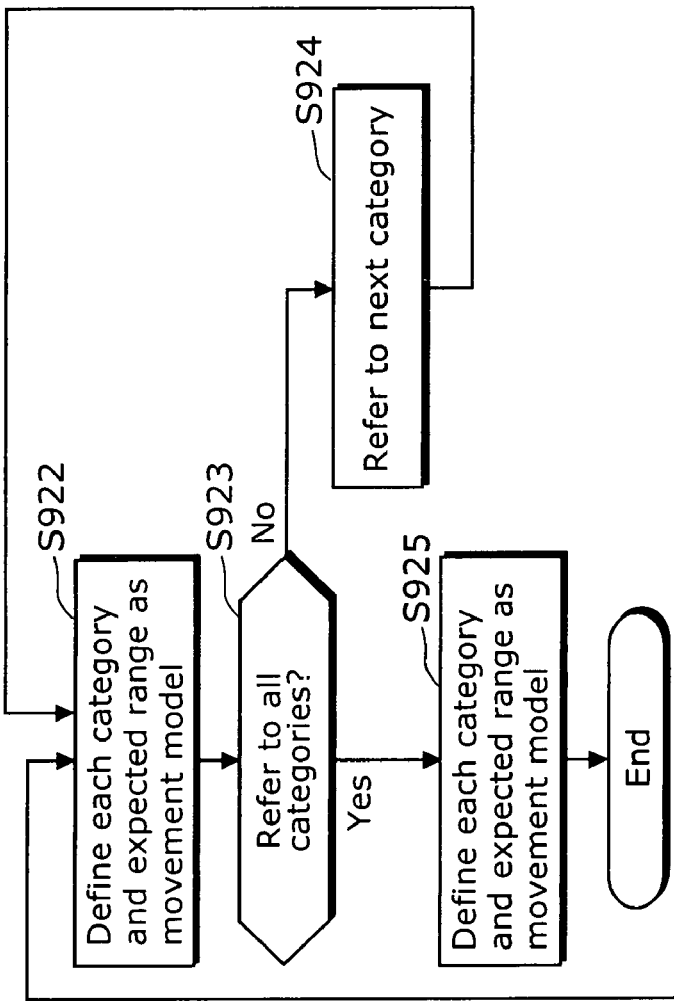
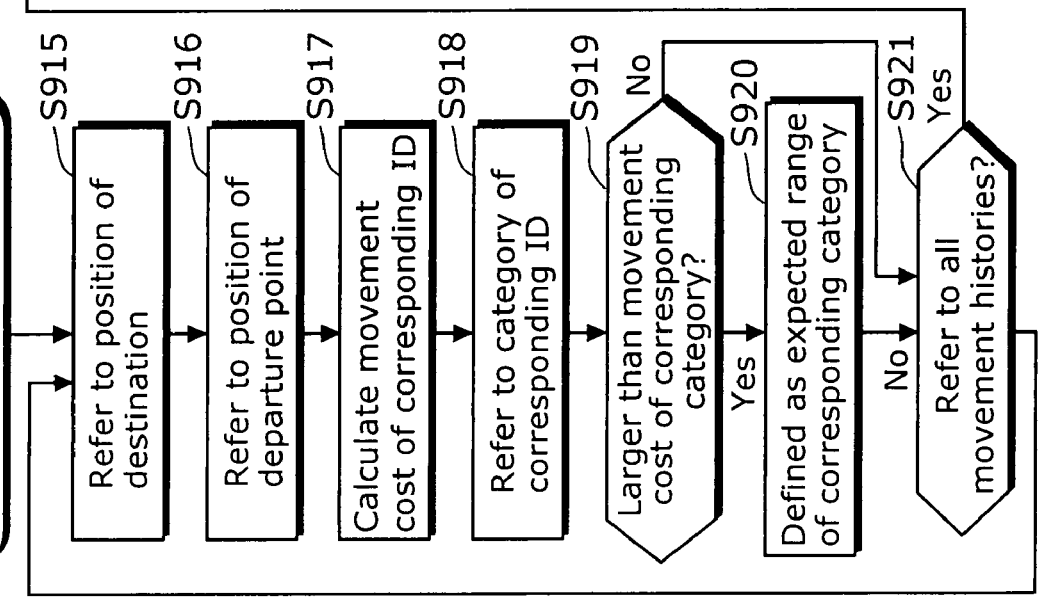

FIG. 81

| Movement area | Destination category | Expected range |
|---|---|---|
| Weekday area | Restaurant | Weekday area |
| Holiday area | Movie theater | Holiday area |
| | Department store | Holiday area |
| | .. | .. |

FIG. 87

| Identical category | Common category |
|---|---|
| Golf facility | Golf course |
| ⋮ | ⋮ |
| Conv. | Convenience store |
| ⋮ | ⋮ |

FIG. 88

| ID | Position | Name | Category |
|---|---|---|---|
| 051 | East longitude 135. 00<br>North latitude 34. 00 | Maruyama<br>golf course | Golf facility |
| 052 | East longitude 135. 01<br>North latitude 34. 01 | Rooson<br>Shirayama | Conv. |
| 053 | East longitude 135. 24<br>North latitude 34. 08 | Sakura<br>golf course | Golf facility |
| 054 | East longitude 135. 17<br>North latitude 34. 21 | Aoki<br>golf course | Golf facility |
| 055 | East longitude 135. 28<br>North latitude 34. 22 | Ozaki<br>golf course | Golf facility |
| 056 | East longitude 135. 31<br>North latitude 34. 42 | Ozaki<br>golf course | Golf facility |
| : | ... | | |

| Category | Location |
|---|---|
| Golf facility | 5 locations |
| Conv. | 1 location |
| Spa | X location |
| ... | ... |

FIG. 89

| ID | Position | Name | Category |
|---|---|---|---|
| 101 | East longitude 135. 00 North latitude 34. 00 | Maruyama golf course | Golf course |
| 102 | East longitude 135. 01 North latitude 34. 01 | Rooson Shirayama | Convenience store |
| 103 | East longitude 135. 42 North latitude 34. 21 | Family K | Convenience store |
| 104 | East longitude 135. 25 North latitude 34. 06 | Thanks mart | Convenience store |
| 105 | East longitude 135. 28 North latitude 34. 22 | Ozaki golf course | Golf course |
| : | ... | | |

| Category | Frequency |
|---|---|
| Golf course | 2 locations |
| Convenience store | 3 locations |
| Spa | X location |
| ... | ... |

MAP INFORMATION UPDATING APPARATUS AND MAP INFORMATION UPDATING METHOD

CROSS REFERENCE TO RELATED APPLICATION

This is a continuation application of PCT application No. PCT/JP2006/07129 filed Apr. 4, 2006, designating the United States of America.

BACKGROUND OF THE INVENTION (1) Field of the Invention

The present invention relates to a map information updating apparatus which updates map information which has been stored within the apparatus itself, and particularly to a map information updating apparatus which updates map information by receiving plural different types of update map information.

(2) Description of the Related Art

In recent years, the updating of map information which has been stored in car navigation systems and the like via communication networks and recording media becomes possible, and is being implemented. By updating the map information, without newly purchasing a car navigation system itself, the user can obtain latest information, such as information in which a new road has been added. On the other hand, map information is made up of a large volume of data. Since the cost for communicating such map information is quite high, a technique which partially updates a map has been suggested (for example, refer to Japanese Laid-Open Patent Application No. 2000-121371, which is referred to as Patent Reference 1 hereinafter).

FIG. 1 is a system block diagram of an apparatus disclosed in Patent Reference 1. A vehicle position detecting unit 18 detects a position of a vehicle and stores it as a history of the position in a storage device 20. In order to update only an area map with the histories of the positions, a use range storage processing unit 26 calculates an update map, a sending/receiving unit 24 obtains the update map, and a map update processing unit 22 performs update processing with the update map. With this, only the area map with the histories is updated, and thus, the communication cost is reduced.

However, the apparatus disclosed in Patent Reference 1 partially updates map information, and it is assumed that only a single type of map is provided for the apparatus. Thus, when there are plural maps to be provided for the apparatus, such maps can be no longer applied.

In other words, from now on, with expansion of services which provide map information, the type of map information to be provided is not limited to a single map information type, and it is necessary to select update map information from among plural different types of map information to be provided so as to update map information using the selected map information, depending on uses and preferences of the user.

Thus, the object of the present invention is to provide a map information updating apparatus and the like which can automatically select optimal map information for the user from among plural map information and update map information with the selected map information, based on the information obtained from the movement histories of the user.

SUMMARY OF THE INVENTION

In order to achieve the aforementioned object, the map information updating apparatus according to the present invention is a map information updating apparatus which is connected to plural map information providing devices that provide plural different types of update map information, and which updates map information stored within the apparatus itself, and the map information updating apparatus includes: a map information storage unit which stores map information; a position detecting unit that detects a current position; a movement history storage unit which stores, as movement histories, a series of positions detected by the position detecting unit; a map information selecting/updating unit that selects one of the plural update map information based on the movement histories stored in the movement history storage unit, and obtains the selected update map information from the corresponding map information providing device; an update map information storage unit which stores the update map information obtained by the map information selecting/updating unit; and a combining/displaying unit that combines the map information with the update map information and displays the combined map information so as to display a geographic area with the corresponding update map information from among the geographic areas each having the map information stored in the map information storage unit.

With the present invention, based on the information obtained from the movement histories, optimal map information for the user can be automatically selected and obtained among plural map information for updating the map information, and the original map information is updated.

With this, since the map information updating apparatus which applies services of providing various types of map information is realized, the practical value of the present invention is high today when mobile communication and car navigation systems are becoming widely available.

FURTHER INFORMATION ABOUT TECHNICAL BACKGROUND TO THIS APPLICATION

The disclosure of Japanese Patent Application No. 2005/112793 filed on Apr. 8, 2005 including specification, drawings and claims is incorporated herein by reference in its entirety.

The disclosure of PCT application No. PCT/JP2006/307129 filed, Apr. 4, 2006, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 is a diagram showing an example of position information.

FIG. 8 is a diagram describing an example of movement histories of the user.

FIGS. 20A and 20B are diagrams showing other examples of updating map information (icons and fonts).

FIG. 35 is a diagram showing an example of the movement histories stored in the movement history storage unit.

FIG. 48 is a diagram showing an example of movement histories.

FIG. 49 is a diagram showing the result of route searching according to each map information.

FIG. 52 is a diagram showing the result of each map information.

FIG. 54 is a diagram showing an example of movement histories.

FIG. 56 is a diagram showing a calculation example of primary base points.

FIG. 57 is a diagram showing destinations for each primary base point.

FIG. 61 is a diagram showing an example of calculated movement models.

FIG. 70 is a diagram showing another example of movement models.

FIG. 77 is a flowchart showing the operation of the mobile terminal (calculation of movement models).

FIG. 81 is a diagram showing an example of movement models.

FIG. 87 is a diagram showing an example of category information rule.

FIG. 88 is a diagram describing an operation of the category density calculating unit on the first map.

FIG. 89 is a diagram describing an operation of the category density calculating unit on the second map.

DESCRIPTION OF THE PREFERRED EMBODIMENTS

Figure 1:
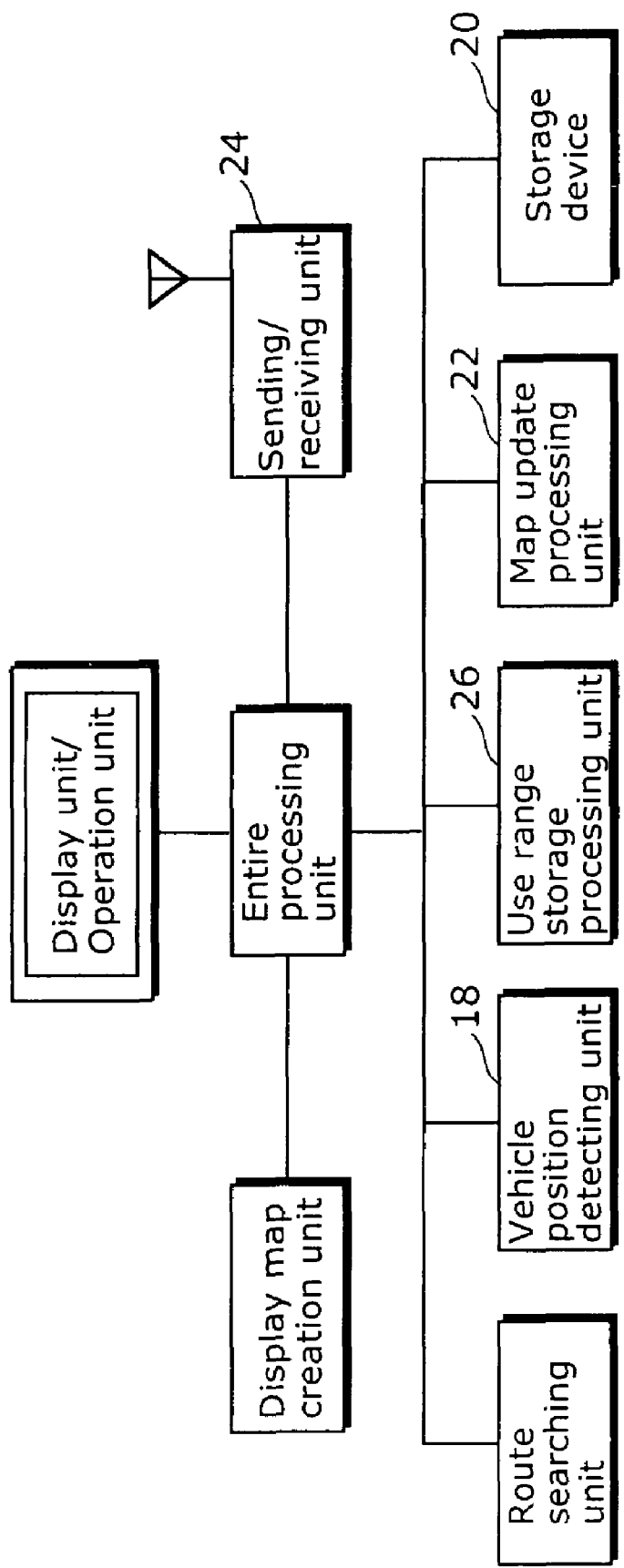
FIG. 1 is a block diagram showing the configuration of a conventional map information updating apparatus.

The map information updating apparatus according to the present invention is a map information updating apparatus which is connected to plural map information providing devices that provide plural different types of update map information, and which updates map information stored within the apparatus itself, and the map information updating apparatus includes: a map information storage unit which stores map information; a position detecting unit that detects a current position; a movement history storage unit which stores, as movement histories, a series of positions detected by the position detecting unit; a map information selecting/updating unit that selects one of the plural update map information based on the movement histories stored in the movement history storage unit, and obtains the selected update map information from the corresponding map information providing device; an update map information storage unit which stores the update map information obtained by the map information selecting/updating unit; and a combining/displaying unit that combines the map information with the update map information and displays the combined map information so as to display a geographic area with the corresponding update map information from among the geographic areas each having the map information stored in the map information storage unit. With this, the type of update map information corresponding to the movement history of the user among plural different types of update map information is automatically selected and used to update original map information.

Here, as a more specific first example, it is possible that: the map information stored in the map information storage unit includes landmark information regarding a landmark; the map information updating apparatus further includes a landmark information extracting unit that extracts, from the movement histories stored in the movement history storage unit and the plural map information stored in the map information storage unit, the landmark information in the map information corresponding to the destination in the movement histories; and the map information selecting/updating unit selects the update map information based on the landmark information extracted by the landmark information extracting unit. For example, the landmark information includes category information indicating a type of the landmark, and the map information selecting/updating unit can select a type of update map information which belongs to a category indicated by the category information included in the landmark information extracted by the landmark information extracting unit. With this, among plural different types of update map information, the type of update map information corresponding to the category of the destination to which the user frequently travels, in other words, the type of update map information corresponding to the preference of the user is automatically selected.

Furthermore, as a more specific second example, it is possible that: the map information stored in the map information storage unit includes route information indicating a type of a route; the map information updating apparatus further includes a route information extracting unit that extracts the route information of the map information corresponding to the route included in the movement history based on the movement histories stored in the movement history storage unit and the plural map information stored in the map information storage unit; and the map information selecting/updating unit selects the update map information based on the type of the route indicated by the route information extracted by the route information extracting unit. For example, the types of the routes include a type referred to as "narrow road", and the map information selecting/updating unit can select update map information including detailed information regarding "narrow road" when the type of the route indicated by the route information extracted by the route information extracting unit is the type referred to as "narrow road". With this, among plural different types of update map information, the update map information that matches the type of the route according to the movement histories of the user is automatically selected.

Furthermore, as a more specific third example, it is possible that: the plural map information providing devices respectively include a searching/outputting unit that searches for an optimal route which connects a departure point to a destination, and outputs the searched result; the map information updating apparatus further includes a route searching requesting unit that requests the plural map information providing devices respectively to search for the route which connects the departure point to the destination which are stored as the movement history stored in the movement history storage unit, and a route comparing unit that compares, with the requested route stored in the movement history, the route outputted each from the map information providing device in response to the request issued by the route searching requesting unit; and the map information selecting/updating unit selects update map information provided by the corresponding map information providing device which outputs a route nearest to the requested route stored as the movement history, based on the comparison result obtained by the route comparing unit. In this case, the plural map information providing devices further include a calculating/outputting unit that calculates time required to travel along the route obtained by the search and that outputs the calculated result, wherein it is possible that: the route comparing unit compares the required time outputted from each of the plural map information providing devices with the required time stored in the movement history; and the map information selecting/updating unit outputs a route nearest to the route stored in the movement history based on a comparison result obtained by the route comparing unit, and selects the update map information provided by the map information providing device which outputs required time closest to the required time in the movement history, and it is preferable that the route searching requesting unit requests the plural map information providing devices respectively to search for a route which connects the departure point to the destination which are stored as the movement history in which movement time is the longest among the movement histories stored in the movement history storage unit. With this, among plural different types of update map information, the update map information which performs route searching that matches the movement histories of the user is automatically selected.

Note that it is possible that the update map information includes audio name information regarding a name of a route and a point, and the map information selecting/updating unit further selects the update map information based on the audio name information included in the update map information.

In the case where the type of map information which is different from the type of the map information currently being used has been obtained and the map information has been partially updated with the selected map information, when the update map information is combined with the current map information and the combined information is displayed, there are cases where the combined map information becomes inconsistent with the original map information. For example, when icons of landmarks on the map currently being used are different from those on the updated map, the user is confused about the difference.

Thus, the object of the present invention is to provide a map information updating apparatus which can display update map information in a format which matches the format of the map information which has been already obtained, even when the original map information has been updated with different types of map information.

In order to achieve such object, the combining/displaying unit absorbs various differences between the map information stored in the map information storage unit and the update map information, for example, the differences in: the joint portion between plural information; the size of landmarks; the font size of the landmark information; the background colors; and the scales, and combines the update map information with the original map information so as to display the combined map.

More specifically, in order to match and combine the original map information and the update map information for displaying the combined map, it is preferable that the combining/displaying unit combines the update map information into the original map information and displays the combined map: so as to make, minimal, position displacement in the joint portion between a route included in the map information stored in the map information storage unit and a corresponding route included in the update map information; so as to display the landmarks included in the map information stored in the map information storage unit and the landmarks included in the update map information with the same size of icons by adjusting the size of the icons of either of the landmarks; so as to display the landmark information included in the map information stored in the map information storage unit and the landmark information included in the update map information with the same size of font by adjusting the size of the font in either of the landmark information; so as to display the map information stored in the map information storage unit and the update map information with the same background color by adjusting the background color of the update map information; and so as to display the map information stored in the map information storage unit and the update map information on the same scale by adjusting the scale of the update map information. With this, the combined map is displayed in a state where the original map information and the update map information matches without causing any uncomfortable feeling for the user.

Furthermore, it is possible that the map information selecting/updating unit selects the update map information according to a ratio of an area displaying the map information to a whole display area, the map information being stored in said map information storage unit and the whole display area being displayed by said combining/displaying unit. More specifically, it is possible that the map information selecting/updating unit selects the same type of update map information as the update map information, the update information being previously used for updating the vicinity of an area to be updated on a map. With this, it is possible to display the combined map having consistency and uniformity.

Furthermore, as a more specific fourth example, the map information updating apparatus according to Claim 1, further includes a movement model calculating unit that calculates an movement model indicating a characteristic of movement of a user based on the movement histories stored in the movement history storage unit, wherein the map information selecting/updating unit selects update map information corresponding to the movement model calculated by the movement model calculating unit, and obtains the selected update map information from the corresponding map information providing device. With this, the map is updated in a mode which matches the movement characteristics of the user, which improves the convenience for the user.

Here, as a more specific example of the movement model, the movement model calculating unit calculates, as the movement models, movement areas of the user for each category of destinations to which the user move, based on the movement histories stored in the movement history storage unit, and the map information selecting/updating unit selects map information as the update map information, the map information being map information regarding the movement area indicated by the movement model calculated by the movement model calculating unit and the map information detailing the category. With this, the map is updated for each movement area of the user to the map detailing the categories of the facilities to which the user frequently travels, which enables the user to achieve updating of a map corresponding to the movement characteristics of the user.

Hereinafter, the map information updating apparatus according to the present invention is specifically described with reference to the diagrams.

First Embodiment

Figure 2:
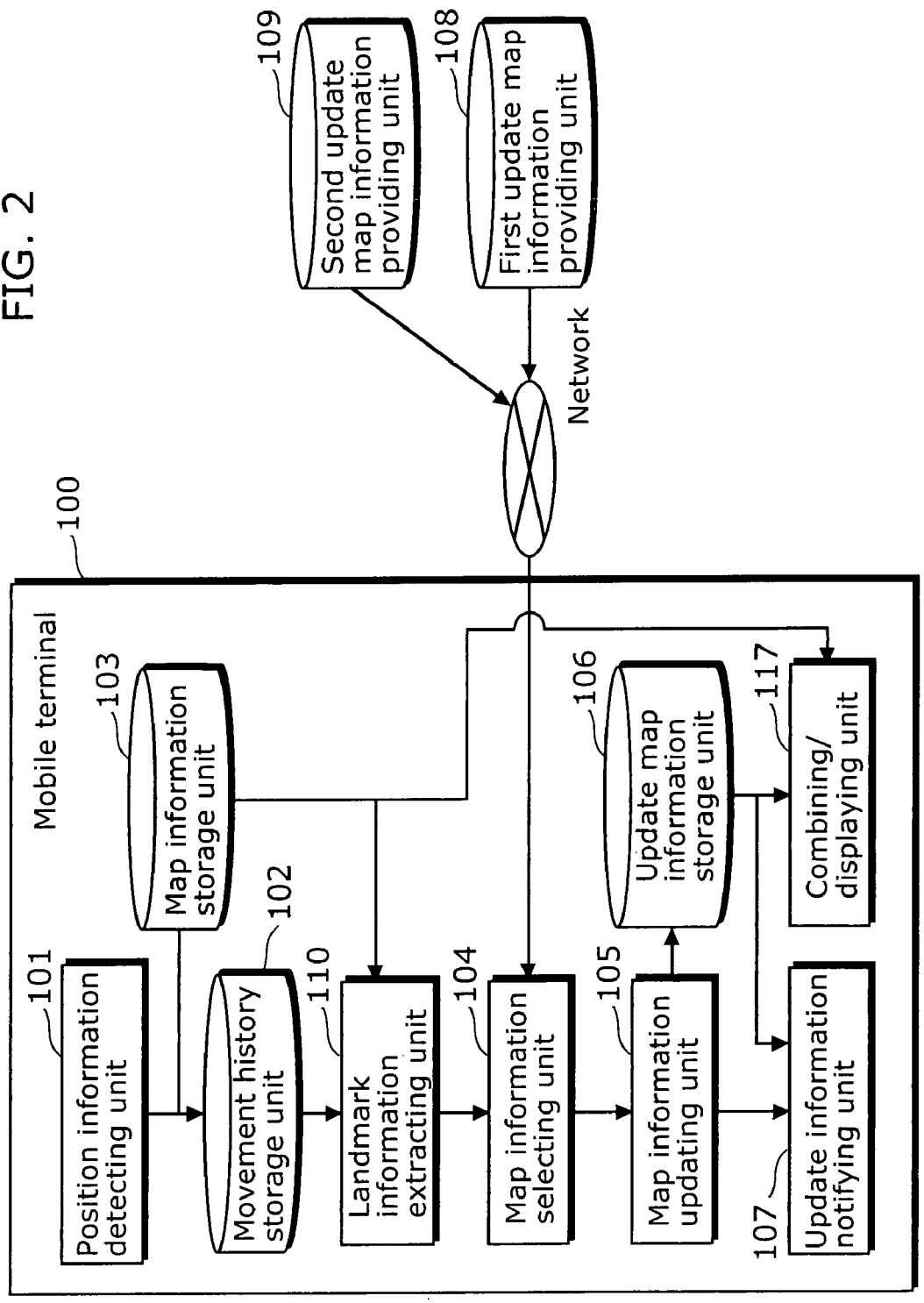
FIG. 2 is a diagram showing the configuration of the mobile terminal according to the first embodiment of the present invention.

FIG. 2 is a functional block diagram showing the configuration of a mobile terminal 100 according to the first embodiment of the present invention. This mobile terminal 100 is a mobile terminal as an example of a map information updating apparatus according to the present invention, such as a car navigation system and the like, and is a map information updating apparatus which selects and obtains plural map information which are provided via communication networks, and updates the previously stored map using the obtained map information. This apparatus includes a position information detecting unit 101, a movement history storage unit 102, a map information storage unit 103, a map information selecting unit 104, a map information updating unit 105, an update map information storage unit 106, an update information notifying unit 107, a landmark information extracting unit 110, and a combining/displaying unit 117. Note that a first update map information providing unit 108 and a second update map information providing unit 109 which are connected to this mobile terminal 100 via communication networks are shown in the diagram.

The position information detecting unit 101 is a sensor and the like which detects a current position of the mobile terminal 100. For example, it is a GPS antenna installed in a mobile terminal, and detects latitude/longitude information of the user. FIG. 3 is a diagram showing an example of position information detected by the position information detecting unit 101. Here, the position information, such as a point of longitude 135 degrees 20 minutes 35 seconds east and latitude 34 degrees 44 minutes 35 seconds north on May 10, 2004, 8:10, is detected. Note that date and time information may be simultaneously detected by providing a time obtained from a GPS receiver or setting a calendar clock and the like, when the position information is detected.

Figure 4:
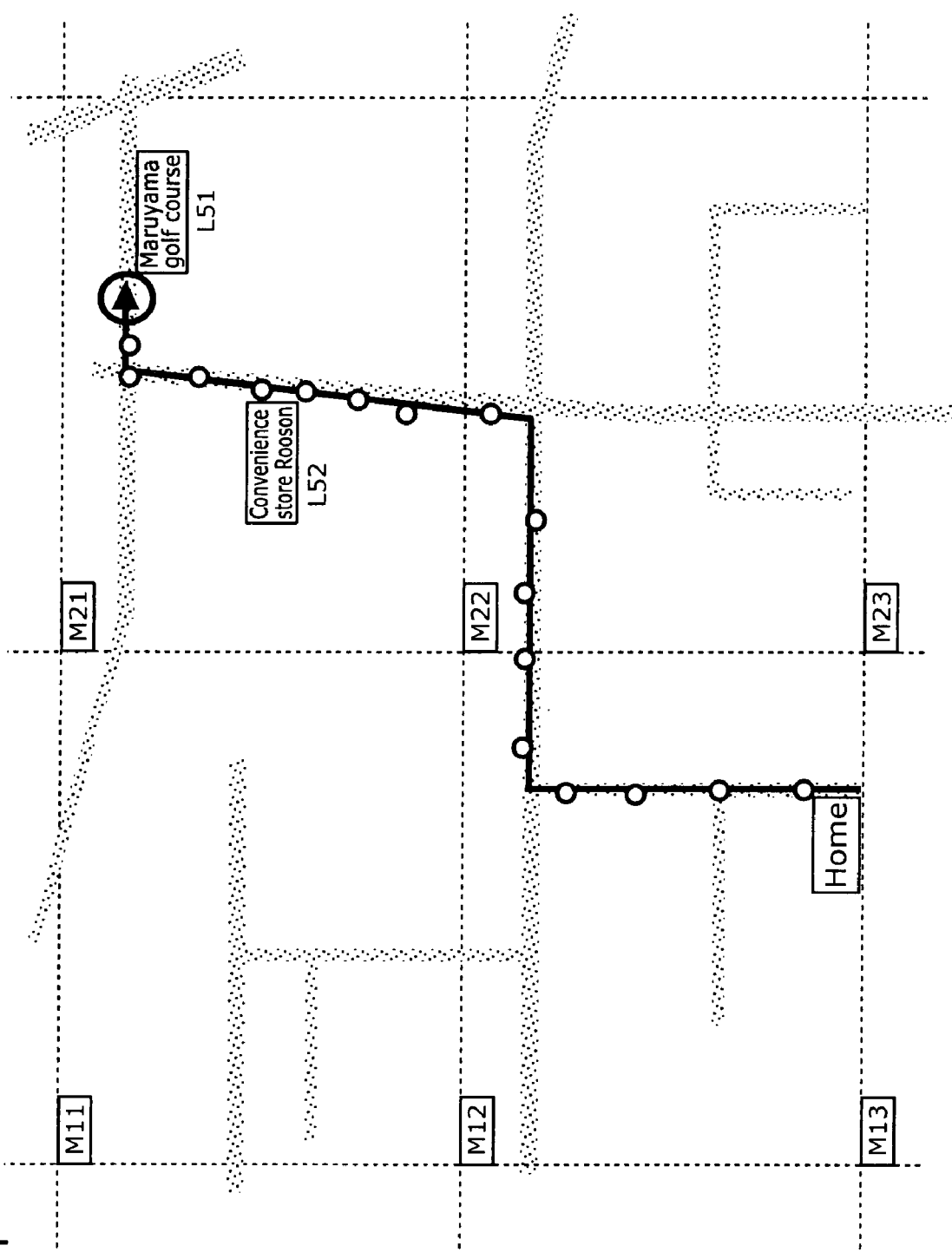
FIG. 4 is a diagram showing an example of map information.

FIG. 4 is a map showing an example of position information and a current position of the user detected by the position information detecting unit 101. The detected position information is indicated by white circles, the current position of the user is indicated by an arrow, and furthermore, a destination "Maruyama golf course" and a route to the destination are indicated by a black line.

The map information storage unit 103 is a hard disk and the like which stores map information in advance. As shown in FIG. 4, the map information is used, for example, for displaying, on a display screen of a car navigation system, the position of the user detected by the position information detecting unit 101 or for using the navigation system which guides routes to the destination. The map information is divided into predetermined mesh areas as shown in FIG. 4. For example, in the present embodiment, the map information is divided by mesh IDs, such as "M11" and "M12". Furthermore, the map information is stored in layers of information including landmark information present in the area, route information indicating network configuration of intersections and routes, or image information, such as a background.

Figure 5:
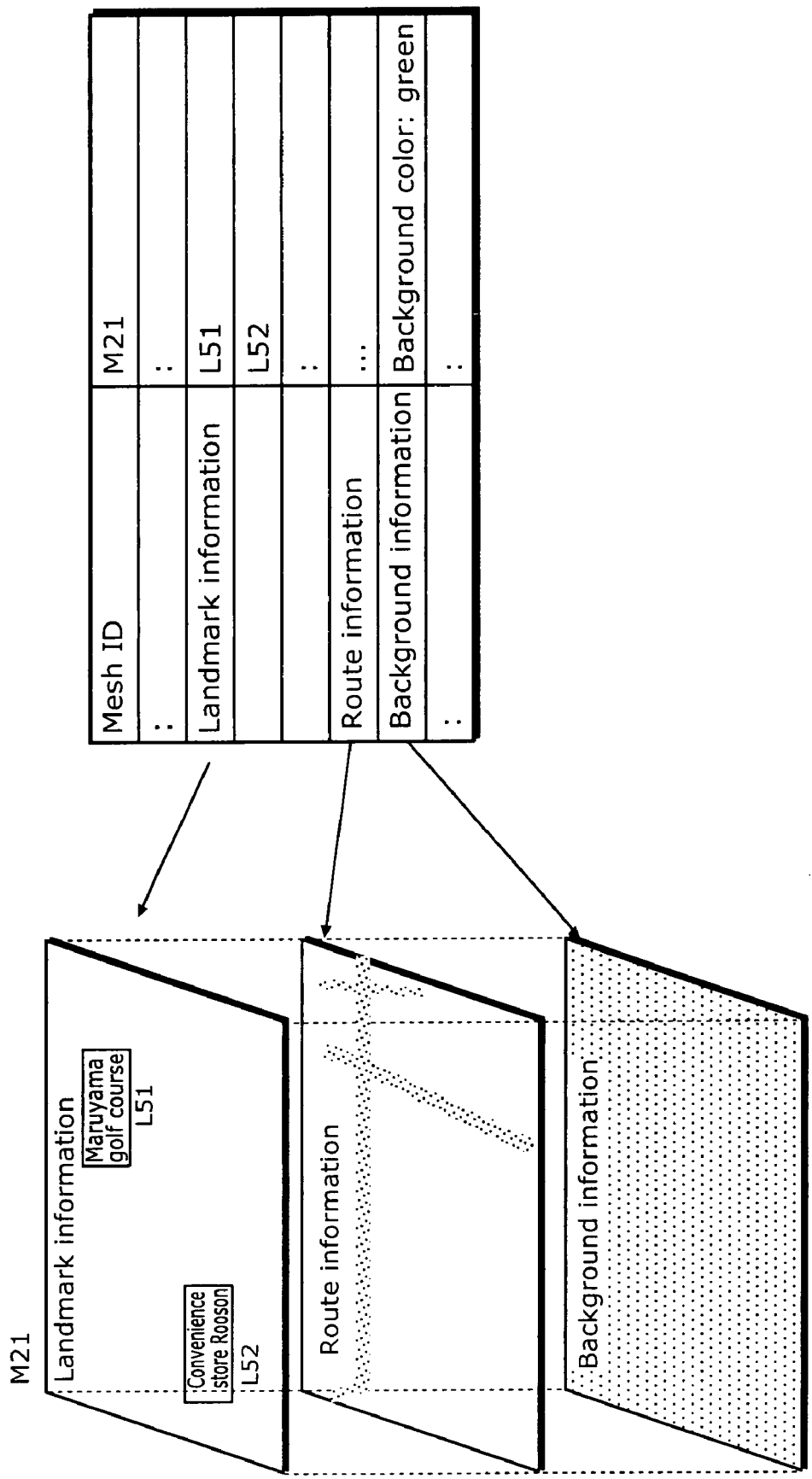
FIG. 5 is a diagram showing an example of map information made up of layers.
Figure 6:
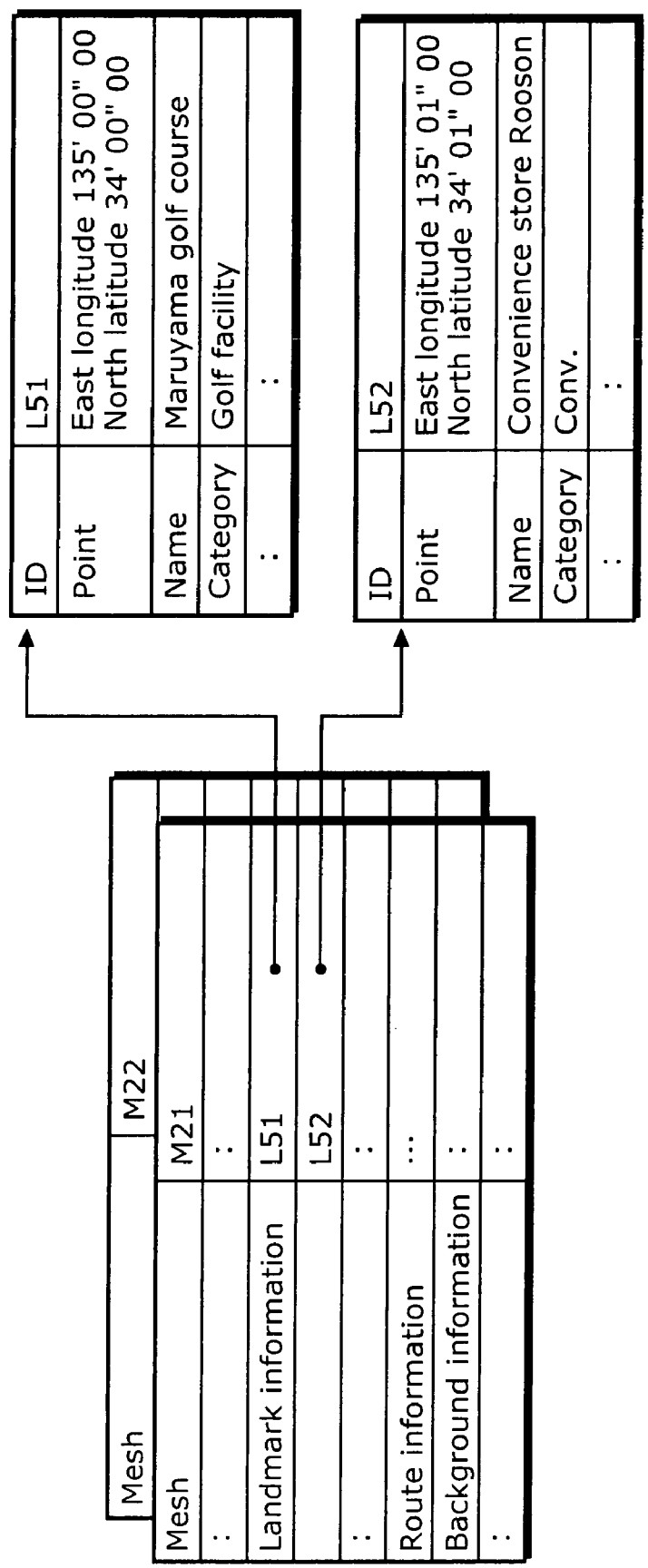
FIG. 6 is a diagram showing an example of landmark information.

FIG. 5 is a diagram showing an example of detailed information of a mesh ID "M21" shown in FIG. 4. The map information is made up of layers of information, such as landmark information, route information, and background information, and for example, the landmark information, such as "L51" and "L52" in the mesh ID "M21" are stored. Furthermore, road network information is stored as the route information. Furthermore, background colors, such as "green", is stored as the background information. FIG. 6 is a diagram showing more detailed information of the landmark information. The landmark ID "L51" is "Maruyama golf course", and node information is listed (indicated by an arrow) and stored, such as a point of longitude 135 degrees 00 minutes 00 seconds east and latitude 34 degrees 00 minutes 00 seconds north and a category "golf facility".

The movement history storage unit 102 is a memory and the like which stores the movement histories of the user. In the present embodiment, the position information detecting unit 101 extracts the destination of the user based on the detected position information and the map information stored in the map information storage unit 103, and stores a series of position information in the movement history storage unit 102 as the movement histories. For extracting the destination, for example, a landmark located in the vicinity of the point where the engine has been stopped (for example, within a 50-meter radius) is assumed to be the destination.

Figure 7:
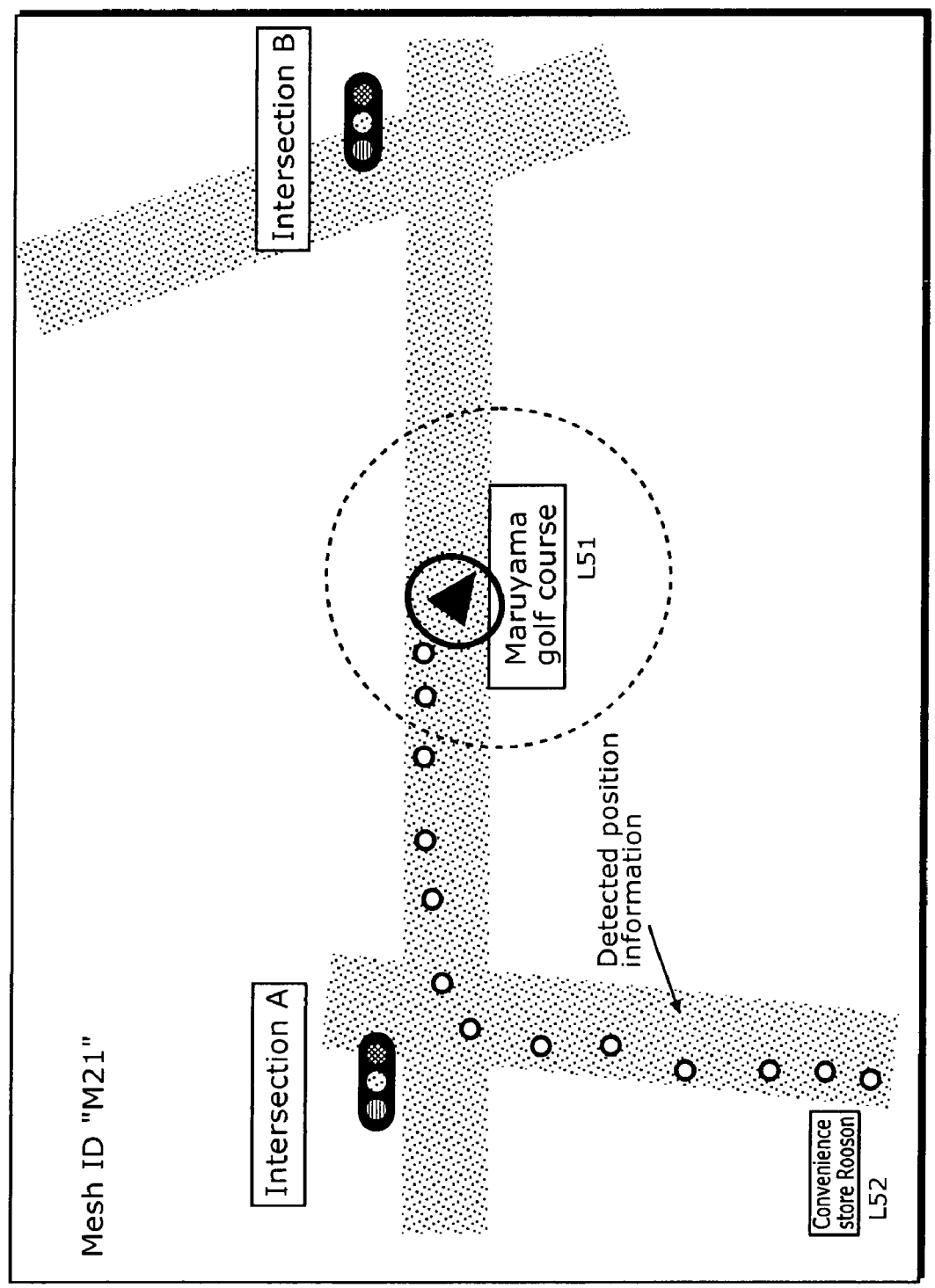
FIG. 7 is a diagram describing processing of extracting a destination.

FIG. 7 is a diagram for describing the extraction of the destination, and is a diagram showing the area corresponding to the mesh ID "M21". In the area, "Convenience store Rooson", "Maruyama golf course", and the like are present. On the other hand, the white circles are detected position information. For example, it is assumed that the user stops the engine in the vicinity of "Maruyama golf course". Since "Maruyama golf course" which is a landmark is present in the vicinity (for example, within a 50-meter radius) of the point where the engine has been stopped, it is judged that the destination of the user is Maruyama golf course, and the information is extracted.

FIG. 8 is a diagram showing an example of the movement histories of the user which are stored in the movement history storage unit 102. For example, respective movement history IDs are provided for each movement of the user, and the movement histories with respective IDs are stored. For example, the movement of the user who has left for the destination "Maruyama golf course" on May 10, 2004, 10:00 is stored as the movement history ID "001".

The first update map information providing unit 108 and the second update map information providing unit 109 are Web servers and the like which store update map information. For example, when a new shop and the like has been built and added as a landmark on the map, the old map information stored in the map information storage unit 103 becomes different from the actual map information. Thus, it is necessary to update the old map information to a map in which the new information has been added (hereinafter referred to as update map information). The first update map information providing unit 108 and the second update map information providing unit 109 store such update map information. Furthermore, a means which provides update map information is not limited to a single means. When an original map provider is different from the update map provider, or even when the update map provider matches the original map provider, there are cases where different plural types of maps are provided. Here, the first update map information providing unit 108 is assumed to be a unit which provides update map information provided by a provider A (hereinafter, the update map information provided from the first update map information providing unit 108 is referred to as "first update map information"), whereas the second update map information providing unit 109 is assumed to be a unit which provides update map information provided by a provider B (hereinafter, the update map information provided from the second update map information providing unit 109 is referred to as "second update map information").

Figure 9:
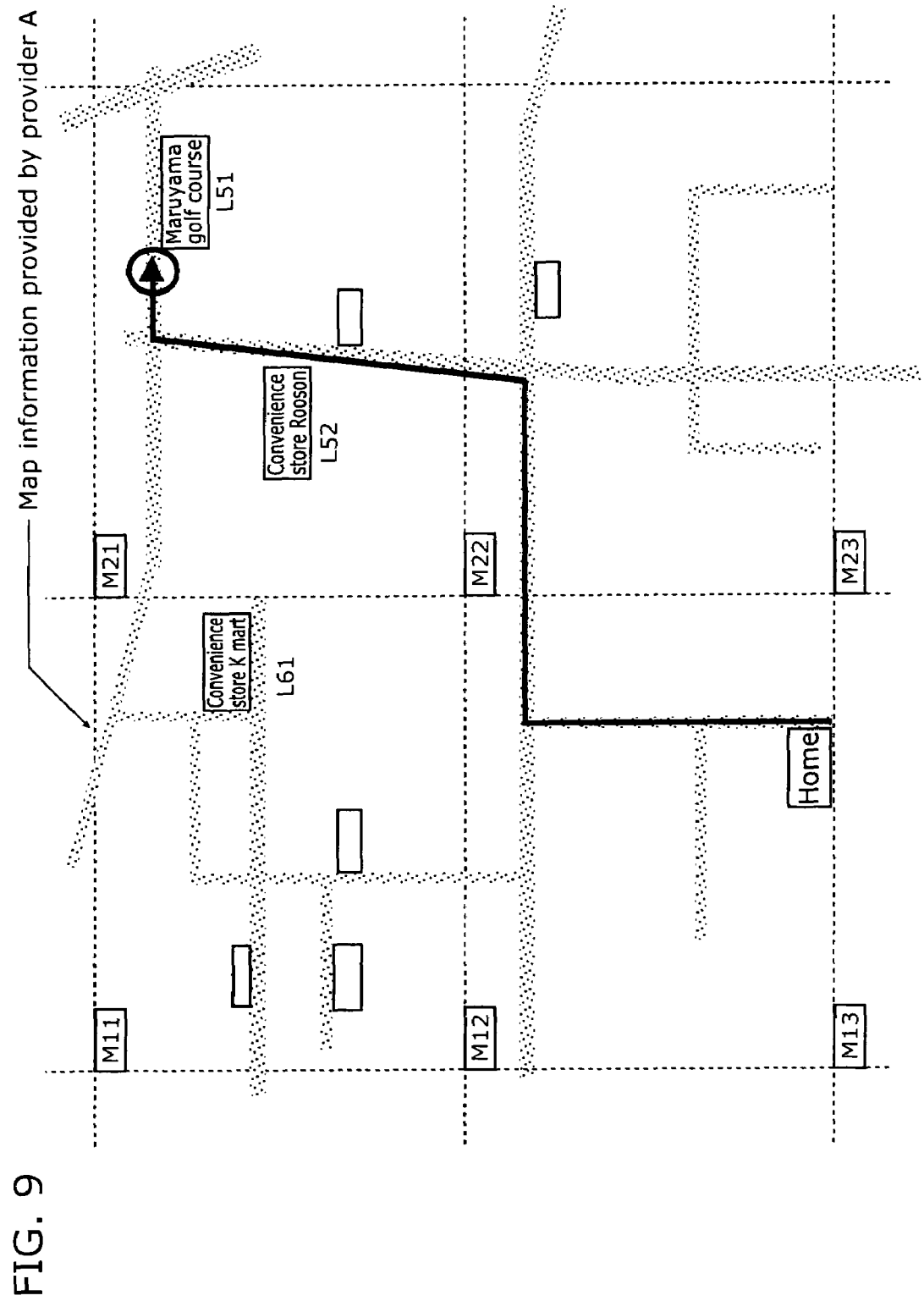
FIG. 9 is a diagram showing an example of the first update map information.
Figure 10:
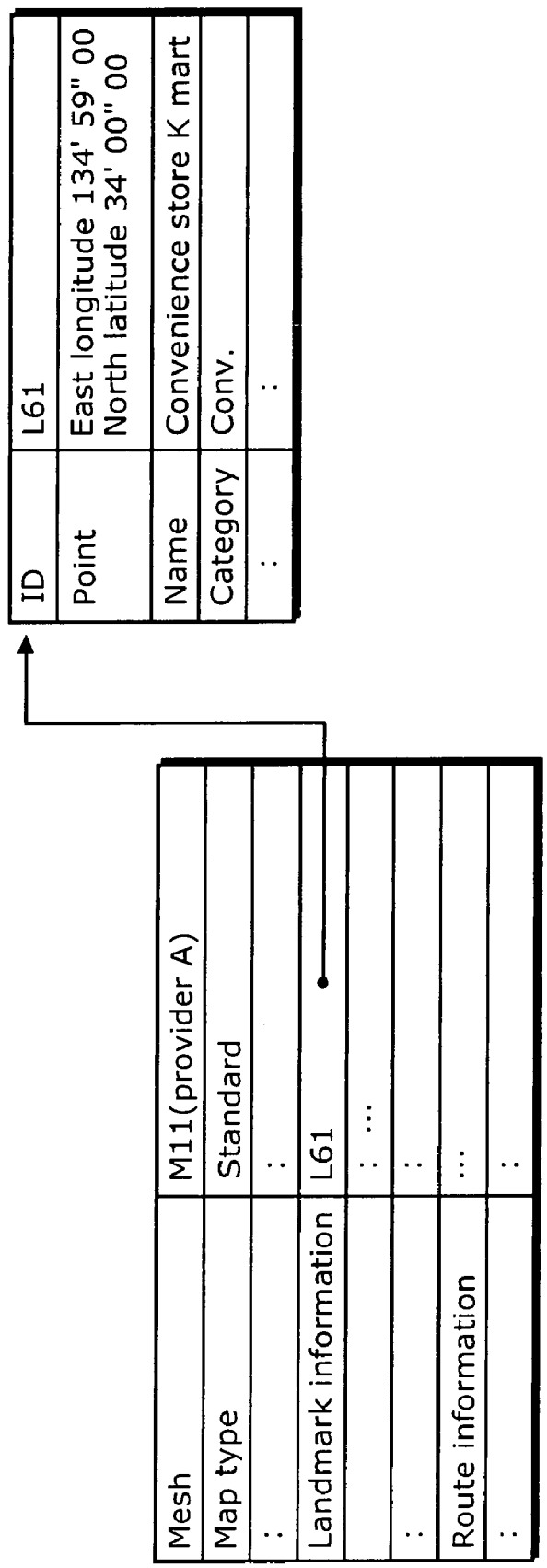
FIG. 10 is a diagram showing the details of the first update map information.

For example, it is assumed that there is a change in the map information corresponding to the mesh ID "M11" at one point. Each map information provider stores their own update map information in each of the providing units. FIG. 9 is a diagram showing an example in which the original map information has been partially updated with the first update map information provided by the provider A which provides standard maps. The mesh ID "M11" shows that new information has been reflected and a new landmark "Convenience store K mart" has been newly added, compared to the old map shown in FIG. 4. FIG. 10 is a diagram showing the details of the first update map information. As landmark information in the mesh ID "M11", information, such as a landmark ID "L61", a name "Convenience store K mart", a point of longitude 134 degrees 59 minutes 00 seconds east and latitude 34 degrees 00 minutes 00 seconds north, and a category "conv." is stored. "Map type" indicating a type of a map is set as "standard" indicating a standard map.

Figure 11:
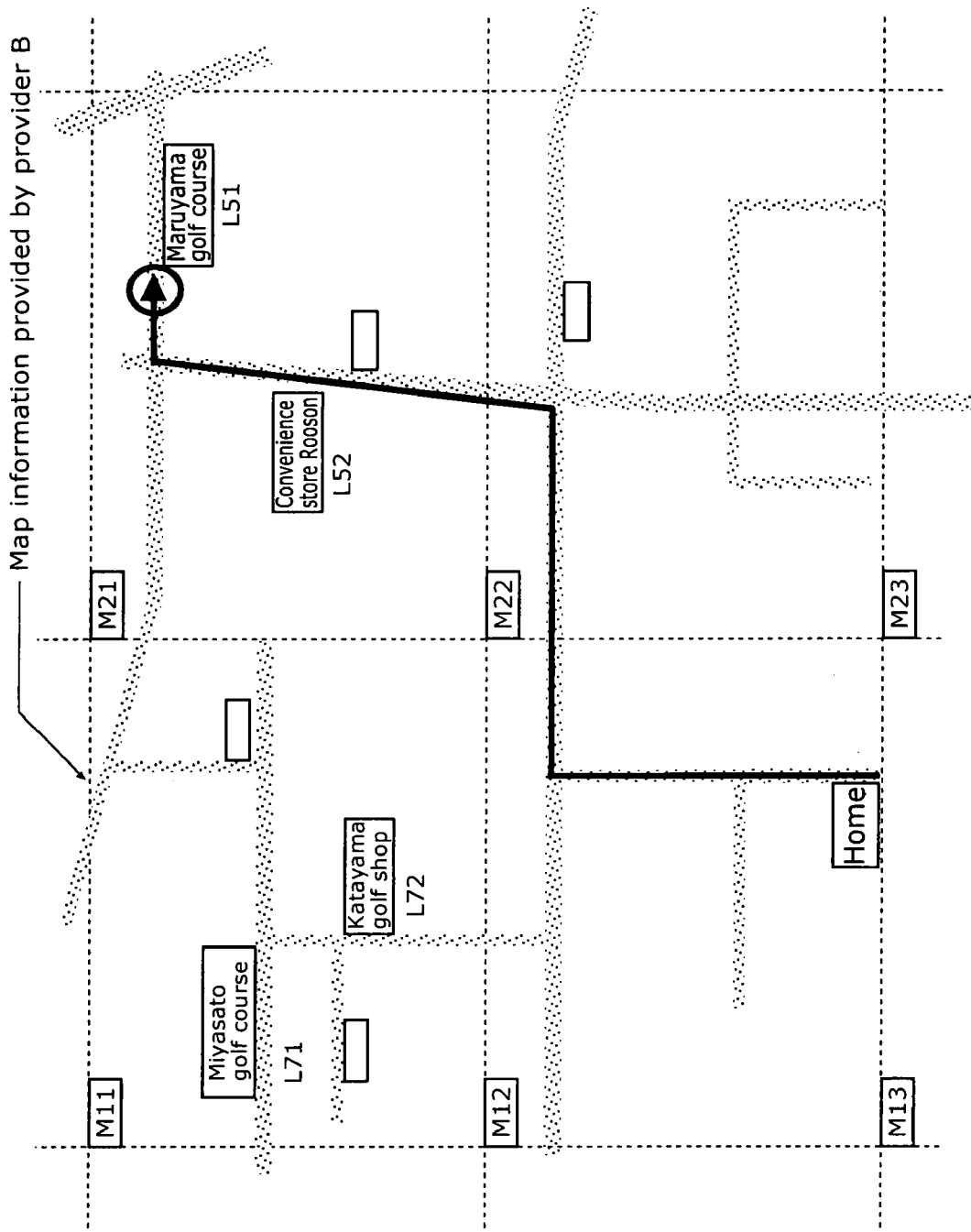
FIG. 11 is a diagram showing an example of the second update map information.
Figure 12:
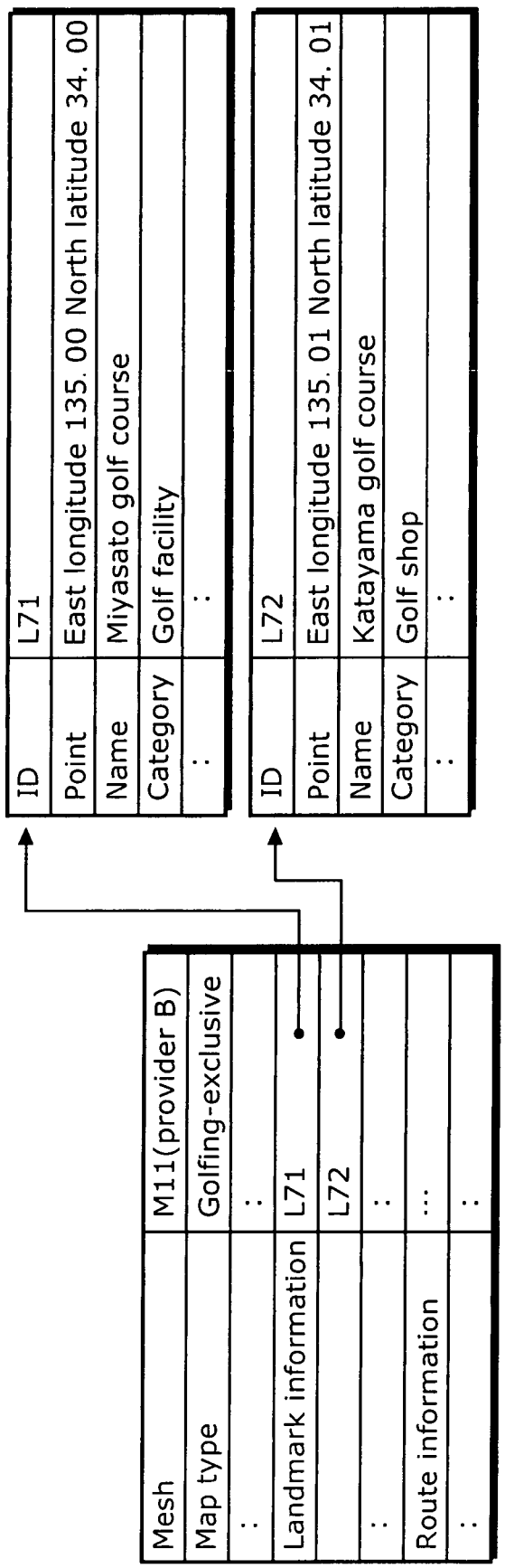
FIG. 12 is a diagram showing the details of the second update map information.

On the other hand, FIG. 11 is second update map information provided by the provider B. The new information has been reflected in the second update map information, compared to the old map shown in FIG. 4, and for example, a new landmark and the like has been newly added. Furthermore, this second update map information is "golfing-exclusive" map information created for those who frequently go to golf courses, and is different from the first update map information. For example, new landmarks, "Miyasato golf course" and "Katayama golf course" have been newly added. Although these landmarks are map information in the mesh ID "M11", they are not shown in the first update map information. FIG. 12 is a diagram showing the details of the second update map information. The second update map information is categorized as "golfing-exclusive" map type, and information, such as a landmark ID "L71", a name "Miyasato golf course", and a point of longitude 134 degrees 00 minutes 00 seconds east and latitude 35 degrees 00 minutes 00 seconds north is stored as the landmark information in the mesh ID "M11".

As such, the provided map information is not limited to a single type in the present embodiment, and there are cases where plural types of map information are provided. Furthermore, the provided maps do not always have the same details, and depending on each map, there are cases where the details are different.

In general, map information plays roles in not only simply displaying routes and geographic features, also increasing the comfort of the user who drives a vehicle by searching for and displaying landmarks. In this case, the detailed information is generally different from each other, even when map information and the corresponding map information matches in its presence or absence of landmarks depending on the use, the number of the present landmarks, or use of the same landmark. Thus, under an environment where plural map information are provided via servers and the like, the user needs to select necessary map information from among the provided plural map information. When plural map information are provided, it is necessary for the user to determine which map is more convenient for the user by comparing them. Although in general, the user considers the map information which is currently used as the optimal choice, when multiple services which respectively provide map information are present, the map information which is currently used is not always the optimal choice. However, without comparing the provided map information one another, it is not possible to judge which map information is the optimal for the user. Furthermore, there are cases where map information in which a degree of the details is different is provided depending on each region. Although, for example, a local government of Nara prefecture provides detailed map information of "Nara prefecture", there are cases where it does not provide any detailed map information regarding the neighboring regions. Furthermore, there are cases where the map information provided from golf associations includes detailed map information regarding golf courses, such as routes from main roads such as express highways to golf courses and facilities in the vicinity of the golf courses. As such, depending on service providers and associations, in many cases, the detailed degree of the map information is different from one another.

Therefore, in the present embodiment, it is possible to automatically select map information which is useful for the user, based on movement histories of the user, operation histories of the car navigation by the user, and the like. With this, the user can automatically select the optimal map information, without comparing plural map information by downloading them for finding out which map information is useful in terms of each landmark and road. Furthermore, the operability of the car navigation system installed in a vehicle is limited, and excessive operations by the user while driving are not preferable because the interference with the driving operation is not preferable. From this point of view, in the present embodiment, the map information suitable for the user is automatically selected based on the movement histories of the user, which provides benefits to the user.

The map information selecting unit 104 is a processing unit which selects map information suitable for the user from among plural map information provided from the first update map information providing unit 108 and the second update map information providing unit 109, and which selects map information under the control of the map information updating unit 105. The selected map information is downloaded by the map information selecting unit 104 via a network under the control of the map information updating unit 105, and is stored in the update map information storage unit 106 via the map information updating unit 105. In the present embodiment, the map information selecting unit 104 extracts, for example, preferences of the user from the landmarks which are the destinations of the user and which are stored in the movement history storage unit 102, and selects the map information according to the preferences.

Figure 13:
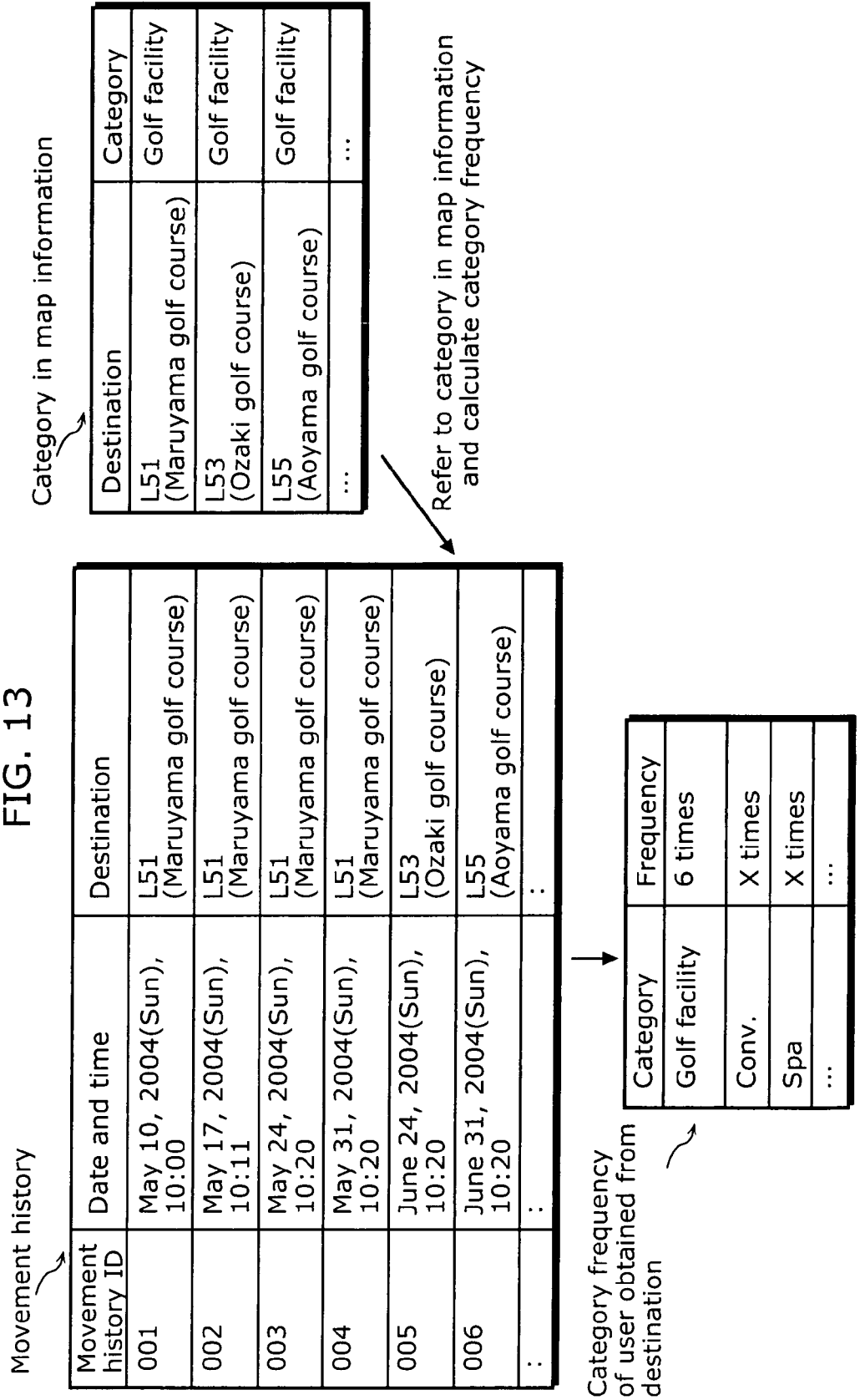
FIG. 13 is a diagram describing processing of extracting landmark information.

The landmark information extracting unit 110 extracts a frequency of the category to which the destination belongs, from the destinations of the user which are stored in the movement history storage unit 102, and for example, judges the category showing a high frequency to be a preference of the user. FIG. 13 is a diagram describing the extraction of the preferences of the user. As the movement histories shown in FIG. 8, the destinations of the user are stored, such as the movement history ID "001" showing that the user has arrived at the destination "Maruyama golf course" on "May 10, 2004 (Sun), 10:00". Furthermore, by referring to the map information (FIG. 6), it is obvious that this "Maruyama golf course" (landmark ID "L51") is categorized as the "golf facility". Then, the landmark information extracting unit 110 calculates, as 1 time, the frequency of traveling to "golf facility" which is one of the categories of the destinations of the user. Likewise, the landmark information extracting unit 110 calculates the category of the destinations from among the movement histories stored in the movement history storage unit 102. For example, the destination of the movement history ID "005" is "Ozaki golf course" (landmark ID "L53"). Although the destination is not "Maruyama golf course", the category to which the destination belongs is the same "golf facility". Thus, "Ozaki golf course" is counted as "golf facility". For example, since in the example shown in FIG. 13, the destinations with the frequency of 6 times indicated by the movement history IDs "001" to "006" belong to "golf facility", the landmark information extracting unit 110 extracts the frequency of "golf facility" as "6 times". As a result of this, it is obvious that the user has frequently been to "golf facility". With this, the map information selecting unit 104 identifies the preferences of the user based on the information obtained by the landmark information extracting unit 110 (here, the frequency per category of a destination), and selects map information based on the identified preferences of the user.

For example, a threshold and the like is set, and when the frequency is equal to or more than the threshold (for example, 5 times), the category is categorized as a preferable category of the user. In the example shown in FIG. 13, the frequency of the category "golf facility" is 6 times, and the value is more than the aforementioned threshold. Thus, the map information selecting unit 104 selects the map information related to this "golf facility", in other words, the second update map information which is golfing-exclusive information and is provided from the provider B (second update map information providing unit 109). The selected second update map information is obtained by the map information selecting unit 104 under the control of the map information updating unit 105 (in other words, the updating processing is performed), and the obtained second update map information is stored in the update map information storage unit 106 by the map information updating unit 105. In other words, the map information provided by the provider B is selected based on the map type shown in FIG. 12 indicating "golf facility", which is different from the map type of the map information provided by the provider A shown in FIG. 10 indicating "standard".

Note that in this example, the attributes, such as a map type, are used as the attributes of the map information provided by the providers A and B. Although the map information is selected according to the attribute, when the attribute of the map type is not present in any of available maps, the map information may be selected using the number of landmarks which are registered in a specific area. For example, the number of facilities related to golfing in the mesh ID "M11" in the map information which is provided by the provider A and is shown in FIG. 9 is compared to the number of facilities related to golfing in the mesh ID "M11" in the map information which is provided by the provider B and is shown in FIG. 11. In the map information of FIG. 11, "Miyasato golf course" and "Katayama golf shop" are registered as landmark information. On the other hand, in the map information of FIG. 9, although the facilities exist in each point, the names of the facilities are not registered as the landmark information. As a result, the map information selecting unit 104 judges that it is highly possible that more landmarks related to golf facilities are registered in the map information provided by the provider B so that it can select the map information of the provider B. As such, the map information may be selected, according to the number of landmarks registered in a certain area of a map.

The update information notifying unit 107 is a providing unit which notifies the user of the update map information stored in the update map information storage unit 106, based on the updated map information, in other words, the notification from the map information updating unit 105. The notification to the user is performed, for example, via a display unit, such as an LCD installed in a car navigation system.

The combining/displaying unit 117 is a processing unit which combines the map information stored in the map information storage unit 103 and the update map information stored in the update map information storage unit 106 and displays the combined map information. More specifically, as shown in the combining/displaying examples shown in FIGS. 9 and 11, among the plural map information stored in the map information storage unit 103, the geographic areas (mesh ID "M11" in FIGS. 9 and 11) shown with the update map information stored in the update map information storage unit 106 are displayed by combining the map information and the update map information so that the update map information can be displayed. The information is, for example, displayed on a display unit, such as an LCD installed in a car navigation system.

Next, the operations of the mobile terminal 100 according to the present embodiment with the aforementioned configuration are described using the flowcharts shown in FIGS. 15 to 18.

First, the position information detecting unit 101 detects a current position (Step S101). With this, the position information is detected at regular intervals according to the movement of the user (white circles in FIG. 4).

Next, the position information detecting unit 101 extracts a destination based on the detected position information (Step S102). The position information detecting unit 101 extracts the destination using the detected position information and the map information stored in the map information storage unit 103. More specifically, the position information detecting unit 101 judges whether or not the engine has been stopped (Step S201 of FIG. 16). When the engine has been stopped (Yes at Step S201), the position information detecting unit 101 refers to the position information of the point (Step S202), and the map information stored in the map information storage unit 103 (Step S203).

Then, it is judged whether or not the point is indicated by a landmark and is within a predetermined range (for example, within a 50-meter radius) (Step S204). When the point is within a predetermined range (Yes at Step S204), the landmark is extracted as the destination (Step S205). On the other hand, when the point is out of the predetermined range (No at Step S204), the processing is ended. For example, in the case of FIG. 5, since the point where the engine has been stopped is within the predetermined range of the landmark "Maruyama golf course", the destination is judged to be "Maruyama golf course".

Figure 15:
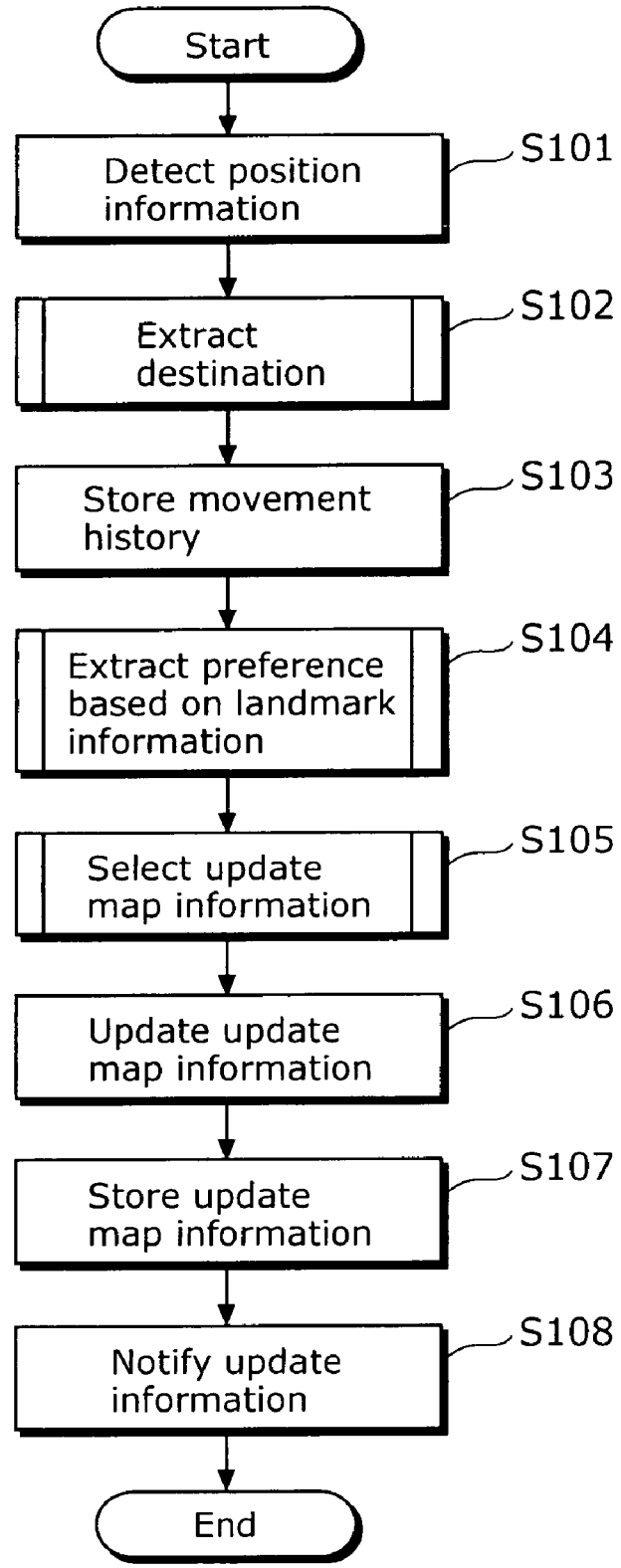
FIG. 15 is a flowchart showing the operation of the mobile terminal.
Figure 16:
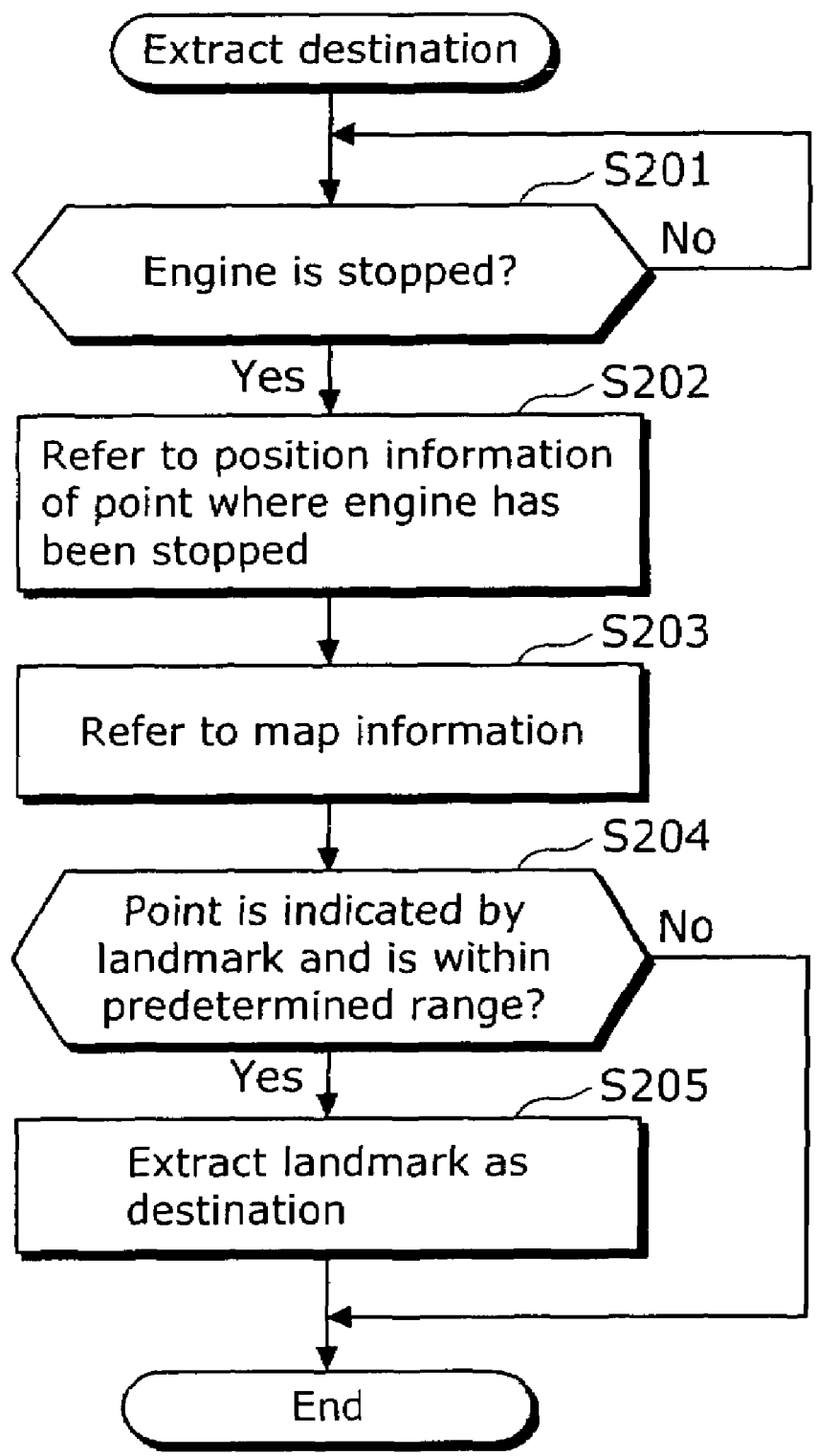
FIG. 16 is a flowchart showing the details of Step S102 in FIG. 15.
Figure 17:
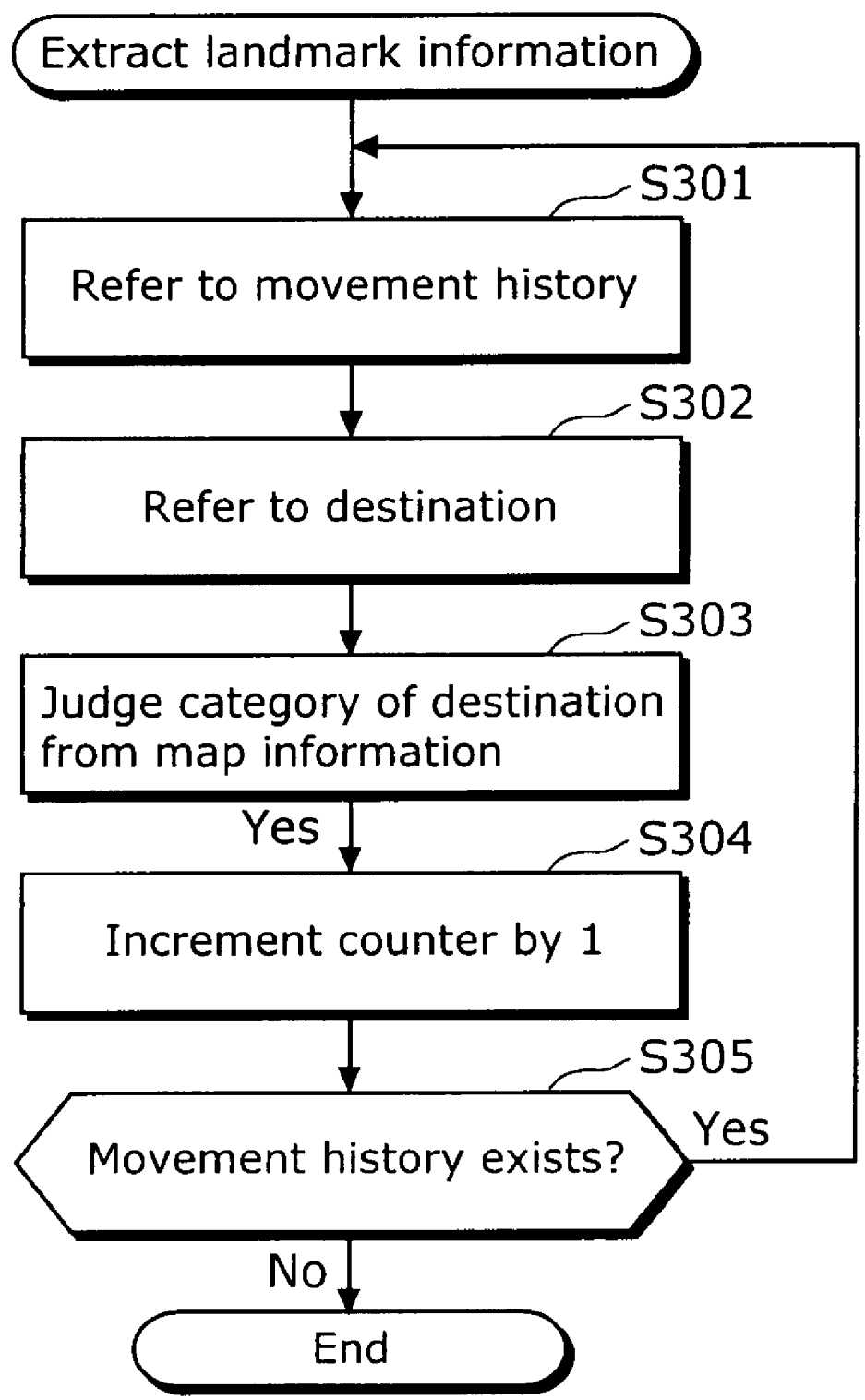
FIG. 17 is a flowchart showing the details of Step S104 in FIG. 15.
Figure 18:
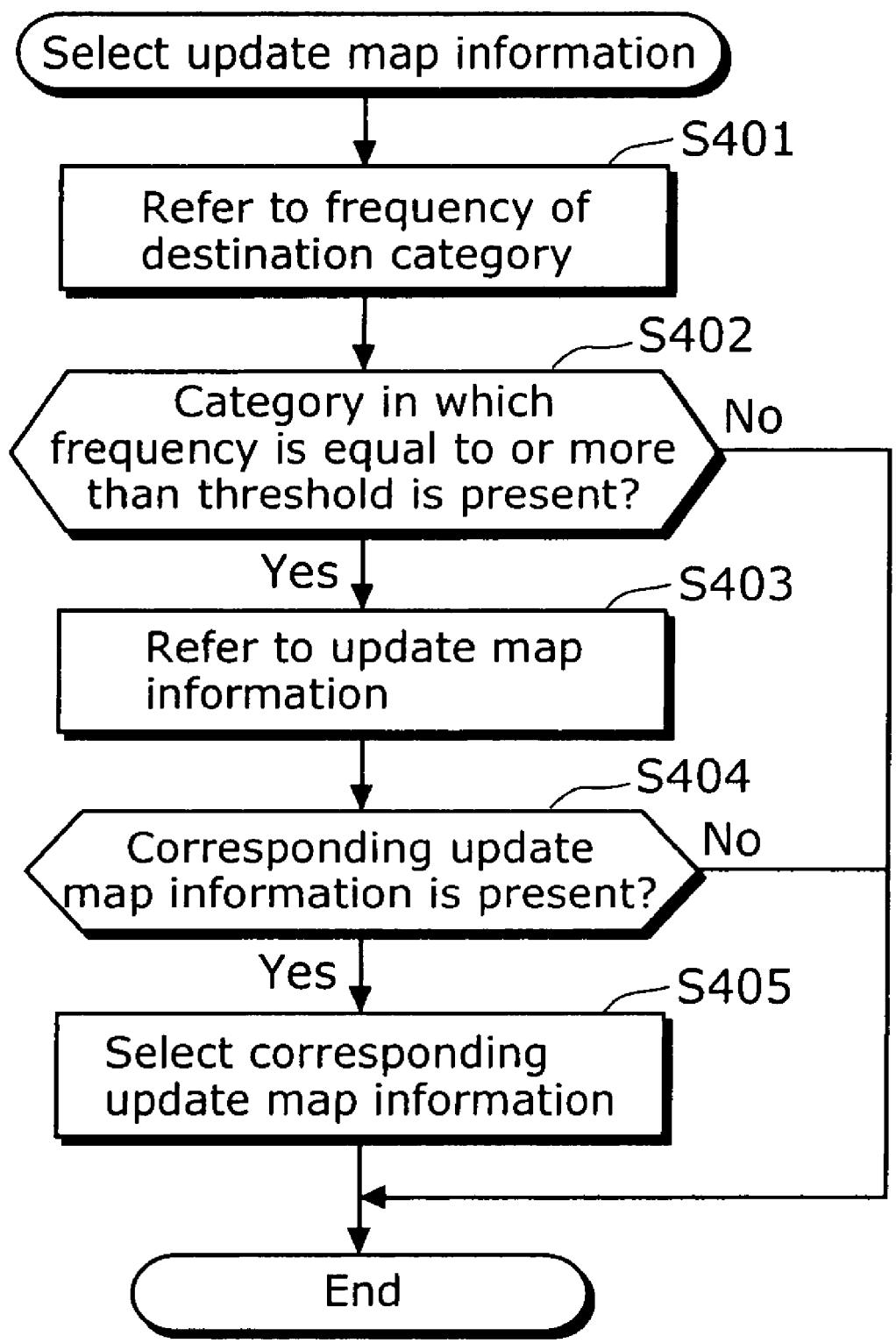
FIG. 18 is a flowchart showing the details of Step S105 in FIG. 15.

Next, the position information detecting unit 101 stores, in the movement history storage unit 102, the destination extracted in such a manner as a movement history (Step S103 of FIG. 15). FIG. 8 shows the example of the movement histories, and here, the destination, "Maruyama golf course" is stored as the movement history ID "001".

On the other hand, the landmark information extracting unit 110 extracts the preferences of the user based on the movement histories stored in the movement history storage unit 102, in order to select update map information to be provided. In the present embodiment, the preferences of the user are extracted based on landmark information (Step S104 of FIG. 15). More specifically, the landmark information extracting unit 110 first refers to the movement histories (Step S301 of FIG. 17), and refers to the destinations in the movement histories (Step S302). Next, the category to which each destination belongs is judged based on the map information (Step S303). The number of each of the categories is counted (S304), and by repeating the process for each of the movement histories (Yes at Step S305), the destination category is calculated based on the movement histories of the user. For example, the destination of the movement history ID "001" shown in FIG. 13 is "Maruyama golf course", and "Maruyama golf course" belongs to the category "golf facility" according to the map information shown in FIG. 6. Thus, as the corresponding category is "golf facility", the counter is incremented by 1. In the example shown in FIG. 13, by repeating the present steps in each of the movement histories, the frequency of the category "golf facility" is calculated as "6 times".

Next, based on the information extracted in the landmark information extracting unit 110, the landmark information extracting unit 104 selects the update map information (Step S105 of FIG. 15). More specifically, the map information selecting unit 104 first refers to the frequency of the category extracted in the landmark information extracting unit 110 (Step S401 of FIG. 18), and judges whether or not the category in which the frequency is equal to or more than the threshold (for example, 5 times) is present (Step S402). When such category is present (Yes at Step S402), the map information selecting unit 104 refers to the update map information respectively stored in the first update map information providing unit 108 and the second update map information providing unit 109 (Step S403). On the other hand, when such category is not present (No at Step S402), the processing is ended. In the case of FIG. 13, since the corresponding category is "golf facility" in which the frequency is "6 times", the map information selecting unit 104 refers to the update map information stored in the first update map information providing unit 108 and the second update map information providing unit 109.

Next, the map information selecting unit 104 judges whether or not the update map information regarding the corresponding category is present from among the plural update map information (Step S404). When the corresponding update map information is present (Yes at Step S404), the map information selecting unit 104 selects the corresponding update map information (Step S405). Note that the date and time when the currently used map information has been registered is compared to the date and time when the corresponding update map information is provided and updated, and only when the corresponding update map information is new, the map information selecting unit 104 selects the corresponding update map information. On the other hand, when such information is not present (No at Step S404), the processing is ended. In the present embodiment, since the second update map information is map information "golfing-exclusive" (according to FIG. 12), the map information selecting unit 104 selects the second update map information.

Next, the selected map information is obtained and updated by the map information selecting unit 104 via a network under the control of the map information updating unit 105 (Step S106 of FIG. 15), and is stored in the update map information storage unit 106 by the map information updating unit 105 (Step S107).

Figure 14:
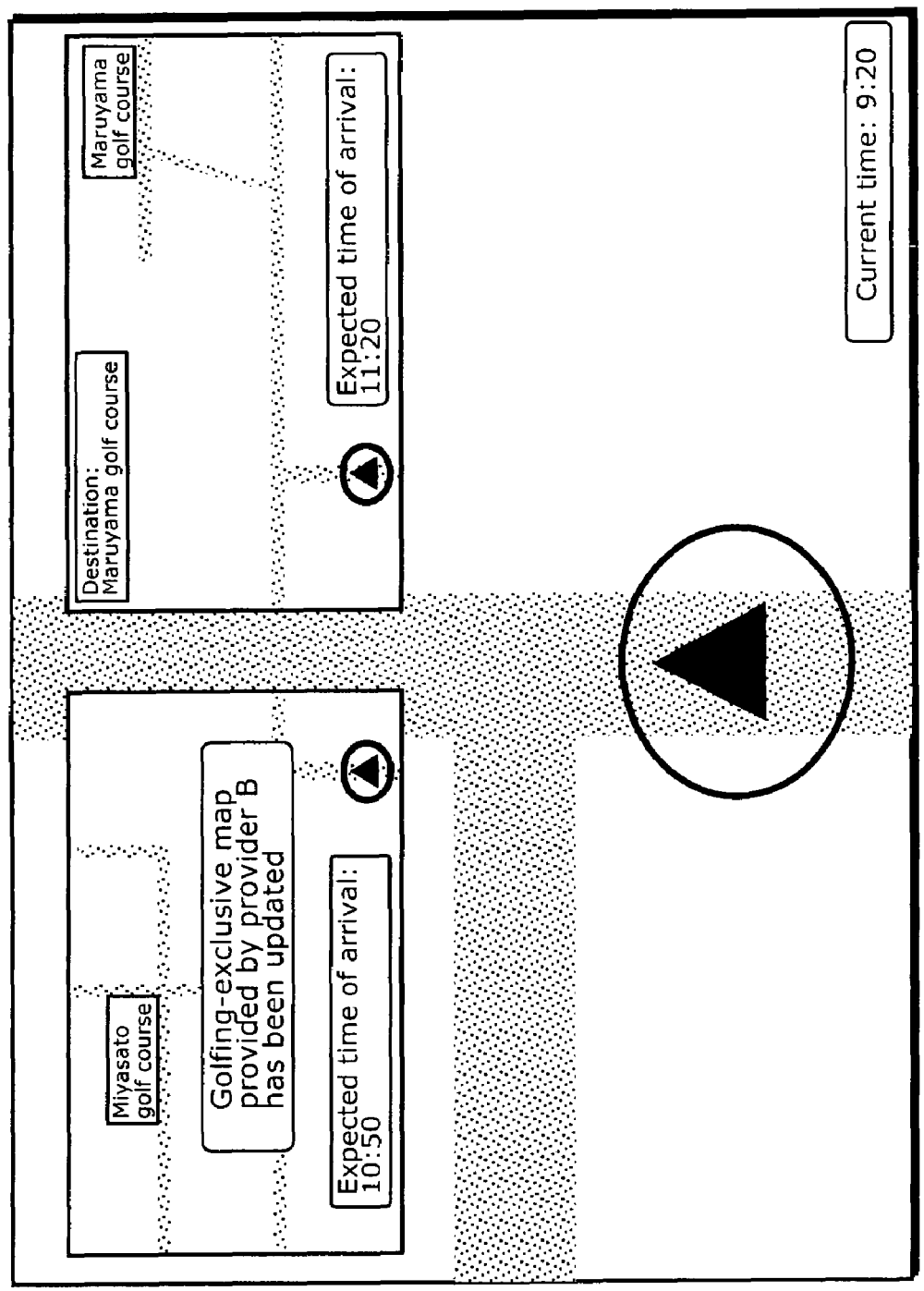
FIG. 14 is a diagram showing a notification example of update information.

Finally, the update information notifying unit 107 notifies the user of the updated map information (Step S108). FIG. 14 is a diagram of an example of a screen display showing the notification of the update map information, and notifying that the golfing-exclusive map information provided by the provider B has been updated. Then, for displaying a map on a screen of the car navigation system, the combining/displaying unit 117 produces a combined map created by overwriting the map information stored in the map information storage unit 103 with the map information stored in the update map information storage unit 106 and displays the produced map.

Note that although the example regarding golf facilities is described in the present embodiment, other landmark information may be used. For example, the map information detailing convenience stores may be updated by priority for the user who frequently goes to convenience stores. As such, by using the classification information of registered landmarks, it becomes possible to select map information according to the movement of the user.

Furthermore, although, in the present embodiment, map information suitable for the user is selected from among the plural update map information to be provided and the original map information is updated with the selected update map information, the update map information may be further modified based on the original map information stored in the map information storage unit 103.

In the case where map information is provided from a different map provider, for example, landmarks and overview, such as a background are not always the same, and there are cases where such map information is different from one another. On the other hand, even when the map information suitable for the user is partially updated with the map information provided by other providers as in the present embodiment, there are growing needs of the users who prefer to continue to use the landmarks and overview of the map which have been conventionally used. Furthermore, it is preferable in driving to continue to use the landmarks and overview which the user is used to using, and to make the user easily understand the information. Thus, the combining/displaying unit 117 may modify the updated map information based on the old map information which has been conventionally used. The case is described using FIGS. 11 and 19.

Figure 19:
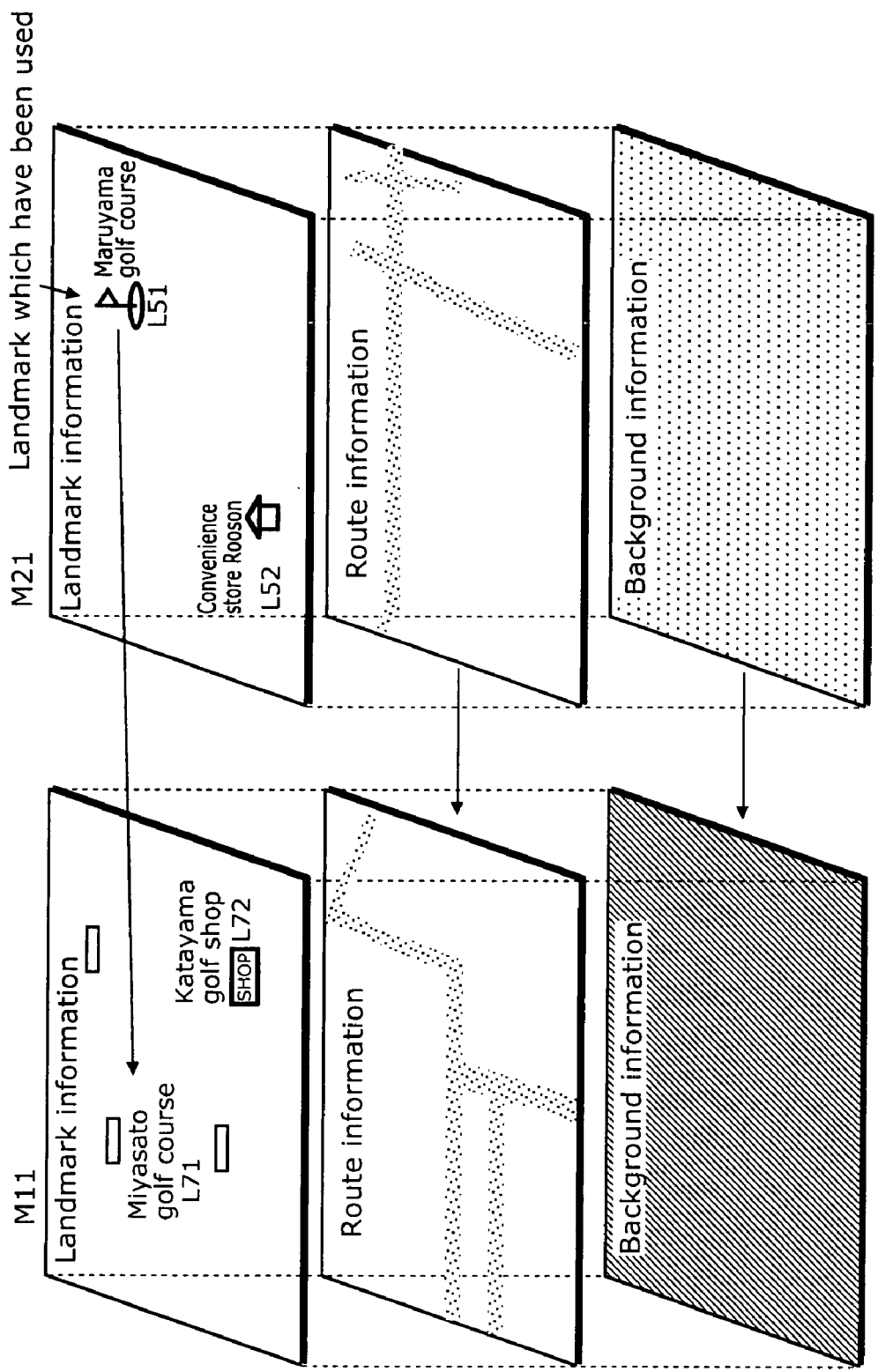
FIG. 19 is a diagram showing an example of continuing to use the landmarks.

For example, as shown in FIG. 11, it is assumed that the mesh ID "M11" is updated with the second update map information (the golfing-exclusive map provided by the provider B). On the other hand, it is assumed that the user conventionally uses the map information of the provider C which is different from the provider B. In other words, the mesh IDs "M21", "M22", "M12", and the like which are not updated are map information of the provider C which is different from the provider B. In this case, the landmarks and background in the mesh ID "M11 (provider B)" are different from those in the mesh ID "M21 (provider C)". FIG. 19 is the diagram showing the details of the map information of the mesh ID "M11 (provider B)" and the mesh ID "M21 (provider C)". For example, the landmarks of the same golf course are different from each other, and the backgrounds are also different. Then, the landmark, background, the color of the roads in "M11", which are update map information, are matched to those in "M21". Furthermore, in order to make the driver who is driving a vehicle more easily understand the information, not only the colors but also the font of the characters may be matched.

Here, the following technique may be further added for displaying icons on a map indicating landmarks and the like.

In other words, in the modification example of the aforementioned map information, shapes of the icons in the updated map information have been modified so as to match the icons which have been used before updating the map information. However, it is highly possible that the newly updated map includes more landmarks and plural other information, compared to the conventional map information. As a result, since the number of the landmarks registered in a unit map is increased, there are cases where the map is displayed using icons and fonts which are smaller than those in the conventional map. Thus, when the size of icons of landmarks used in the update map is displayed with the size of the icons in the conventional map, it becomes difficult to confirm the icons because many portions are overlapped. Thus, the icons of the landmarks of the conventional map information are modified according to the size of the icons of the landmark in the updated map information. With this, it is possible to display new map information in which many landmarks are registered, with the size of the icons which are reduced to the size of icons of the conventional landmarks. Furthermore, even when many landmarks are registered on a map, it becomes possible to prevent the overlap of the landmarks on the map.

More specifically, as shown in FIG. 20A, a map is described which includes M11 which has been newly updated by the provider B, and M21, M12, and M22 which are conventionally used and provided by the provider C. Since the map of the provider B is full of the information of golf facilities, icons and the like indicting many landmarks are displayed on a map. Thus, as shown in FIG. 20B, golf related information is displayed with an icon of 8 Pt×6 Pt. On the other hand, it is assumed that golf related landmark is represented by an icon of 14 Pt×10 Pt in the conventional map of the provider C. Therefore, when the map of the provider B is displayed using the icon of the golf related landmark of the map provided by the provider C, many of the golf related landmarks are overlapped. On the other hand, even when the icon of the golf related landmark of the map of the provider B is used for the display, as the user is not used to using the icon, there are cases where the user can not recognize it as the golf related facility. Thus, as shown in FIG. 20B, the size of the icon of the conventionally used provider C is modified so as to reduce the icon to the size of the golf related landmark in the map of the provider B. With this, it becomes possible to display icons on a screen without any overlap of the icons, using the golf related icons with which the user is familiar. Note that same processing can be performed on the information, such as information of fonts which is displayed on a screen. Furthermore, the size of the icon and font may be adjusted to the update map information by adjusting the original map information, and conversely, may be adjusted to the original map information by modifying the update map information. This is because the display balance between the update map area and the peripheral map areas can be achieved and the screen can be easily seen by adjusting the icon and font of the update map information when the number of original map information are many on a display screen.

Note that such processing, in other words, the processing in which the updated map information is modified based on the original map information or the movement histories of the user may be performed on the update map information obtained by the combining/displaying unit 117 after the map information selecting unit 104 obtains the update map information under the control of the map information updating unit 105, and the update map information after the modification may be stored in the update map information storage unit 106. Alternatively, since generally, a network is used for updating map information in consideration of communication cost, the provided update map information may be temporarily stored in the update map information storage unit 106. When the update information notifying unit 107 notifies the update map information, the combining/displaying unit 117 may read the update map information from the update map information storage unit 106, and modify the read update map information.

Figure 21:
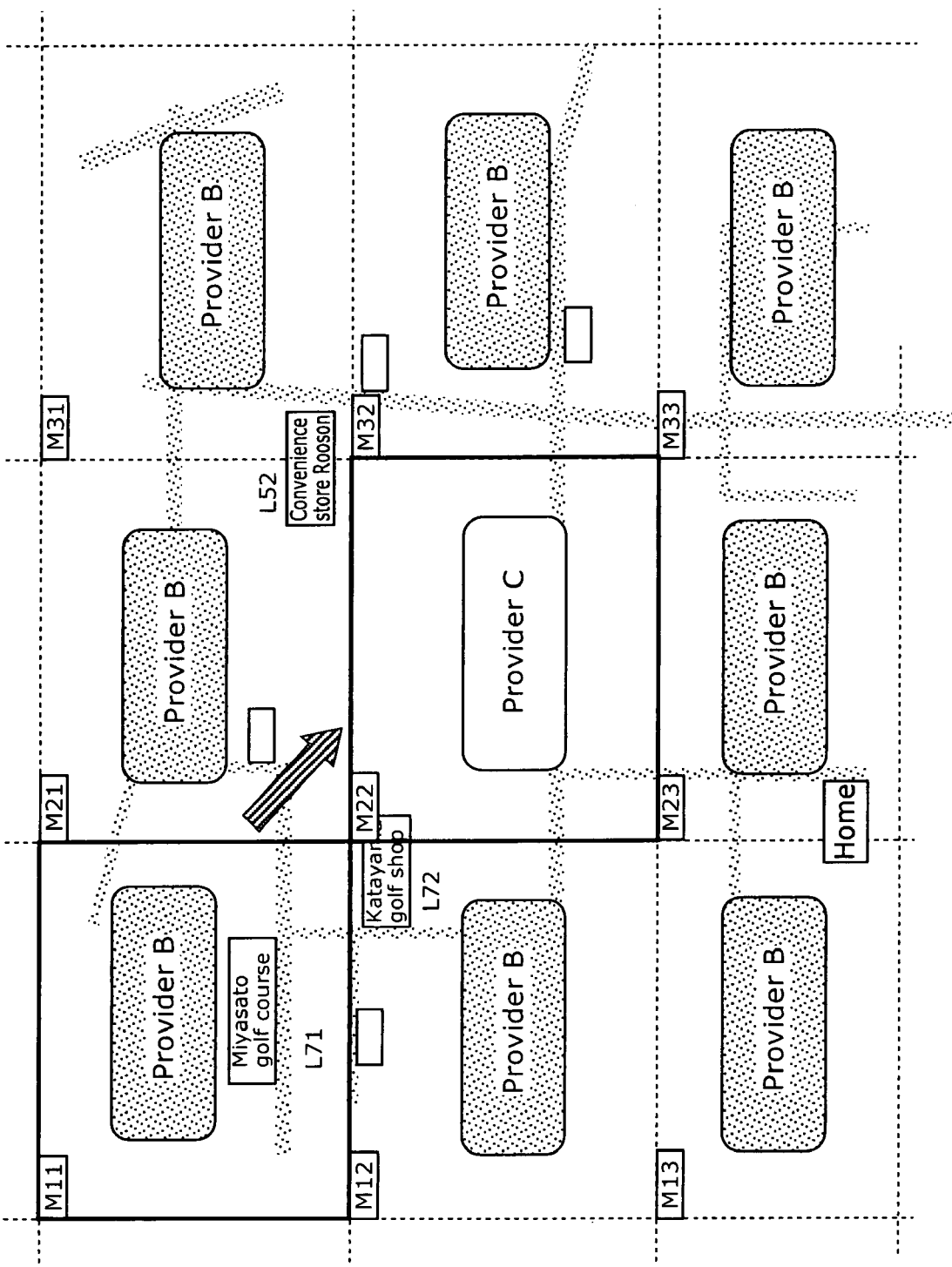
FIG. 21 is a diagram showing other examples of updating map information (in consideration of peripheral map areas).

Furthermore, although the update map information is selected based on the frequency of each of the categories of the landmarks in the present embodiment, the present invention is not limited to such selection criterion. For example, the map information may be updated in consideration of the area in which the update map information is present and the map information used in the peripheral area. The specific example is shown in FIG. 21. In FIG. 21, it is assumed that the mesh IDs, such as "M11", "M12", "M13", "M21", "M23", "M31", "M32", and "M33" are from the second update map information provided by the provider B. On the other hand, it is assumed that the mesh ID "M22" is from the map information of the provider C which is different from the provider B. At a certain point, it is assumed that "M11" has been updated with the second update map information provided by the provider B in the aforementioned method. In this case, the peripheral 8 mesh areas around "M22" become totally map information provided by the provider B. Here, in order to unify map information and make the user understand information more easily, the combining/displaying unit 117 may update the mesh ID "M22" with the map information of the provider B as updated in the peripheral 8 mesh areas around "M22". As such, it becomes possible to make the map consistent and easy to see for the user by checking a ratio of an area displaying map information to a whole display area and updating the map information with the update map information which is the same type of the update map information with a higher ratio of an area displaying map information to the whole display area.

Furthermore, the mesh size of the provided plural update map information and the manner in which each of the update map information are divided into meshes are common in the present embodiment. More specifically, the manner in which the map information are divided into meshes is common between the map information which is conventionally used by the user and is stored in the map information storage unit 103 shown in FIG. 4 and the map information provided by the respective providers shown in FIGS. 10 and 12. The difference lies in the landmark information and the like. Thus, when the mesh ID "M11" of the old map information is updated, the mesh ID "M11" of the update map information to be provided is just replaced with selected information, in other words, either with the first update map information or with the second update map information. Generally, although map information is made up of several layers and the basic configuration is all the same, it is conceivable that each provider uses different landmark information, background information, and the like. Thus, when a predetermined portion is updated, for example, in the case where the mesh ID "M11" is updated, it is possible to update the map information by updating the mesh ID "M11" of other providers.

However, all map information does not necessarily have the common basic configuration. For example, it is conceivable that the manner in which each provider divides a map into mesh IDs may be different from one another. In this case, it is possible to update map information by selecting plural meshes and extracting only a necessary mesh among the meshes. The following describes, with reference to FIGS. 4 and 22, a method of updating current map information with update map information which applies a different manner to divide mesh areas.

It is assumed that the mesh ID "M11" of the map information shown in FIG. 4 is updated. When updated, a trigger of selecting map information, in other words, the preference of the user is "golf facility" as in the aforementioned case. Thus, the update map information is the second update map information.

Figure 22:
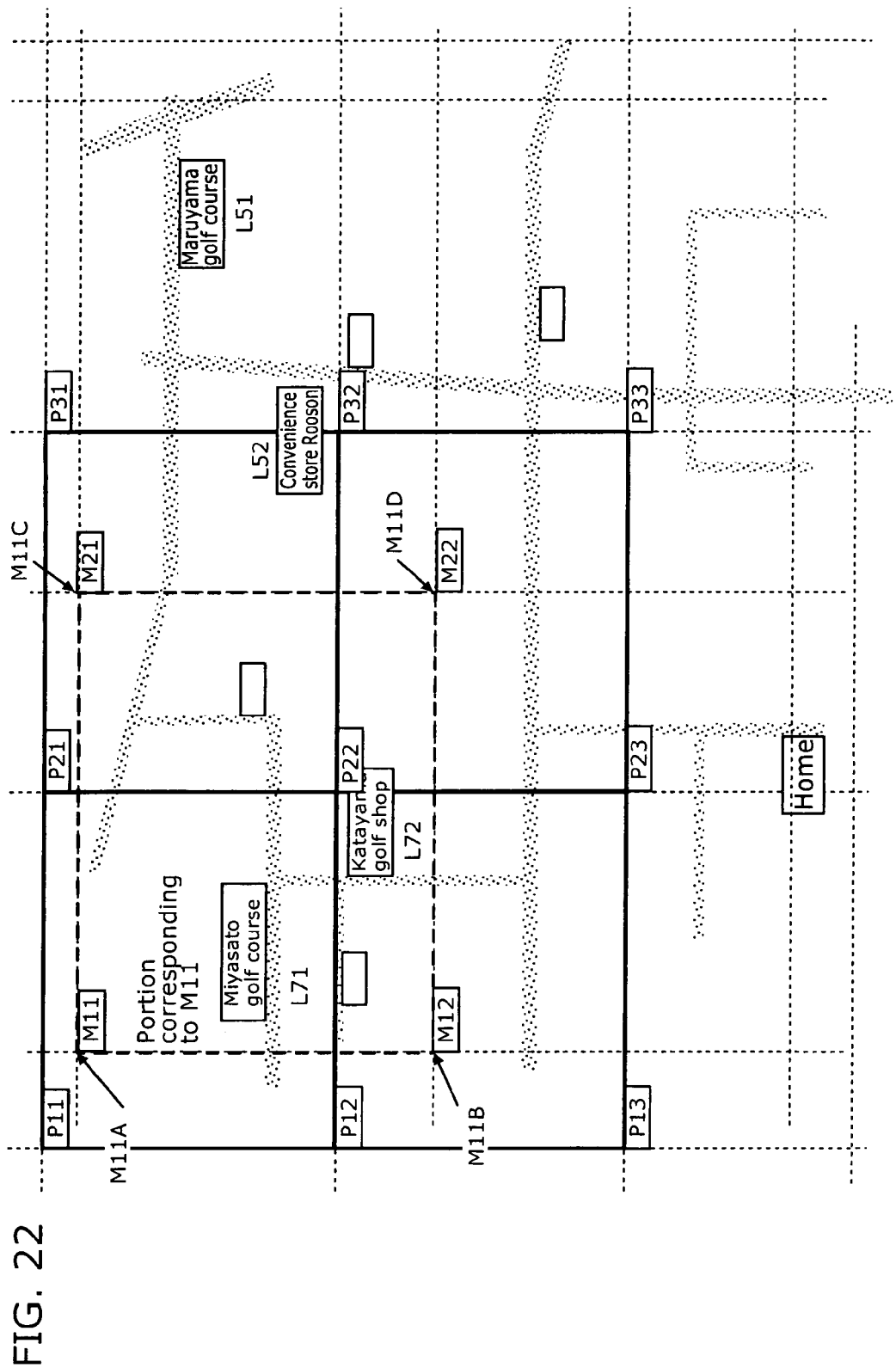
FIG. 22 is a diagram showing other examples of updating map information (in consideration of the manner of dividing a map into mesh areas).

Here, it is assumed that the manner in which the mesh IDs of the second update map information are divided is different from that of the old map information. FIG. 22 is a diagram showing the second update map information as the example. This second update map information is assumed to be divided into predetermined areas, "P (parcel) 11", "P12", "P13", and the like. In this case, when a portion corresponding to the mesh ID "M11" is updated, it is necessary to select 4 mesh areas "P11", "P12", "P21", and "P22", to extract a corresponding portion, and to update the "M11" as a new mesh ID "M11".

In order to do so, the latitude/longitude information at the 4 corner points (M11A, M11B, M11C, M11D) of M11 in FIG. 22 is extracted, and the areas which include the coordinates of the 4 points are selected. As a result, "P11", "P12", "P21", and "P22" are respectively selected, and using those area maps, each of the map information is updated. With this, even when the manner in which the update map information are divided is different from that of the current map information, it is possible to update the current map with the update map.

Note that when a map is updated, there are cases where it is necessary to take, into account, not only the manner in which map information is divided into meshes but the difference in a scale of map information. For example, there are cases where the scale of update map information to be provided for updating the map information does not correspond to the scale of the map information which the user conventionally uses. In this case, by changing the scale of the update map information into that of the map information of the user, it is possible to update the map. The method of updating current map information with update map information in which a scale different from that of the current map information is used is described with reference to FIGS. 23 and 24.

Figure 23:
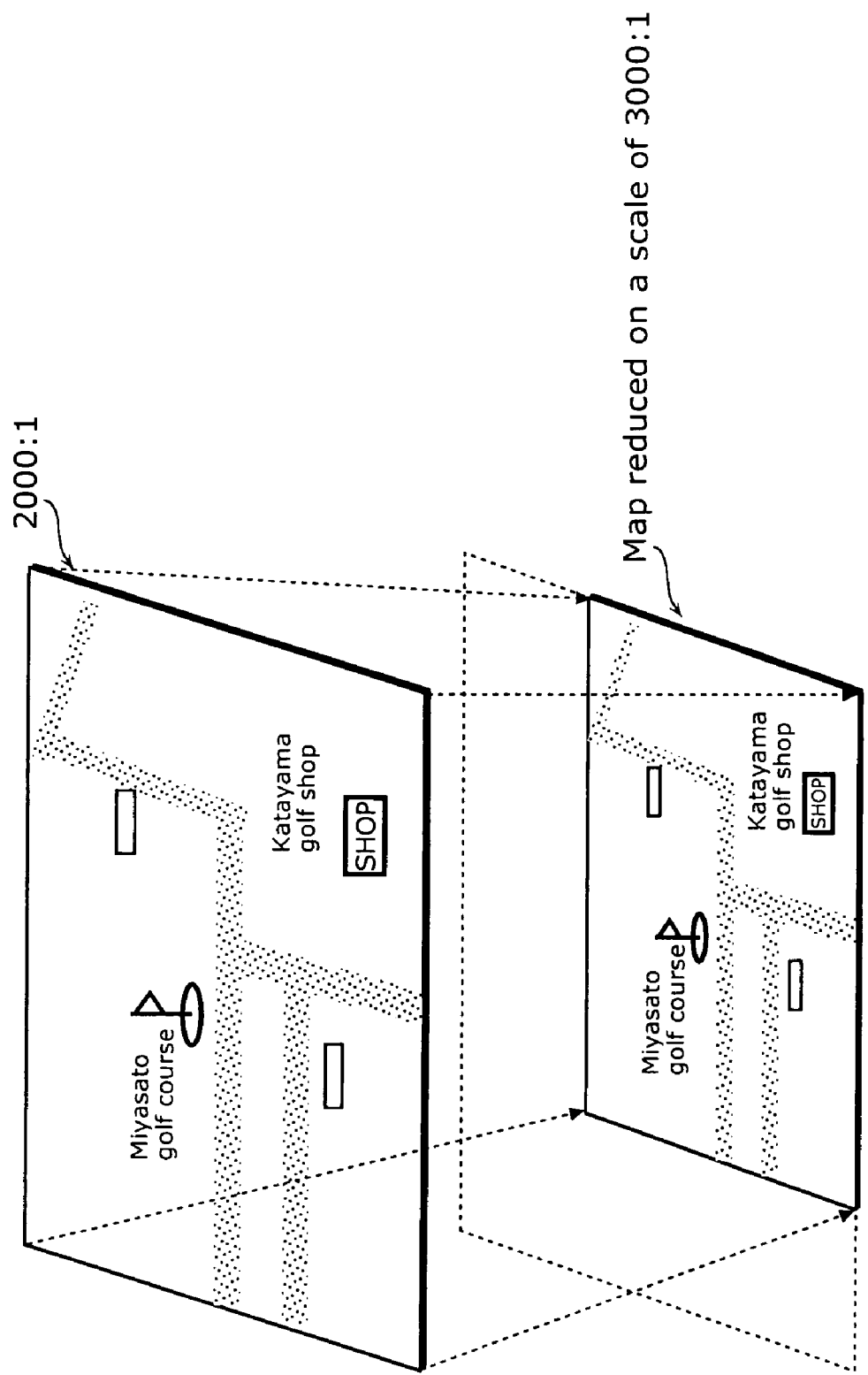
FIG. 23 is a diagram showing other examples of updating map information (in consideration of the scale).
Figure 24:
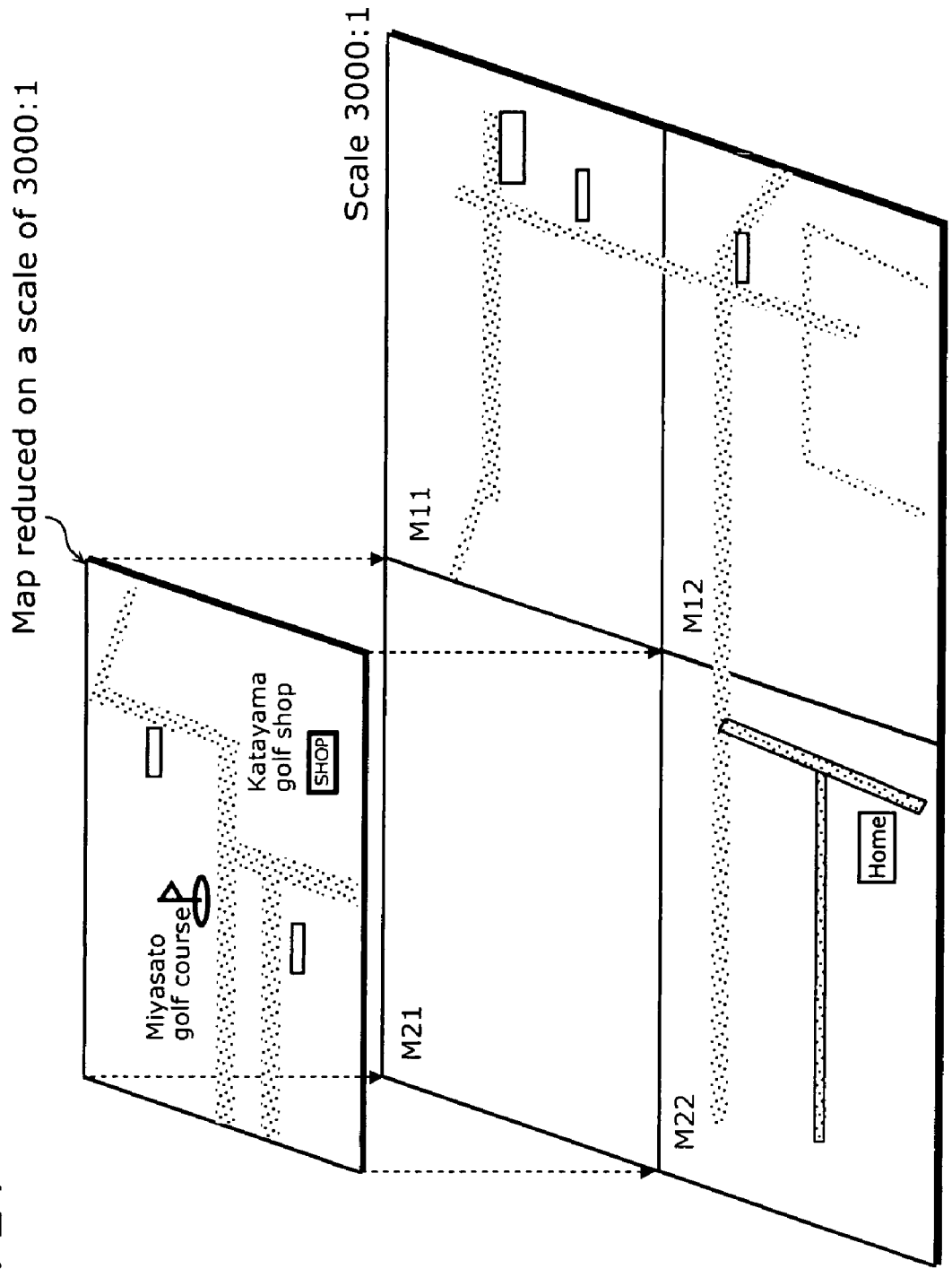
FIG. 24 is a diagram showing other examples of updating map information (in consideration of the scale).

FIG. 23 is a diagram showing the second update map information corresponding to the mesh ID "M11" shown in FIG. 4. At present, it is assumed that the scale of map information that the user uses is 3000:1, and the second update map information to be provided does not have the map on a scale of 3000:1. In this case, for example, the map information on a scale of 2000:1 which includes more detailed information than the map on a scale of 3000:1 is converted into the map information on a scale of 3000:1. Then, the second map information which has been converted into the map on a scale of 3000:1 is stored in the update map information storage unit 106 as an update map, as shown in FIG. 24. With this, it is possible to update the current map information with the update map information which uses a scale different from that of the current map information.

Figure 25:
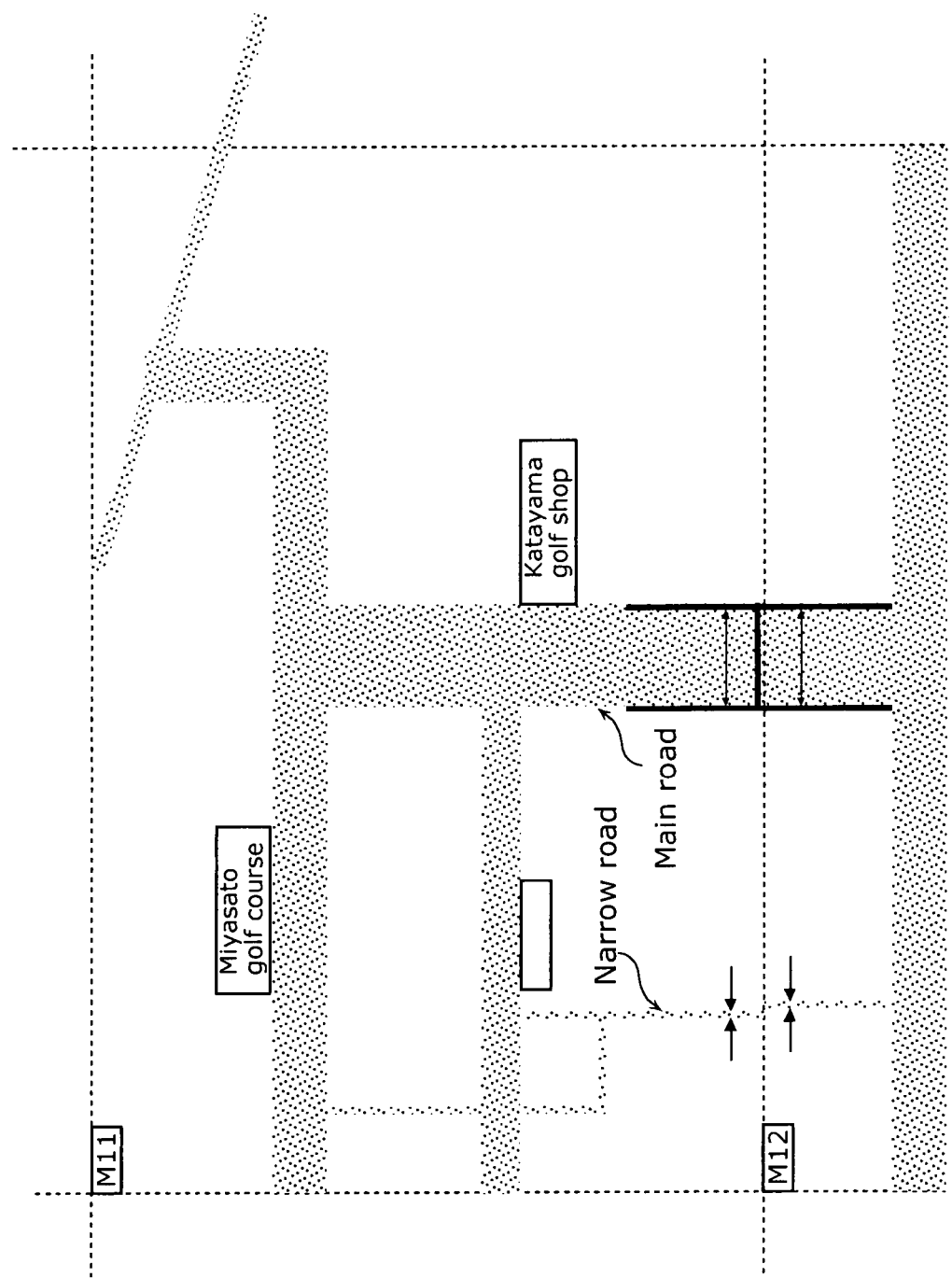
FIG. 25 is a diagram showing other examples of updating map information (matching the main roads).

Note that even when the manner in which mesh IDs are divided is unified or a scale is unified between the update map information and the current map information, due to a minor position displacement occurring when a map is drawn, it is not always possible to achieve uniformity in map information. In such a case, for example, it may be possible to match map information based on main roads which seem to be frequently used by the user. This is described using FIG. 25. FIG. 25 is a diagram showing the mesh ID "M11" updated by the second update map information and the mesh ID "M12" which is the map information provided by the provider C which has been conventionally used by the user. Here, as the providers of M11 and M12 are different from each other and the map has been partially updated, two types of map are not matched completely. The mesh IDs "M11" and "M12" do not match, for example, in a narrow road shown in FIG. 25. Thus, the two types of map are matched by giving a higher priority on the main road. For example, the color boundary is differentiated and the edge is extracted so as to extract the road. As described above, the map information is made up of several layers, and for example, it becomes possible to extract a route using route information. Giving a high priority to the main road, the correlation between the two types of the main roads is examined so as to match the main road. In FIG. 25, the respective narrow roads are not matched, while the main roads are matched. Thus, the position of map information is aligned with update map information so as to make, minimal, position displacement in the joint between a route included in the original map information and a corresponding route included in the update map information. With this, it becomes possible to display a combined map having uniformity.

Furthermore, in the present embodiment, the type of exclusive map information is determined based on "a map type" specified in the map information. More specifically, for example, the golfing-exclusive map information is described as a map type "golfing-exclusive". However, the method of judging the type of map information is not limited to this, and, for example, it may be automatically judged by analyzing the text described in the map information. For example, an update map type judging unit is newly set which judges a type of map information. This unit analyzes the text described in the map information, and it becomes possible to automatically judge the type of map information. This is described using a specific example hereinafter.

Figure 26:
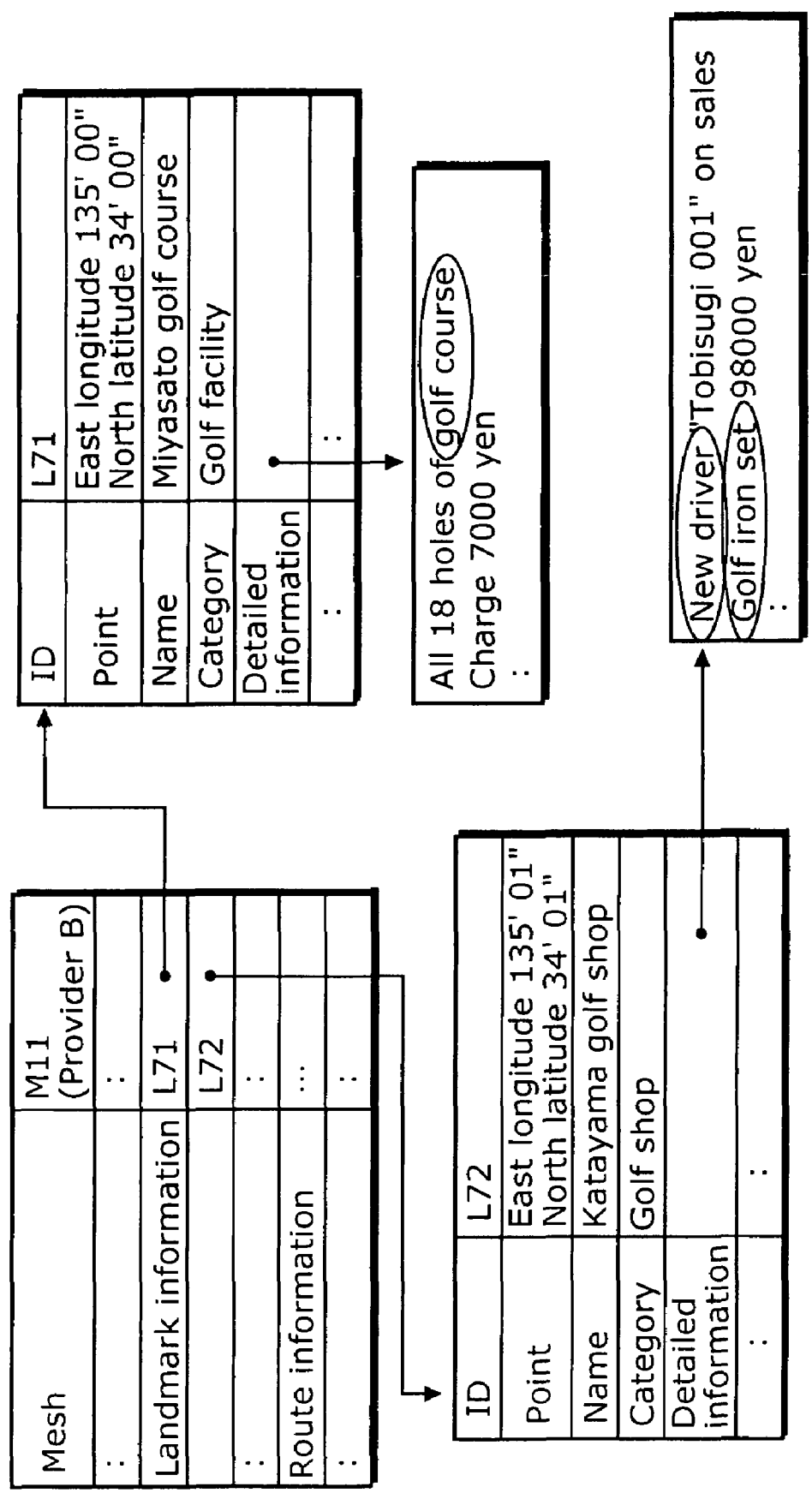
FIG. 26 is a diagram describing exclusive map information.

FIG. 26 is a diagram showing the second update map information of the mesh ID "M11" stored in the second update map information providing unit 109. "Map type" is not specified in the present second update map information, which is different from the aforementioned second update map information. On the other hand, "detailed information" is described as detailed description of each landmark. For example, the detailed description of the landmark regarding golfing is specified, such as "all 18 holes of the golf course" as the detailed information of "Miyasato golf course". Alternatively, as detailed information of "Katayama golf shop", information regarding golfing is described, such as "new driver on sales" and "iron set" is specified. Thus, the type of the map information may be judged by analyzing the morpheme of the text information and extracting the keywords, such as nouns. In this case, it is possible to judge the information to be used as golfing-exclusive information, because information regarding golfing is abundantly included. The plural map information respectively provided by different providers do not always use the common format, and the type of each of the map information is not always specified as in the present embodiment. Thus, by analyzing the text information stored in the map information, it becomes possible to automatically judge a type of the map information as described above. Furthermore, by referring to the amount of text information or the category, it is also possible to judge the type of the map based on the number and the density of landmarks regarding golfing, and the like. For example, by calculating the density of landmarks, such as golf courses and golf shops which are present within a predetermined portion, a map may be judged to be a golfing-exclusive map, or it is possible to automatically judge a map to be a map including detailed information regarding golfing, based on the abundant information described in the detailed information.

Second Embodiment

Next, the second embodiment of the present invention is described.

In the first embodiment, optimal update map information is selected from among plural update map information, using landmark information. In the present embodiment, a method of selecting optimal update map information from among plural update map information, using route information is described.

Figure 27:
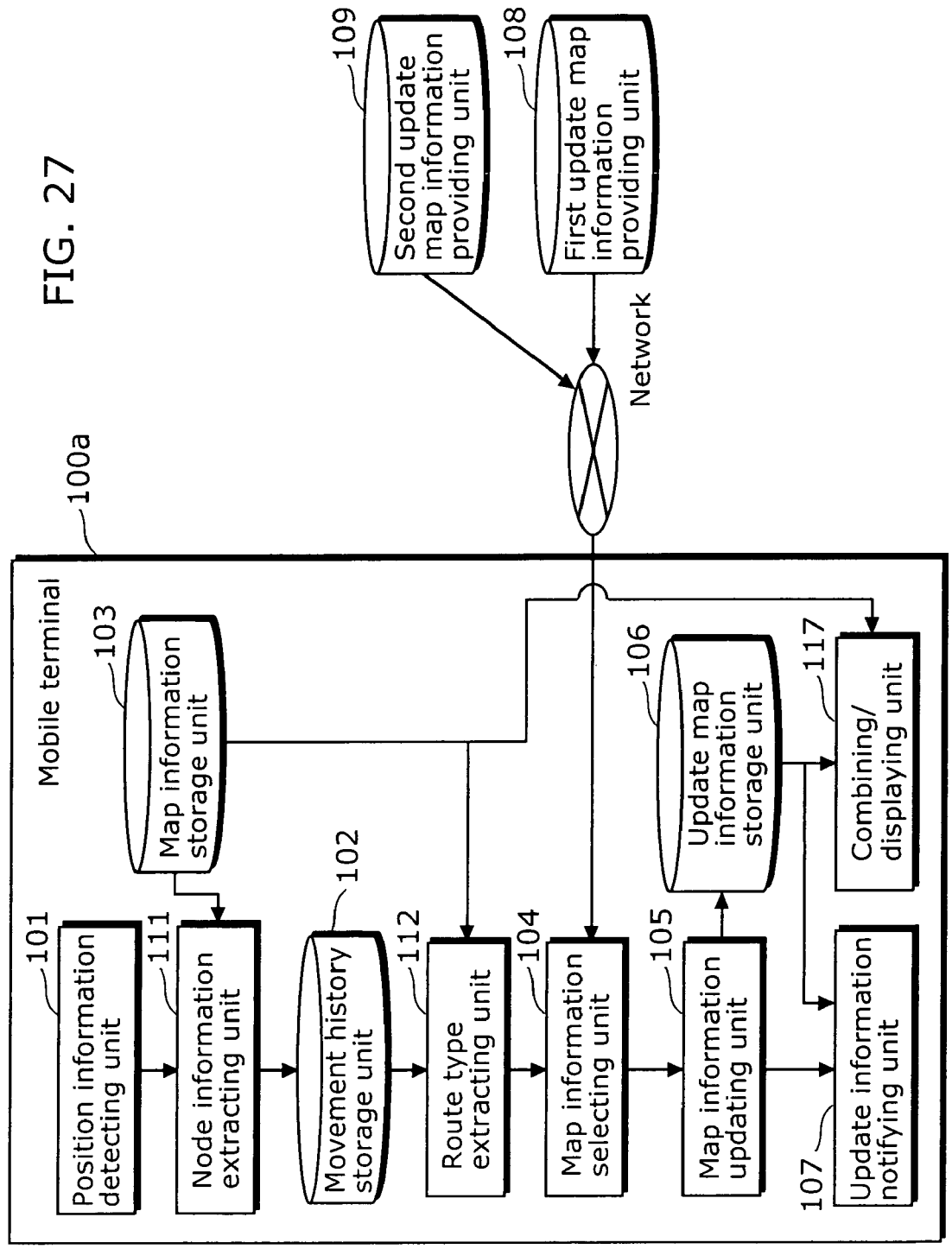
FIG. 27 is a block diagram showing the configuration of the mobile terminal according to the second embodiment of the present invention.

FIG. 27 is a functional block diagram showing the configuration of the mobile terminal 100a in the second embodiment of the present invention. This mobile terminal 100a is a device which selects optimal update map information for the user from among plural update map information, using route information, and includes the position information detecting unit 101, the node information extracting unit 111, the map information storage unit 103, the movement history storage unit 102, the route type extracting unit 112, the map information selecting unit 104, the map information updating unit 105, the update map information storage unit 106, the update information notifying unit 107, and the combining/displaying unit 117. Note that the first update map information providing unit 108 and the second update map information providing unit 109 which are connected to this mobile terminal 100 via a communication network are described as well in the present diagram. Hereinafter, the same unit numbers are given to the units having the same configuration as in the first embodiment, and the description is omitted.

The map information storage unit 103 is a hard disk and the like which stores map information in advance, and as described in the first embodiment, the map information is divided into predetermined mesh areas, and is stored with several layers (refer to FIGS. 4 and 5). However, it is assumed that in the present embodiment, the map information storage unit 103 stores map information shown in FIG. 28.

Figure 28:
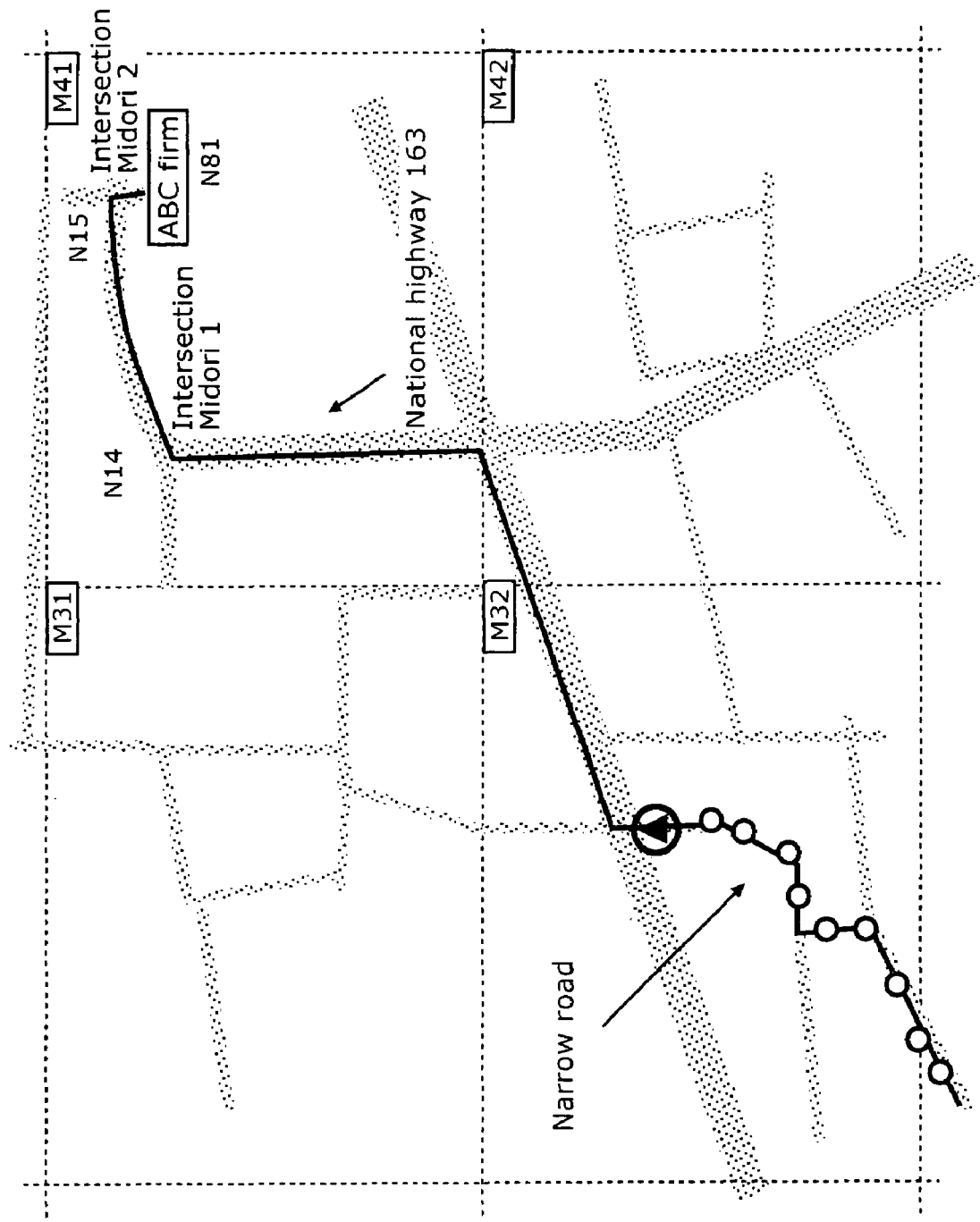
FIG. 28 is a diagram showing an example of map information.
Figure 29:
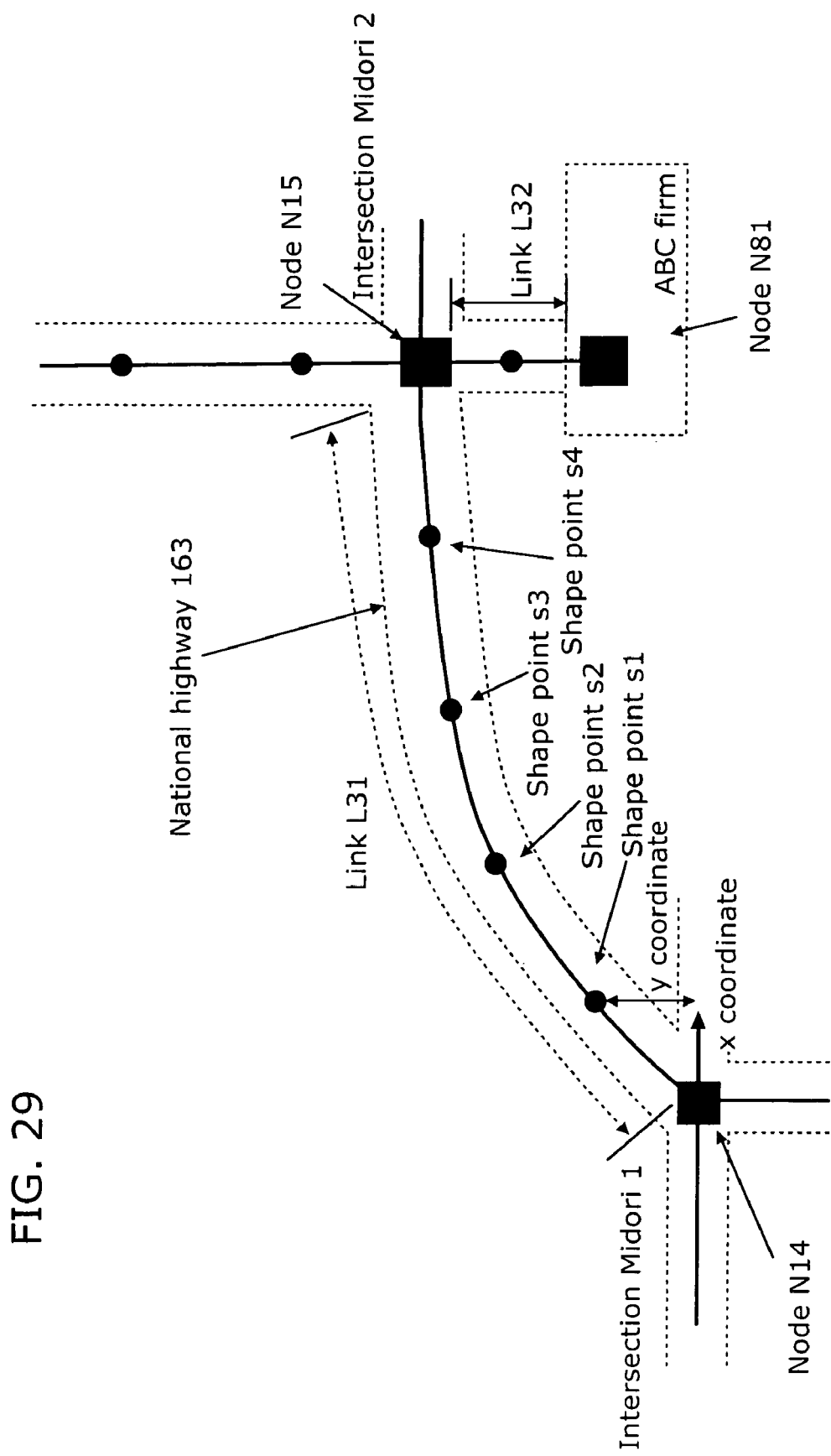
FIG. 29 is a diagram describing a link in the map information.

FIG. 29 is a diagram showing route information of the mesh ID "M41" of the map information shown in FIG. 28. An intersection "Intersection Midori 1", a landmark "ABC firm", and a road "National highway 163" are shown in the mesh ID "M41" in FIG. 29. The route information of map information is expressed by a network configuration showing the road information with nodes, links and the like. For example, intersections, landmarks, and the like are expressed by nodes (square points in FIG. 29). In FIG. 29, the intersection "Intersection Midori 1" is expressed by a node ID "N (node) 14", and the landmark "ABC firm" is expressed by a node ID "N81". Furthermore, the black thick line in FIG. 29 is a link which connects a node to a node, and follows a center line on the road. In FIG. 29, the road "National highway 163" which connects the node ID "N14 (Intersection Midori 1)" to "N15 (Intersection Midori 2)" is expressed by a link ID "L (link) 31". Furthermore, this link has a "shape point" showing a shape. The shape point has coordinates "x and y coordinates" for expressing a shape of the link (for example, the coordinates of an absolute value with respect to a certain node, and the number of the shape points varies depending on the length and complexity of the link. For example, the link ID "L31 (National highway 163)" has 4 shape points, such as a shape point "s (shape) 1" and "s2", and with these shape points, a curve of the link ID "L31" is expressed.

Figure 30:
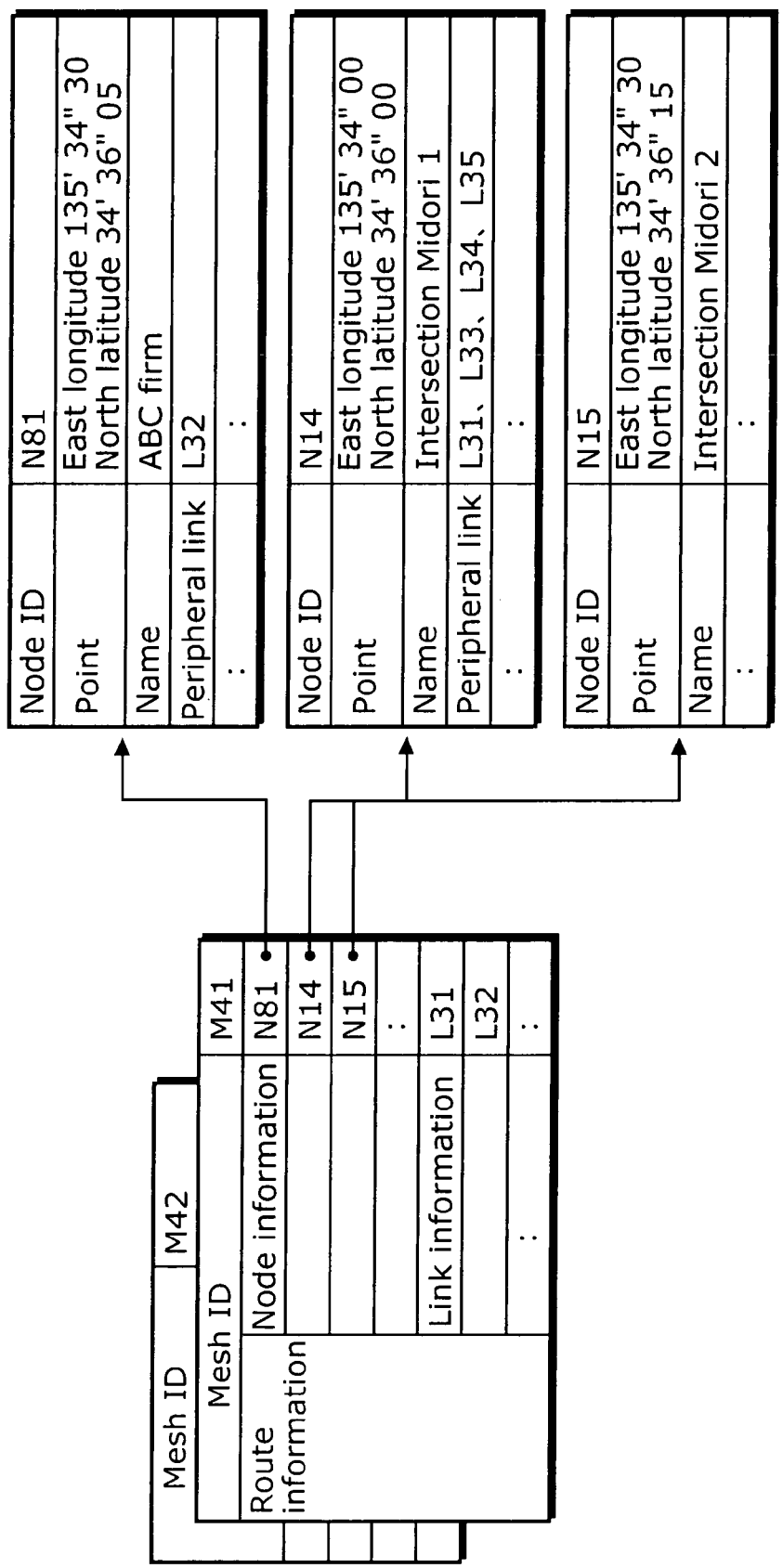
FIG. 30 is a diagram describing node information in the map information.

FIG. 30 is a diagram showing node information of route information in the mesh ID "M41". In the mesh ID "M41", node IDs, such as "N14", "N15", and "N81" are present as the node information, and for example, detailed information of each node is listed (indicated by an arrow in FIG. 30), and is stored in each node ID, such as, in the case of N81, the node ID name "ABC firm", the point of longitude 135 degrees 34 minutes 30 seconds east and latitude 34 degrees 36 minutes 05 seconds north, and a peripheral link "L32".

Figure 31:
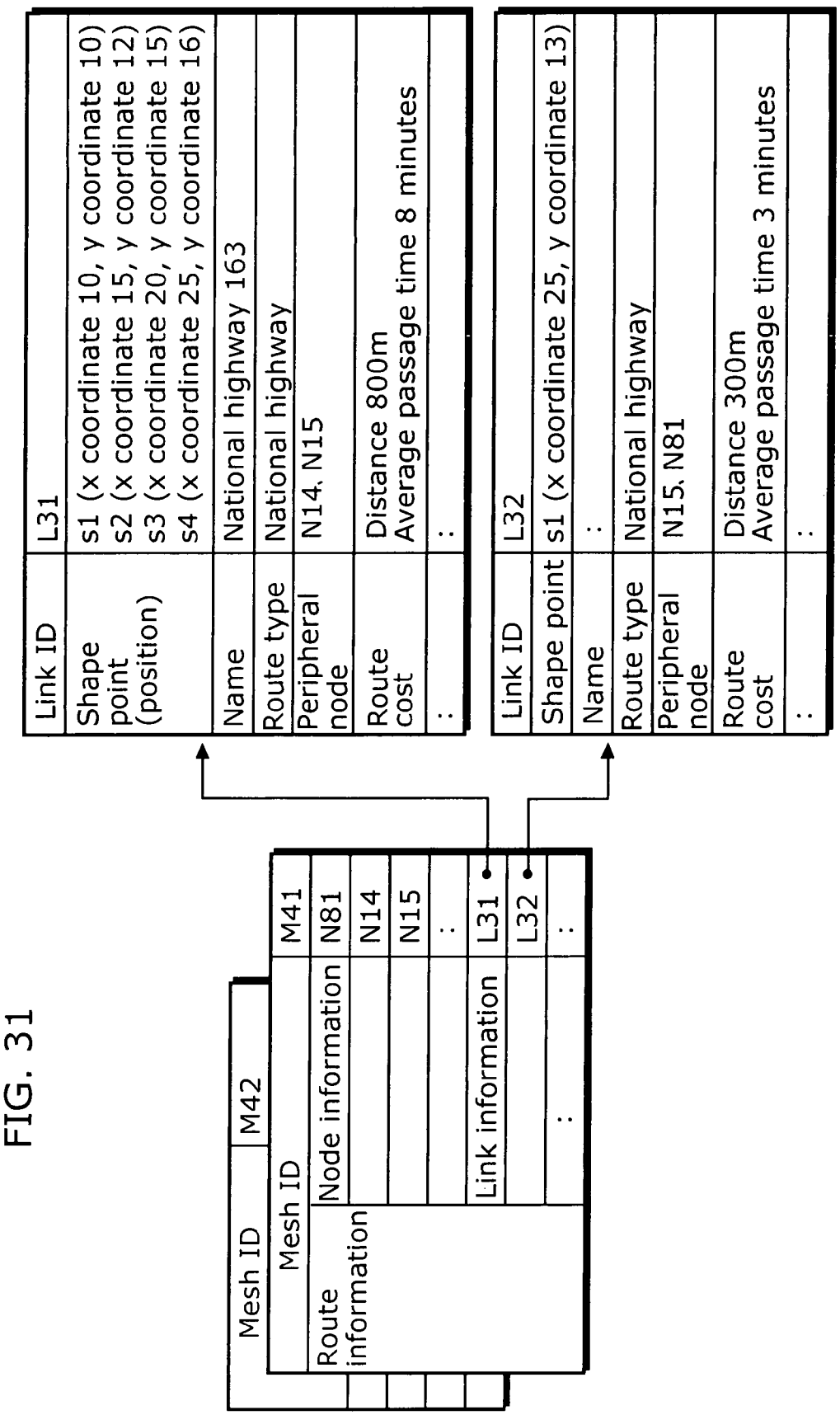
FIG. 31 is a diagram describing link information in the map information.

FIG. 31 is a diagram showing the detailed information of links. As link information, link IDs, such as "L31" and "L32" are present, and furthermore, the detailed information of each link is indicated, for example, in the case of L31, the link name "National highway 163", the shape point and the coordinates "s1 (x coordinate 10, y coordinate 10)", the peripheral nodes expressing the ends of the link "N14, N15", and the like. Furthermore, information, such as an entire distance of a link "800 m" and average time required to pass the link "8 minutes", is stored as route cost information used for searching for a route and the like. Furthermore, a route type, such as "National road" is included as the link information in the present embodiment. As such, the route information is generally stored with the network configuration of links which respectively connects a node to a node. In the present embodiment, it is assumed that the map information provided by each map information provider is stored with such network configuration, and each ID is shared. On the other hand, it is assumed that each provider independently uses different attribute information attached to each node and link, and with this attribute information, the properties of each map become different from one another. Hereinafter, the map of each provider is described using specific examples.

The first update map information providing unit 108 and the second update map information providing unit 109 are Web servers and the like which provide update map information. Here, the first update map information providing unit 108 is assumed to be a unit which provides general map information prioritizing main roads (hereinafter, referred to as "general map information"), whereas the second update map information providing unit 109 is assumed to be a unit which provides exclusive map information for those who uses not only main roads but also detours (hereinafter, referred to as "exclusive map information").

Figure 32:
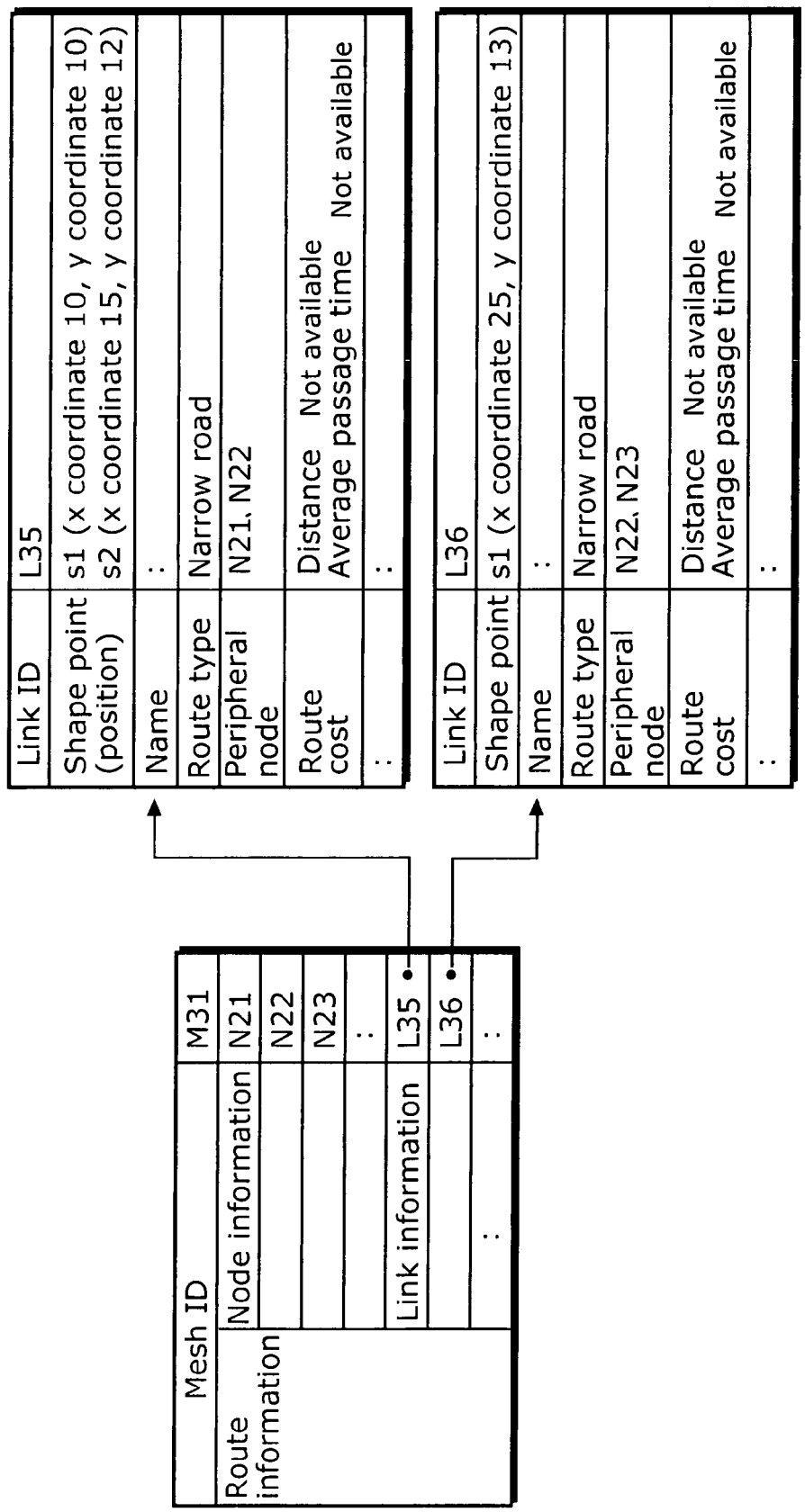
FIG. 32 is a diagram showing an example of map information provided by the first update map information providing unit.

FIG. 32 is a diagram showing an example of the general map information of the mesh ID "M31" which is stored in the first update map information providing unit 108. The details of the link information are indicated in the route information of the mesh ID "M31". For example, the route type of the link ID "L35" is a "narrow road", and nodes "N21", "N22", and the like are stored as the peripheral nodes. Note that the distance "Not available" and average passage time "Not available" are specified as the route cost information used for searching for a route and the like. Here, the cost information for route searching is used when searching for a route. For example, generally, the Dijkstra method is used for calculating the shortest route and the like, using the present cost information. However, since no cost information regarding narrow roads is present or such information is not used even when it is present in the general map information, generally, the present information is not used for calculating the shortest route. In other words, although "narrow roads" are present on a map, main roads and wide roads are generally used for searching for a route, and "narrow roads" are not used. Thus, as they are not used for route searching, "Not available" is specified.

Figure 33:
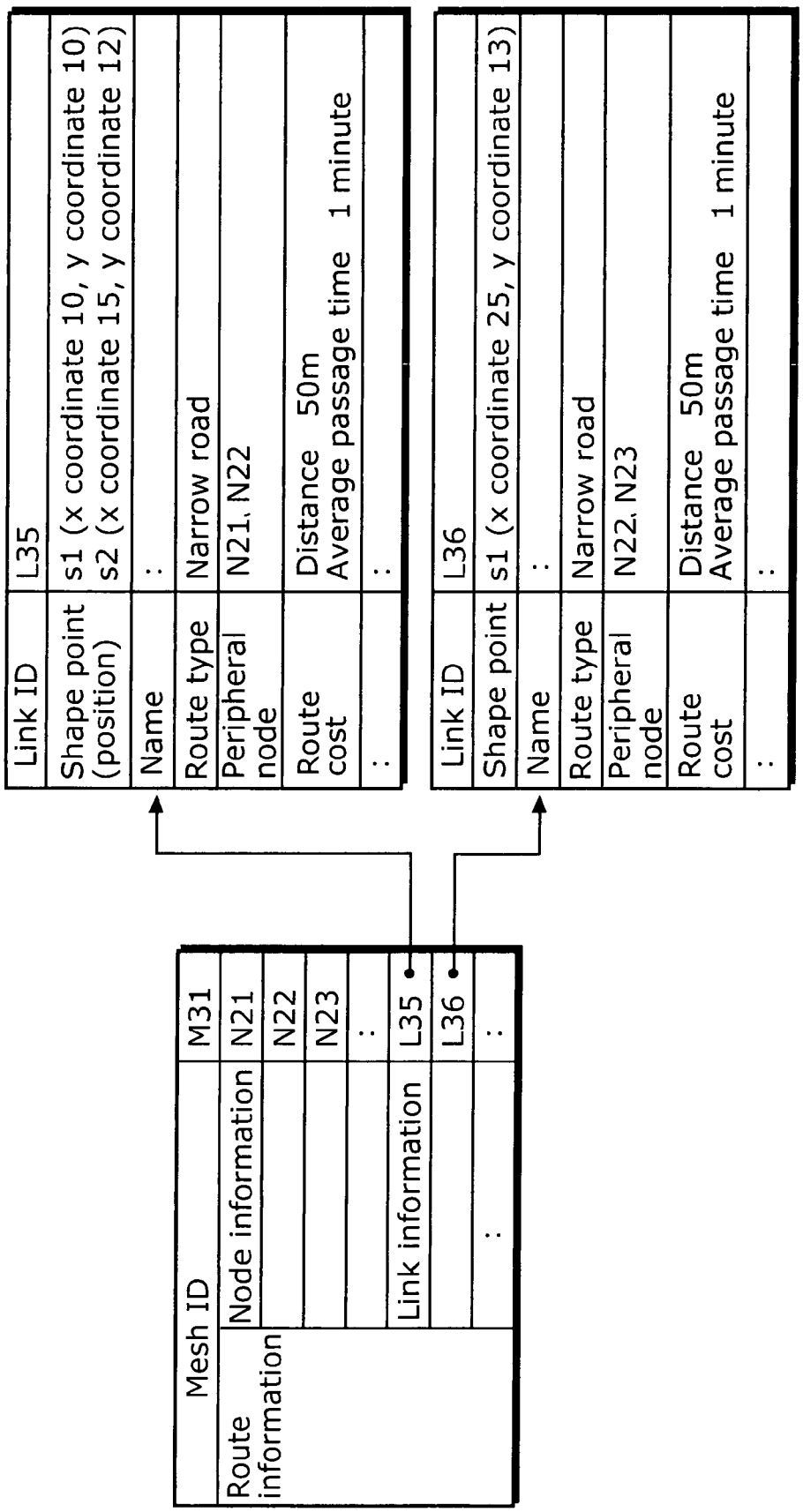
FIG. 33 is a diagram showing an example of map information provided by the second update map information providing unit.

On the other hand, FIG. 33 is a diagram showing an example of exclusive map information of the same mesh ID "M31" which is stored in the second update map information providing unit 109. In the map information shown in FIG. 33, cost information, such as distance "50 m" and average passage time "1 minute" are stored for route searching of link ID "L35" which is the same narrow road, and the information is different from the general map information stored in the first update map information providing unit 108. Thus, "narrow roads" are used for route searching. In other words, since not only main roads but also those "narrow roads" are used, such information is regarded as exclusive map information for those who uses detours (exclusive map information). In the present embodiment, the mobile terminal 100a appropriately selects either of the general map information or exclusive map information, based on the movement histories. Hereinafter, the method of selecting such map information is described using the movement histories.

The movement history storage unit 102 is a memory and the like which stores the movement histories of the user, and in the present embodiment, it stores node IDs of the departure point and destination of the user and the series of link IDs indicating the route to the destination. The node information extracting unit 111 extracts nodes and links, using the map information stored in the map information storage unit 103.

Figure 34:
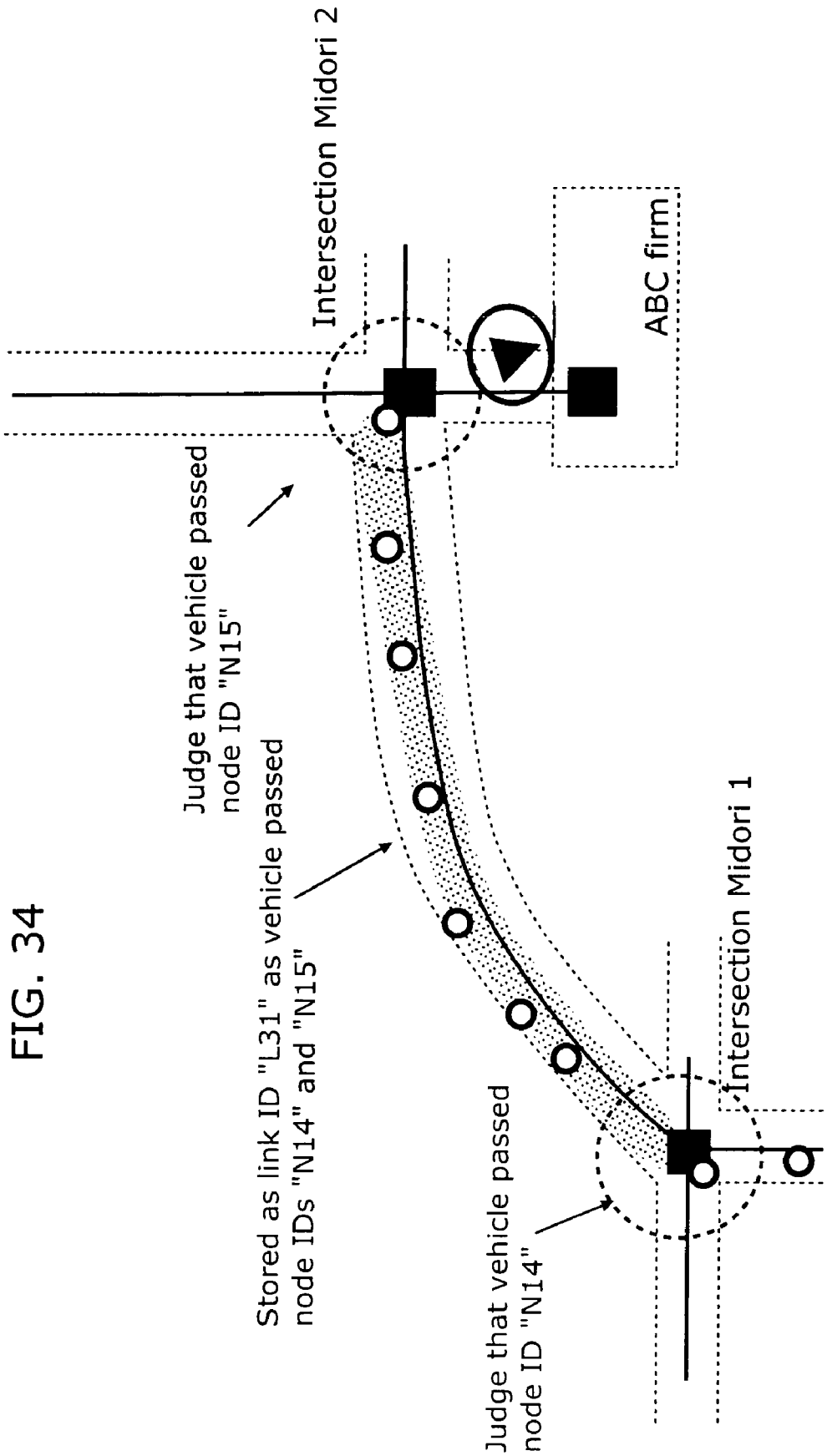
FIG. 34 is a diagram describing the processing of extracting nodes.

FIG. 34 is a diagram showing the mesh ID "M41". In FIG. 34, the white circles indicate position information detected by the position information detecting unit 101 as in the first embodiment. This shows that the user is passing "Intersection Midori 1" and "Intersection Midori 2" and is driving to ABC firm. On the other hand, position information, such as Intersection Midori 1, Intersection Midori 2, and ABC firm are stored as map information, and based on these, the node information extracting unit 111 extracts node IDs. For example, the node located in the periphery (for example, within a 50-meter radius) of the point where the engine has been stopped is assumed to be the destination as in the first embodiment. Likewise, the node in the periphery of the point where the engine has been started is assumed to be the departure point. Furthermore, nodes are judged to be passing nodes when the vehicle passes a predetermined range (for example, within a 50-meter radius) from the point of each node present in the route information.

The node information extracting unit 111 identifies the passing links from the end nodes of the passed nodes, and stores them as a driving route. For example, since the position information is present within the predetermined range (50-meter radius) with respect to the node ID "N14 (Intersection Midori 1)", it is judged that the vehicle has passed the node ID "N14". Likewise, it is also judged that the vehicle has passed the node ID "N15 (Intersection Midori 2). Thus, since it is assumed that the vehicle has passed the link ID "L31 (National highway 163) which includes the node IDs "N14 (Intersection Midori 1)" and "N15 (Intersection Midori 2)" at the ends of the link, and the series of the passing link IDs are stored as the movement histories.

FIG. 35 is a diagram showing an example of the movement histories which are stored in the movement history storage unit 102. The movement history storage unit 102 stores the departure points and destinations extracted in the aforementioned method, and the passed routes. For example, a movement history ID "001" indicates the departure point "N100 (home)", and indicates that the vehicle has passed the routes, such as "L11" and "L12", and has moved to the destination "N81 (ABC firm)".

Furthermore, the node information extracting unit 111 stores a "route type" in the movement history storage unit 102 as the movement history in present embodiment. For example, the link ID "L11" corresponds to the route type "narrow road", and the node information extracting unit 111 stores the link ID "L11" as the movement history in which the "narrow road" has been used.

Figure 36:
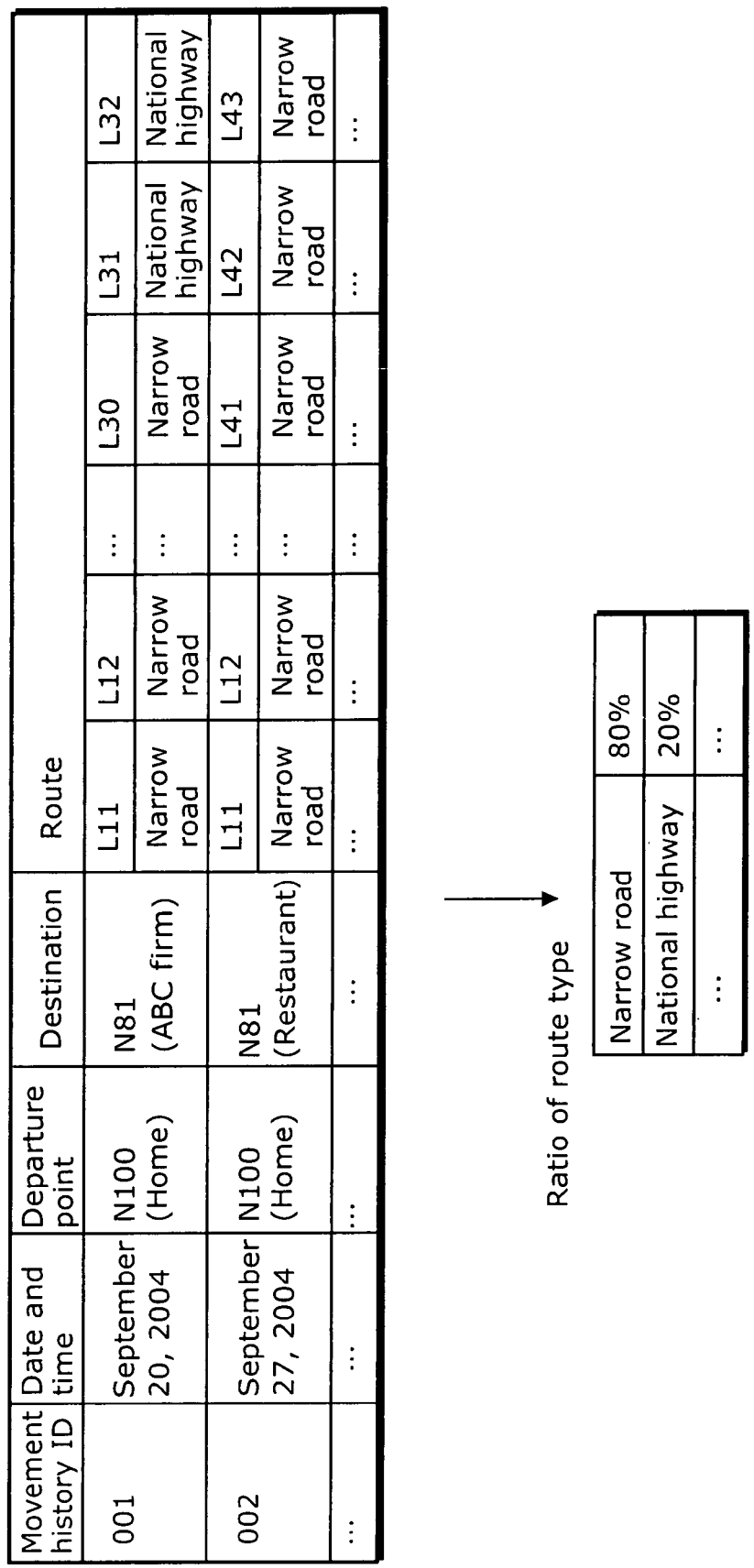
FIG. 36 is a diagram describing the processing of judging the route type from the movement histories.

The route type extracting unit 112 is a processing unit which extracts a type of a route to be used by the user based on the movement histories stored in the movement history storage unit 102. This route type extracting unit 112, for example, calculates the ratio (use ratio) of a route type "narrow roads" to total routes in all link IDs of the movement histories. For example, in the example shown in FIG. 36, as the number of "narrow roads" including the link "L11" is eight in the total link number 10, the ratio is 80 percent (8/10). Here, the threshold (for example, 60 percent) is provided, and when the calculated ratio is equal to or more than the threshold, it is judged that the user preferentially uses narrow roads. Then, since the user preferentially uses narrow roads, the user selects the map in which narrow roads are preferentially used in the update map information, in other words, the exclusive map information. In other words, the map information selecting unit 104 selects and obtains, from the first update map information providing unit 108 and the second update map information providing unit 109, the update map information corresponding to the route type extracted in the route type extracting unit 112.

Figure 37:
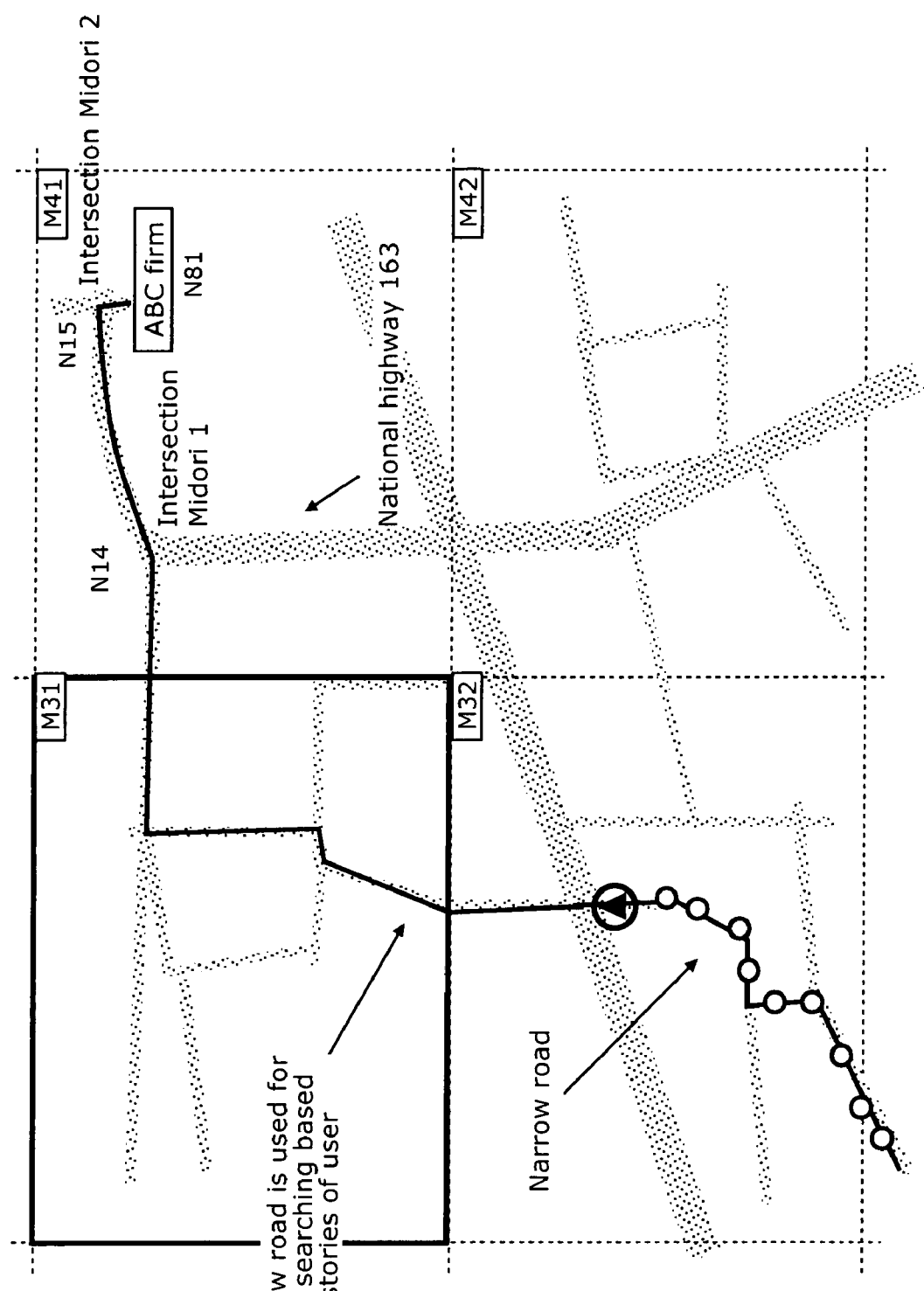
FIG. 37 is a diagram describing an example of map information combined and displayed using the second update map information.
Figure 38:
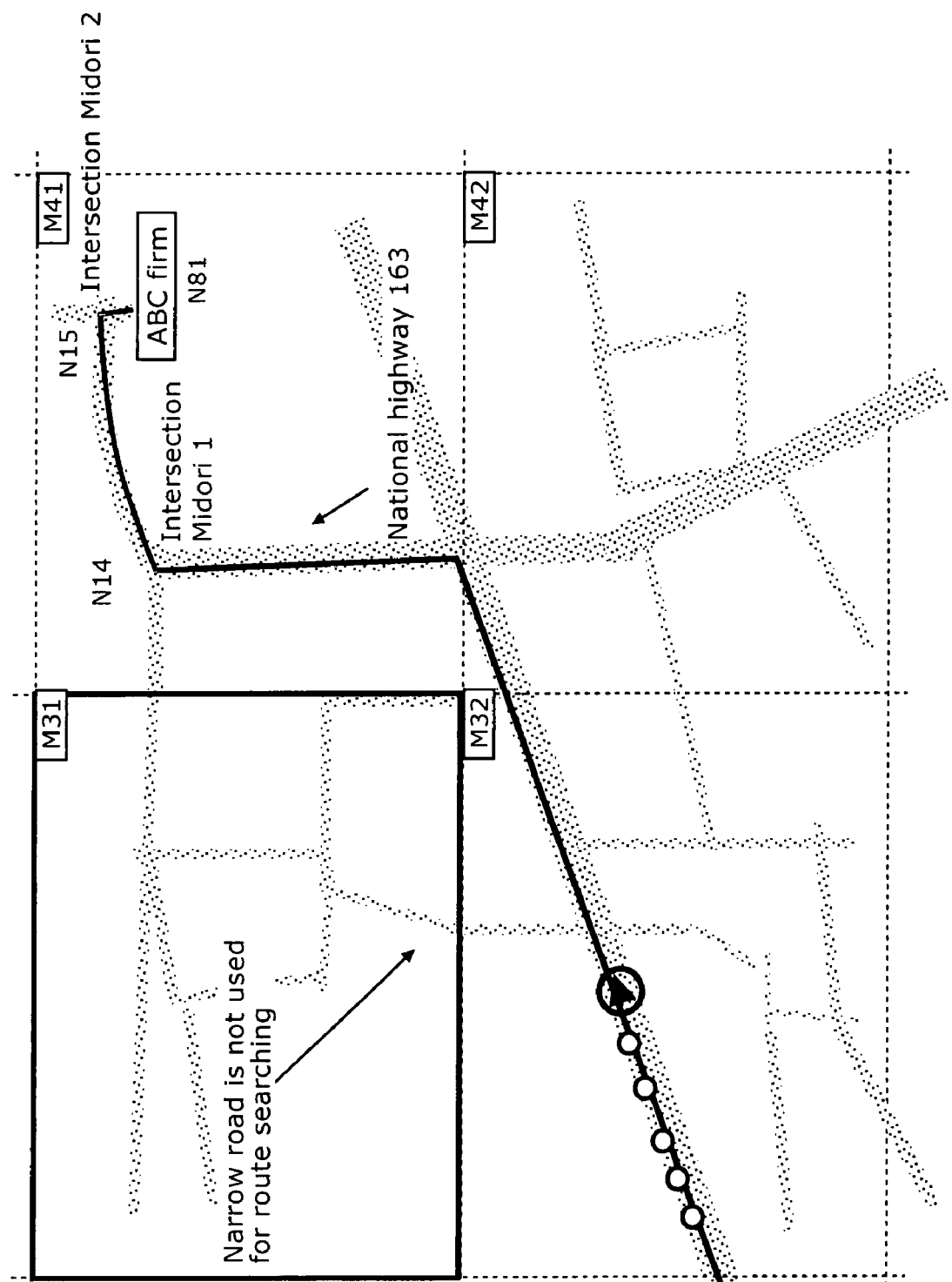
FIG. 38 is a diagram describing an example of map information combined and displayed using the first update map information.

When a route is searched for, or a new road has been added and the information is used, information indicating that narrow roads are normally used can be used in a new map by selecting the exclusive map information. For example, as shown in FIG. 37, it is indicated that the exclusive map information is selected and updated in the mesh ID "M31" according to the movement history in which narrow roads are normally used, and in searching for a route, such information is used, and a route is set, giving a high priority to narrow roads. With this, as shown in FIG. 38, according to the movement history in which relatively wide roads, such as "national roads" are normally used, it is indicated that general map information is selected and updated in the mesh ID "M31", and in searching for a route, a route is set, giving a high priority to general roads.

Generally, in order to support every user, mobile terminals, such as car navigation systems, store the same information and the setting is fixed. For example, as mentioned above, generally, main roads are prioritized in searching for a route. On the other hand, the driving tasks of the user vary, and the map information varies depending on the regions and the like. In the environment where plural map information are provided, there are growing needs to customize such map information corresponding to the user. In the present embodiment, it becomes possible to update map information and customize it without complicated operations of the user, based on the normal use states of the user.

Note that although the information "narrow roads" shown in the present embodiment is route information given in advance in the map information, the information is not limited to such. For example, there are cases where information indicating a road width of a route, such as "equal to or larger than 3 meters but less than 5.5 meters" is given in the map information. With such information of a road width, it is possible to automatically judge a type of map information. In addition, it is possible to use traffic regulation information. For example, when a route is one-way street among routes having the same road width, it is relatively easy to pass because there is no oncoming vehicle in the street. With this, it is possible to provide map information more suitable for the user who circumvents general roads and national roads in which a traffic jam normally occurs and selects the aforementioned one-way streets.

Furthermore, not only the route information but also the landmark information shown in the first embodiment can be used for normally judging routes which the user prefers. For example, the number of passed intersections and the like can be used. It is also possible to provide the exclusive map information shown in the present embodiment for the user who selects a detour in order to avoid stoplights.

Note that although the route types are stored at the same time when the movement histories are stored in the present embodiment, the route type may be extracted later based on the movement histories and the map information stored in the map information storage unit 103.

Next, the operations of the mobile terminal 100a according to the present embodiment are described using the flowcharts in FIGS. 40 to 46.

Figure 40:
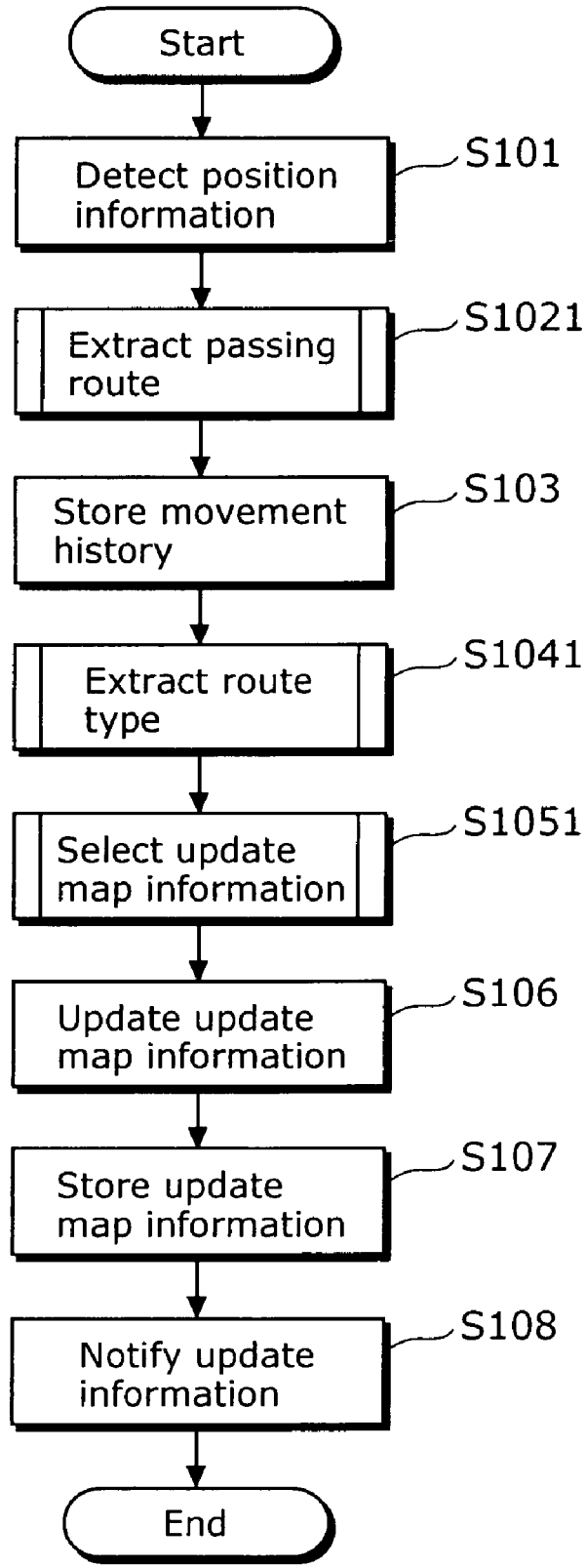
FIG. 40 is a flowchart showing the operation of the mobile terminal.
Figure 41:
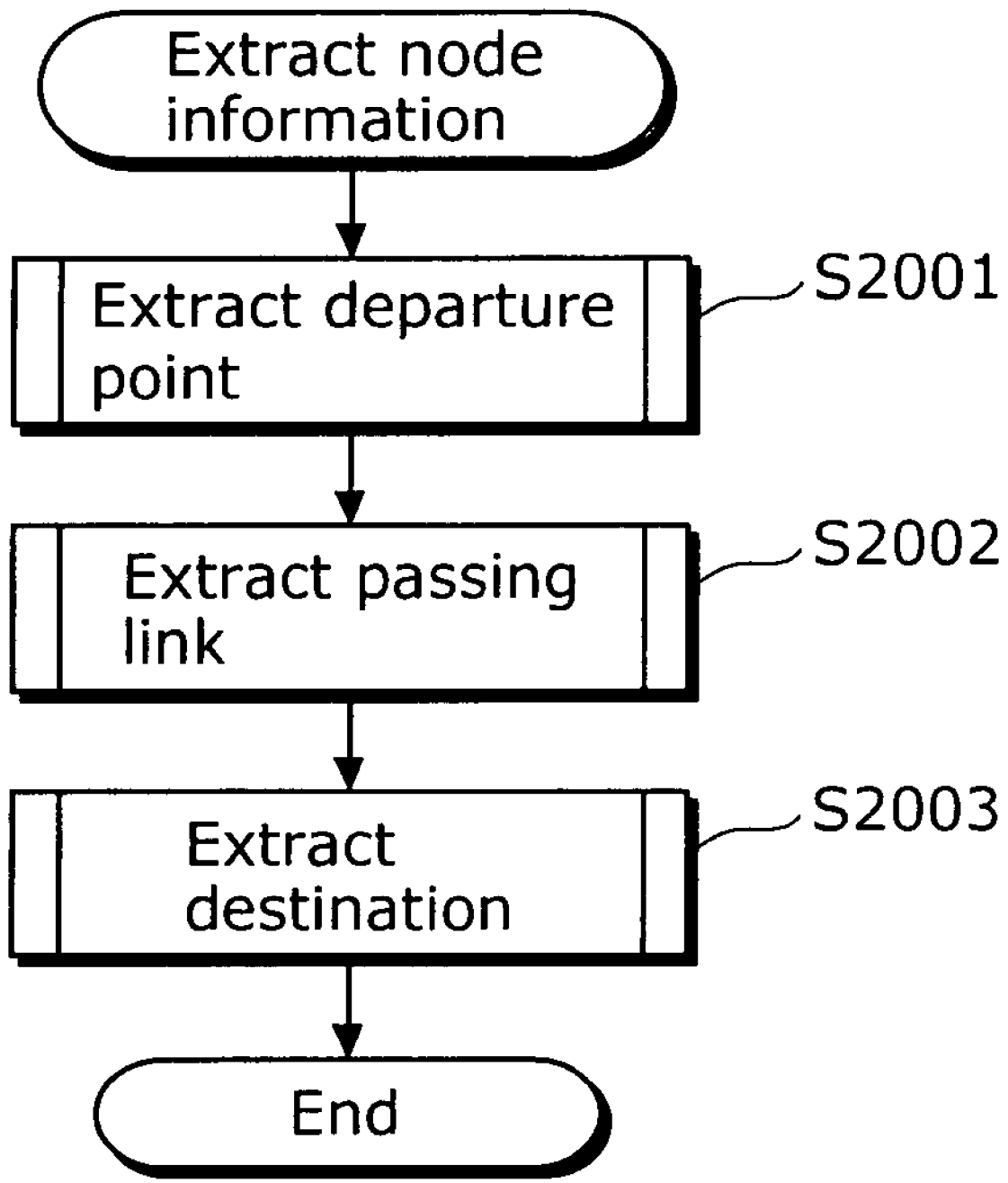
FIG. 41 is a flowchart showing the details of Step S1021 in FIG. 40.
Figure 42:
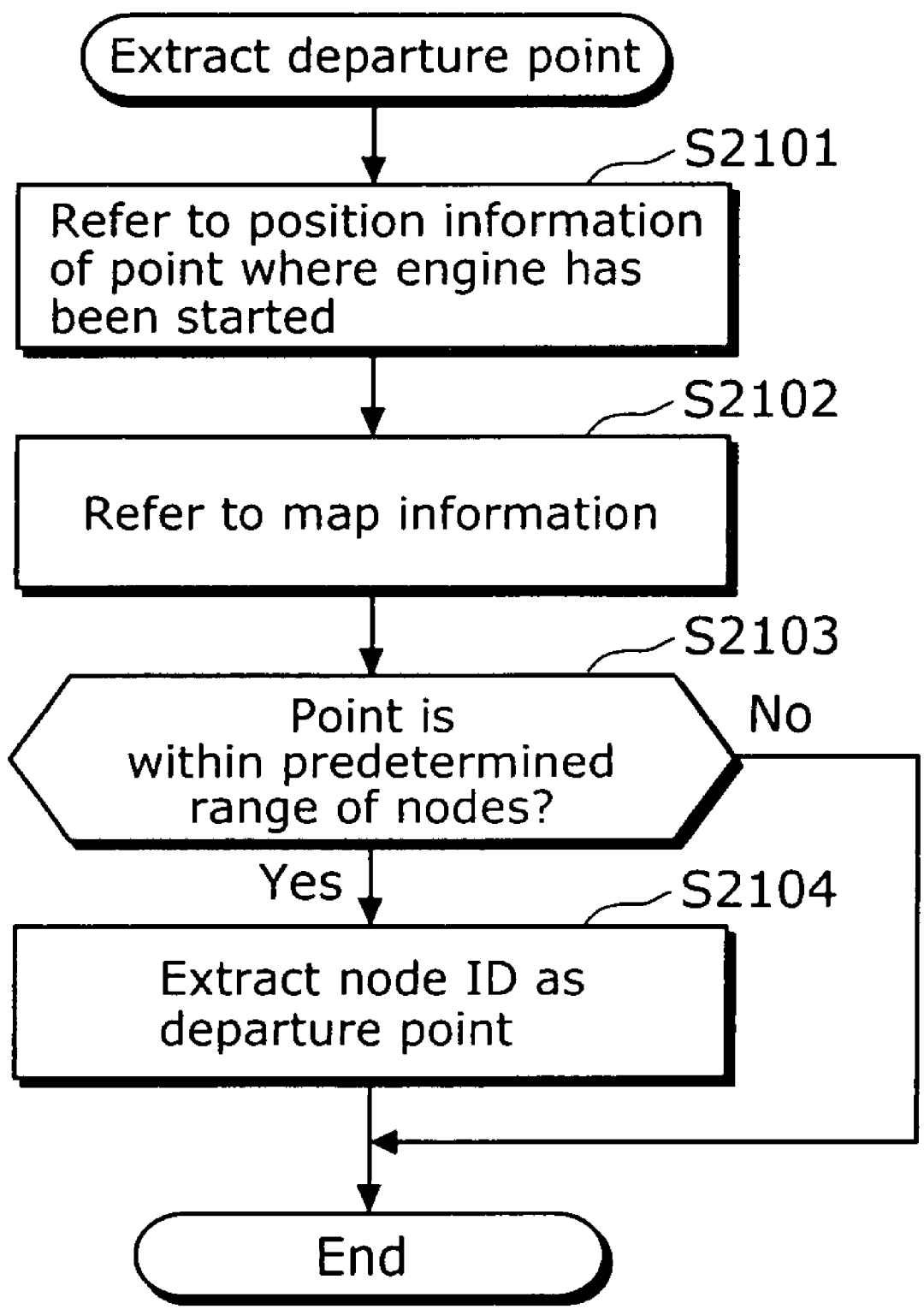
FIG. 42 is a flowchart showing the details of Step S2001 in FIG. 41.
Figure 43:
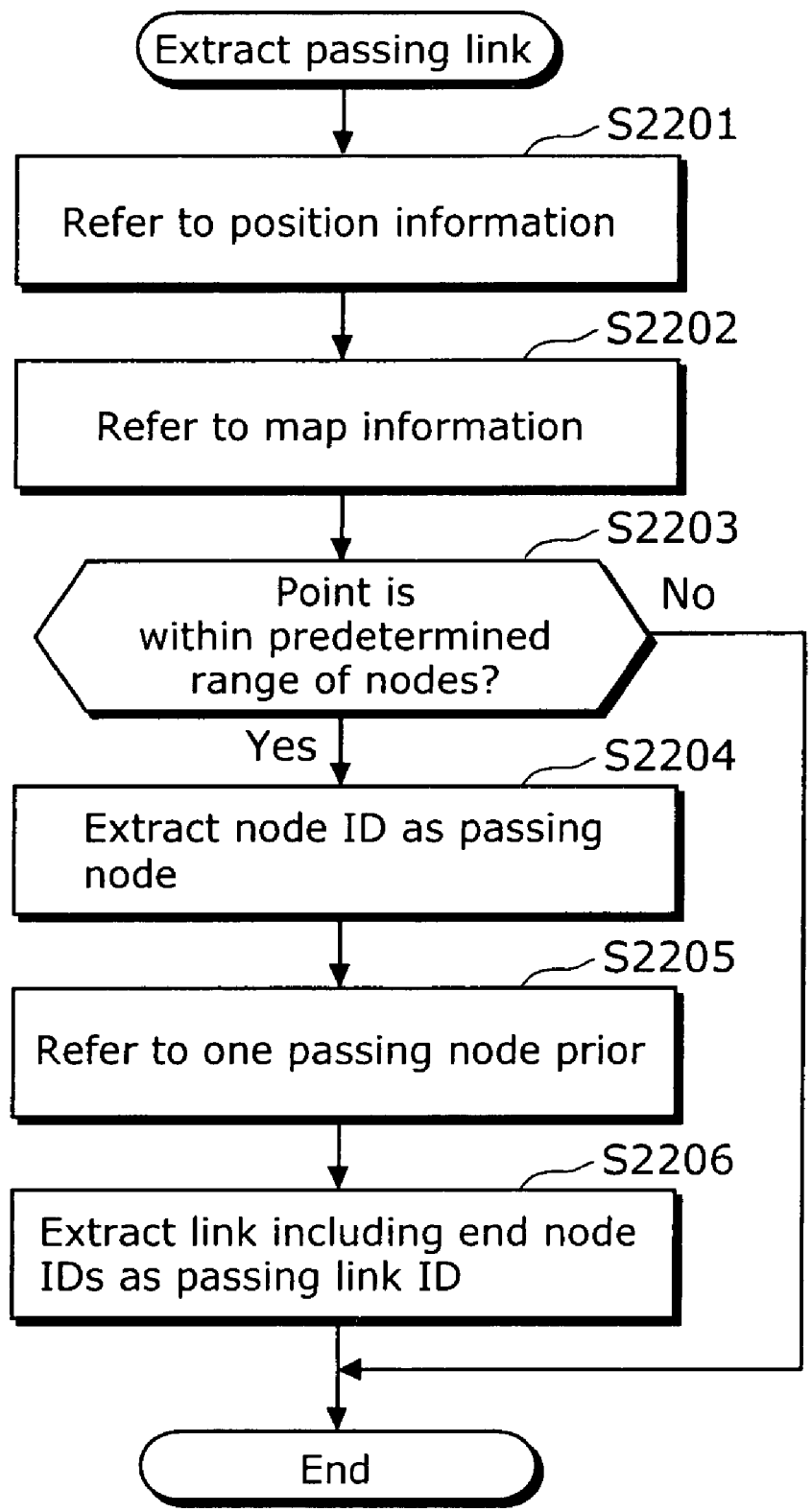
FIG. 43 is a flowchart showing the details of Step S2002 in FIG. 41.
Figure 44:
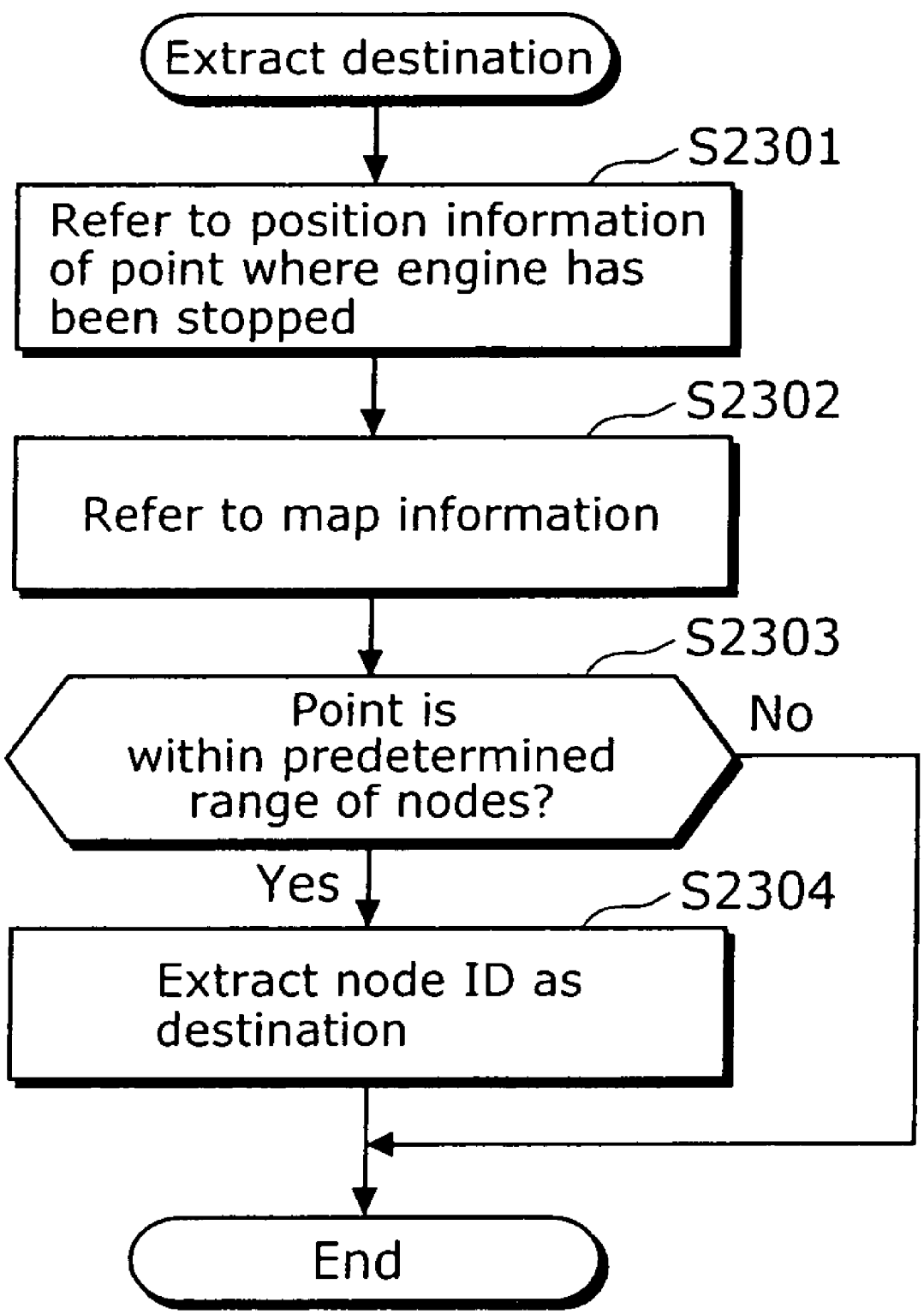
FIG. 44 is a flowchart showing the details of Step S2003 in FIG. 41.
Figure 45:
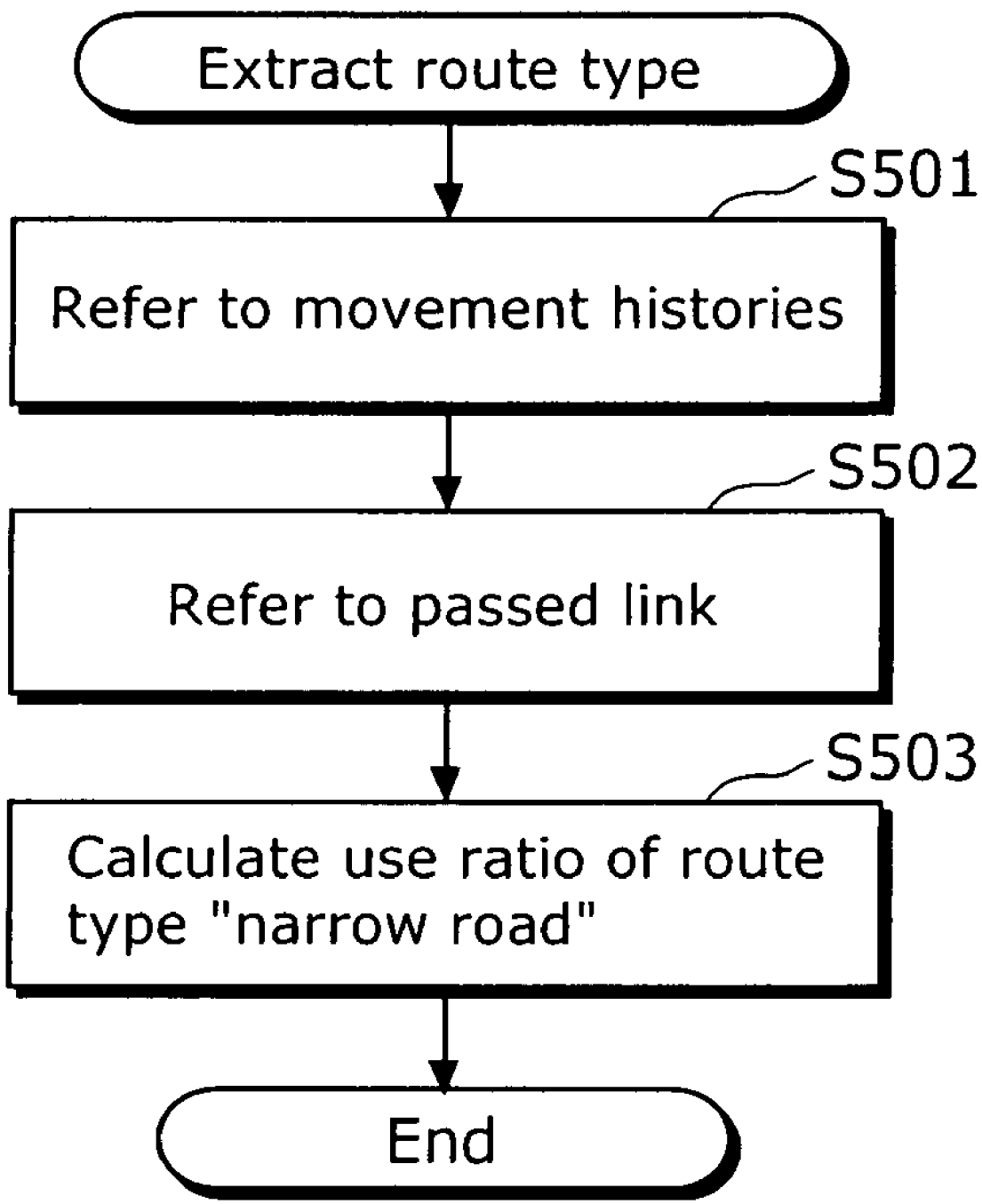
FIG. 45 is a flowchart showing the details of Step S1041 in FIG. 40.
Figure 46:
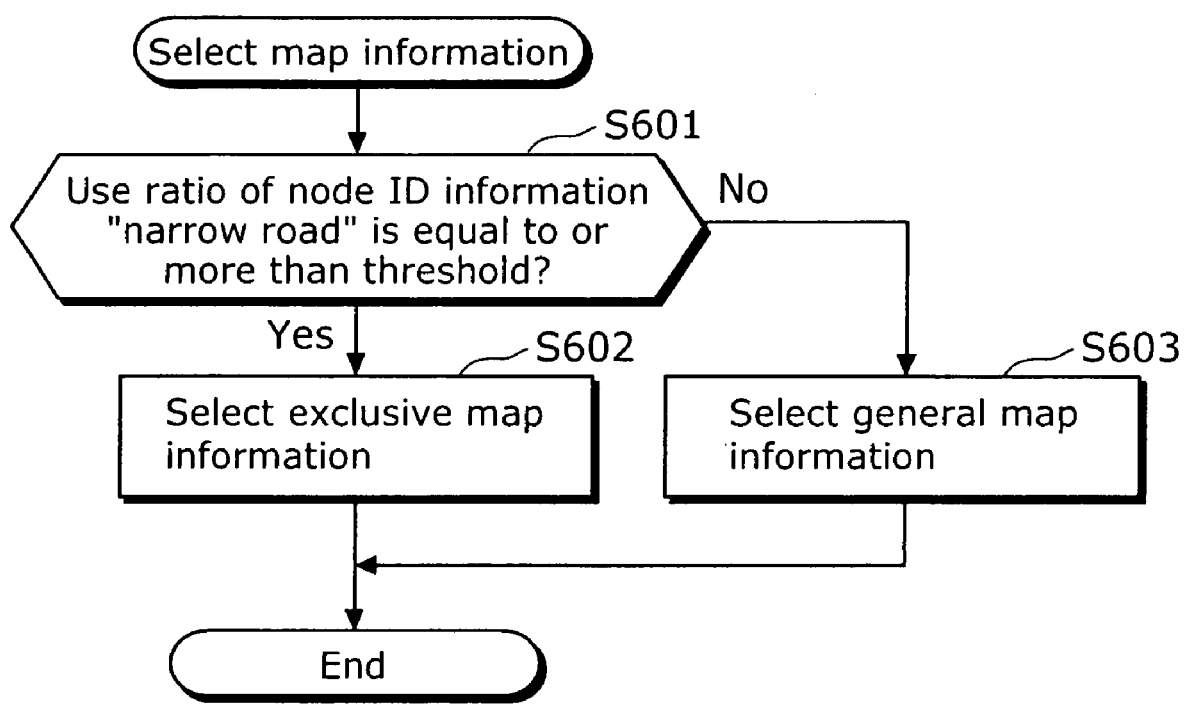
FIG. 46 is a flowchart showing the details of Step S1051 in FIG. 40.

First, the position information detecting unit 101 detects a current location (Step S101 in FIG. 40).

Next, the node information extracting unit 111 extracts a passing route with the series of links from the nodes of the departure point and the destination, based on the detected position information (Step S1021). More specifically, the node information extracting unit 111 extracts, as the extraction of node information, a departure point (Step S2001 in FIG. 41), passing links (Step S2002), and a destination (Step S2003).

For extraction of the departure point, the node information extracting unit 111 first refers to the position information of the point where the engine has been started (Step S2102 in FIG. 42), and refers to the map information (Step S2102). Then, the node information extracting unit 111 judges whether or not the point is within a predetermined range of the position information of the nodes (for example, within a 50-meter radius) (Step S2103). In the case where it is within the predetermined range (Yes at Step S2103), the node ID is extracted as the departure point (Step S2104).

The node information extracting unit 111 extracts passing links from the end passing nodes. First, as in the extraction of the destination, the node information extracting unit 111 refers to each position information (Step S2201 in FIG. 43) and the map information as in the extraction of the destination, and judges whether or not the passing links are present within a predetermined range of the nodes (for example, within a 50-meter radius), and in the case where it is within the predetermined range (Yes at Step S2203), the node IDs become the passing nodes. Next, the node information extracting unit 111 refers to the passing node one passing node prior (Step S2205) and extracts, as the passing link, the link including the end link IDs (Step S2206). For example, in FIG. 34, the node ID "N15" is extracted as the passing node ID. The prior node ID is "N14", and the both nodes, in other words, the link ID "L31" including "N14" and "N15" becomes the passing link. Note that the ends of the link are stored in the link information, and it is possible to judge a passing link using the information (according to FIG. 31).

For extraction of the departure point, the node information extracting unit 111 refers to the position information of the point where the engine has been stopped (Step S2301 in FIG. 44), and refers to the map information (Step S2302).

Then, the node information extracting unit 111 judges whether or not the point is within a predetermined range of the nodes (for example, within a 50-meter radius) (Step S2303). In the case where it is within the predetermined range (Yes at Step S2303), the node ID is extracted as the destination (Step S2304).

Next, the node information extracting unit 111 stores the obtained departure point, the destination, and the route in the movement history storage unit 102 (Step S103 in FIG. 40). FIG. 35 shows the stored movement histories. Furthermore, in the present embodiment, the link type "narrow roads" and the like is stored.

Then, the route type extracting unit 112 extracts a type of a route to be used by the user (Step S1041 in FIG. 40). More specifically, the route type extracting unit 112 refers to the movement histories stored in the movement history storage unit 102 (Step S501 in FIG. 45), and refers to each route (passed link) (Step S502). Then, the route type extracting unit 112 judges the type of the route of each link. In the present embodiment, the use ratio of the route type "narrow roads" for all nodes is calculated (Step S503). In the movement histories shown in FIG. 36, the use ratio 80 percent is calculated.

Next, the map information selecting unit 104 selects the map information based on the use ratio of the judged route type (Step S1051 in FIG. 40). More specifically, the map information selecting unit 104 judges whether or not the calculated ratio is equal to or more than the threshold (for example, 60 percent) (Step S601 in FIG. 46). When it is equal to or more than the threshold (Yes at Step S601), the second update map information providing unit 109 selects the exclusive map information (Step S602). On the other hand, when it is less than the threshold (No at Step S601), the first update map information providing unit 108 selects general map information (Step S603).

In the case of setting a route, FIG. 37 shows an example in which exclusive map information is reflected when the exclusive map information is selected, while FIG. 38 shows an example in which general map information is reflected when the general map information is selected. As such, in the present embodiment, the map information is updated using the type of the update map information suitable for the user based on the route information.

Note that although the use ratio is calculated based on the number of route type "narrow roads" to the total number of all nodes in the present embodiment, the present invention is not limited to such a calculation method. For example, the use ratio may be calculated per prefecture, city, or area, and in an area where the use ratio of the "narrow roads" is high, an exclusive map may be selected, while in an area with the low ratio, general map information may be selected. For example, even when the user, whose driving skill is outstanding, normally uses "narrow roads", there are cases where it is necessary to update general map information in unfamiliar areas or remote regions. Accordingly, the use ratio per area may be calculated so as to control the selection of map information depending on the use ratio and the area.

Furthermore, although the selected map information is either the exclusive map information using detours and the like or general map information in the present embodiment, the present invention is not limited to such type of map information. For example, the exclusive map information may be the map information detailing restaurant information in which detailed restaurant information is stored, and the update map information may be selected based on the information stored in the movement histories, for example, categories of destinations in the histories. Alternatively, not only movement histories but also searching and browsing histories may be stored. Based on such histories, the preferences of the user may be judged, and the update map information suitable for the user may be selected.

Figure 39:
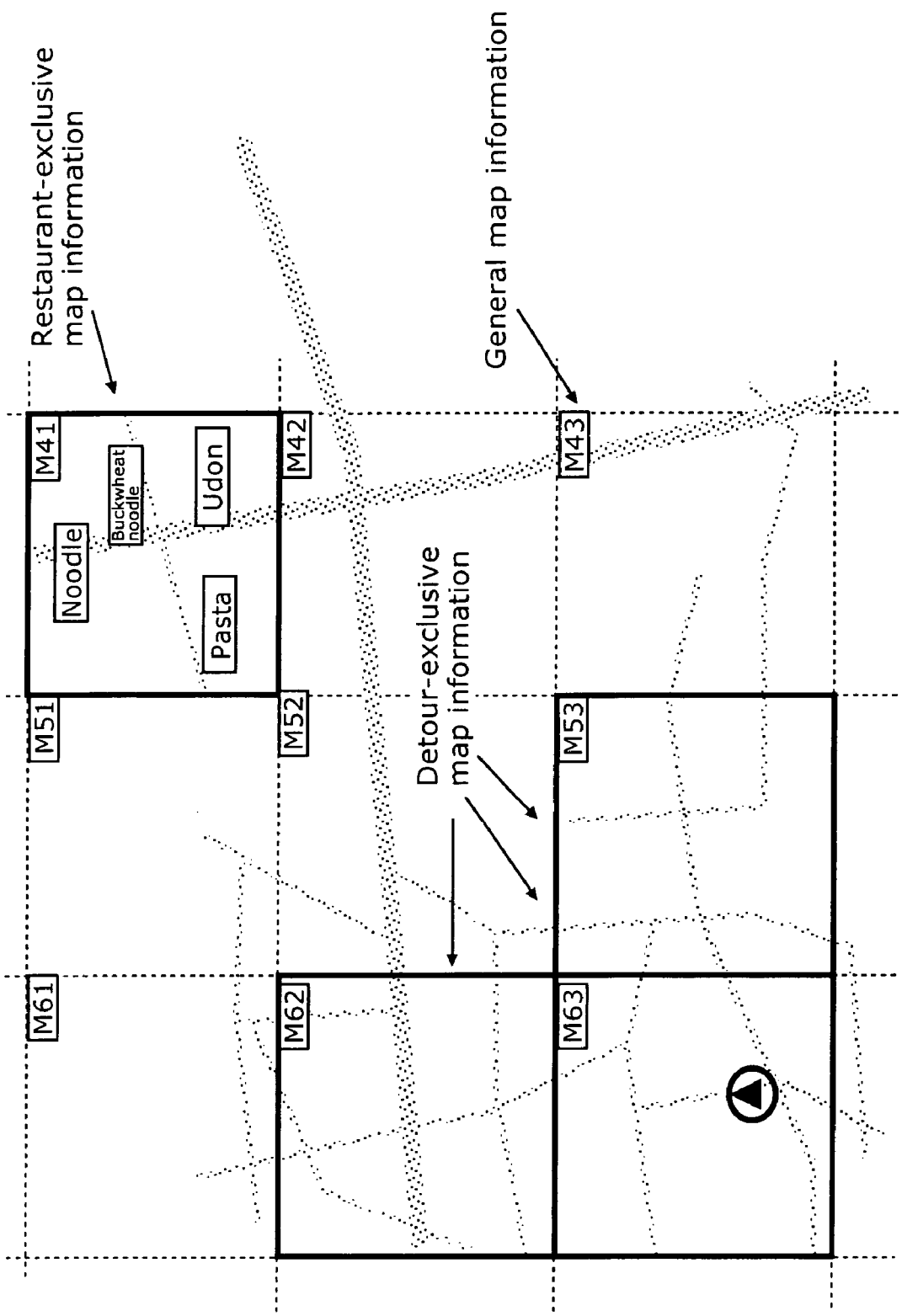
FIG. 39 is a diagram showing an example of map information in which plural map information are selected, combined and displayed.

FIG. 39 is a diagram showing an example in which characteristics of the user which are selected using the present embodiment are reflected in the map information. The restaurant-exclusive map information is selected in the mesh ID "M41", since the user normally uses restaurants, while the detour-exclusive map information is selected in the mesh IDs "M53", "M62", and "M63", based on the normal driving patterns of the user. As such, using the histories, it becomes possible to select the update map information in which the characteristics of the user are reflected.

Furthermore, the update map information may be selected based on the ratio of using predetermined map information and the use frequency. For example, as shown in FIG. 39, when detour-exclusive map information is relatively high in number, the map may be updated, by changing other general map information totally to detour-exclusive map information, automatically or in response to a request of changing the information. In this case, after changing the map, it is possible to return it to the original map information previously used. With this, in the environment where plural map information having various features are provided from each providing unit, although the preferences of the user varies, it becomes possible to automatically select the map information suitable for the user based on the histories of the user and to reflect the preferences based on the use frequency, use ratio, and the like. Furthermore, when plural map information are updated at each different time, the latest map information may be selected. For example, when new roads and landmarks are created, there are cases where each map information is to be provided at a different time for the update. In this case, when the exclusive map information which is provided by the second update map information providing unit 109 and which is normally used has not been updated, the latest general map information provided by the first update map information providing unit 108 may be obtained temporarily, and when the exclusive map information is updated, the general map information may be newly updated with the exclusive map information.

Third Embodiment

Next, the third embodiment of the present invention is described.

In the first embodiment, the information of landmarks, such as destination, is stored, and based on the information, the map information is selected. Furthermore, in the second embodiment, the movement histories of the user are stored, based on the histories, the type of the road normally used is judged, and the map information is selected using the information.

When a departure point and a destination are inputted, and a route is searched for using map information, there are cases where a route to be provided varies depending on the registered map information and the algorism of route searching. Furthermore, among routes guides, some of the guides are easy to understand for the user, whereas some are difficult to understand for the user. Thus, the present embodiment describes an example of automatically judging which map information should be used using the movement histories of the user and the route information to be provided, and selecting the map information.

Figure 47:
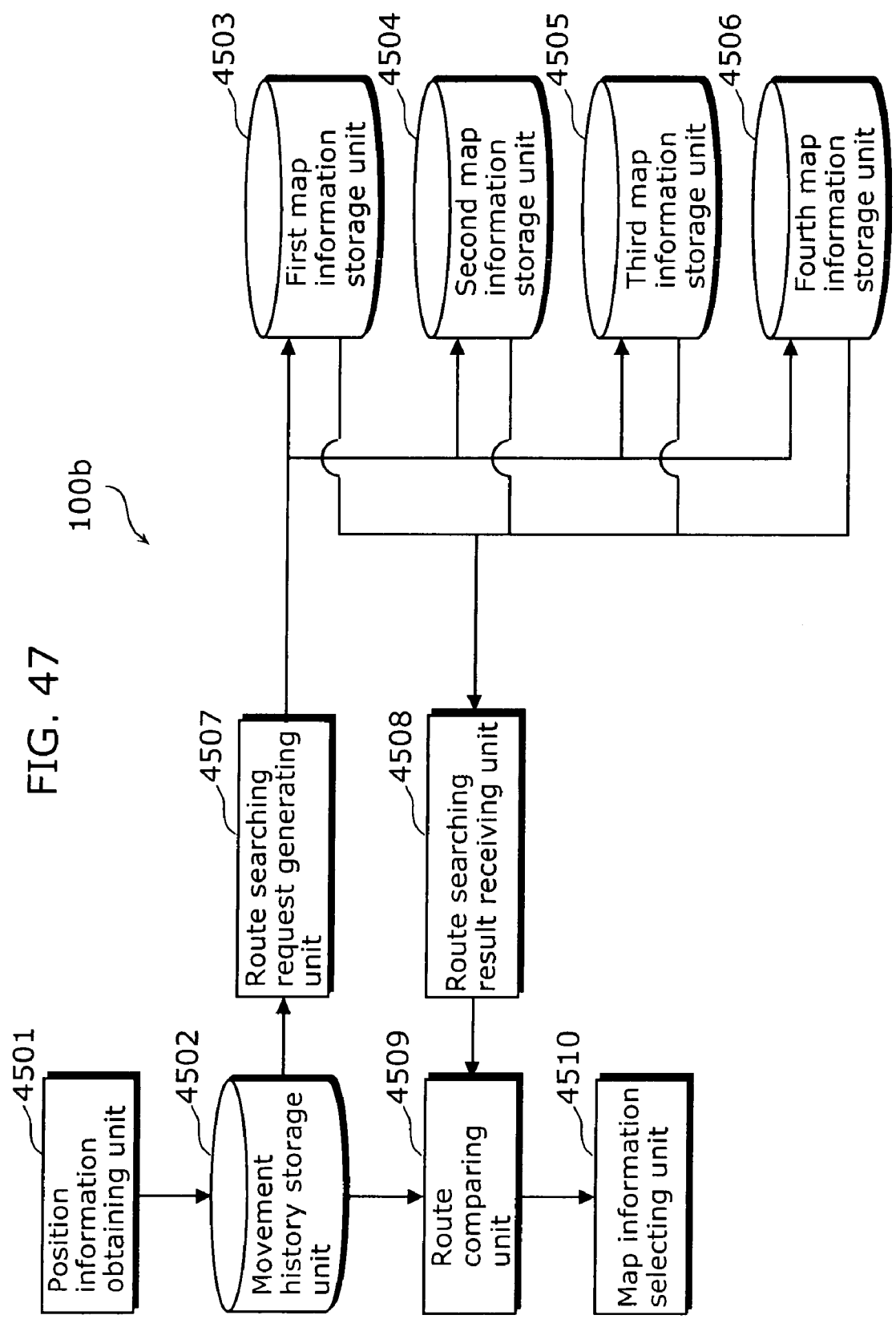
FIG. 47 is a block diagram showing the configuration of the mobile terminal according to the third embodiment of the present invention.

FIG. 47 is a functional block diagram showing the configuration of the mobile terminal 100b in the third embodiment of the present invention. This mobile terminal 100b is a device which selectively uses map information based on movement histories of the user and route information to be provided, and includes a position information obtaining unit 4501, a movement history storage unit 4502, a first map information storage unit 4503, a second map information storage unit 4504, a third map information storage unit 4505, a fourth map information storage unit 4506, a route searching request generating unit 4507, a route searching result receiving unit 4508, a route comparing unit 4509, and a map information selecting unit 4510.

The position information obtaining unit 4501 is a processing unit which obtains position information using a sensor, such as a GPS antenna as in the first and second embodiments.

The movement history storage unit 4502 stores, as the movement histories of the vehicle, the position information obtained by the position information obtaining unit 4501 in a medium, such as a hard disk. In the movement histories of the vehicle, values of latitude/longitude obtained by the position information obtaining unit 4501 are stored as time-series data of nodes, such as a node for an intersection. Furthermore, when an identifier is given to a route in road information, the information may be stored as a history of a route which the user has passed. For example, as shown in FIG. 48, it is assumed that information regarding the times at a departure point, a destination, and each point on a driving date are stored, in other words, information regarding the route to be passed from departing a departing point until reaching the destination is stored. In the movement history ID 001 of FIG. 48, the departure point, home, and the destination, the office, and the information of the routes, L099 and L105, are stored.

The first to fourth map information storage units 4503 to 4506 are web servers and the like in which plural map information respectively provided by X1, X2, X3, and X4 firms are stored. These first to fourth map information storage units 4503 to 4506 store cost information and the like per road in respective stored map information. Once departure and destination points are inputted, these units have functions of outputting predicted required time, information regarding routes to be passed from departing a departing point until reaching the destination, and the like.

The route searching request generating unit 4507 retrieves position information of a pair of a departure point and a destination from the movement histories stored in the movement history storage unit 4502, and searches for routes stored in the first to fourth map information storage units 4503 to 4506 using the position information. More specifically, as shown in FIG. 48, the pairs of departure points and destinations are searched in the stored history information, and the values of latitude/longitude of each point are retrieved. Then, routes which match the retrieved pairs of departure points and destinations are requested to each map information stored in the first to fourth map information storage units 4503 to 4506. The route comparing unit 4509 compares the obtained routes as described hereinafter, and the map information selecting unit 4510 selects an optimal route. To do that it is preferable that the routes which match the retrieved pairs of departure points and destinations are different from one another, depending on map information to be used. Thus, in the present embodiment, the route searching request generating unit 4507 selects a movement history in which the driving time is the longest, since selection of searched routes (variations) increases in the movement histories with longer driving times. In the example shown in FIG. 48, the map information selecting unit 4510 selects the movement history ID 006 with the longest time required. Note that when the calculation amount is small and calculation time (route searching time) is sufficiently short, in other words, when there are enough processing capacities in this mobile terminal 100b, all pairs of stored departure points and destinations may be selected, instead of the aforementioned selection criterion.

Figure 50:
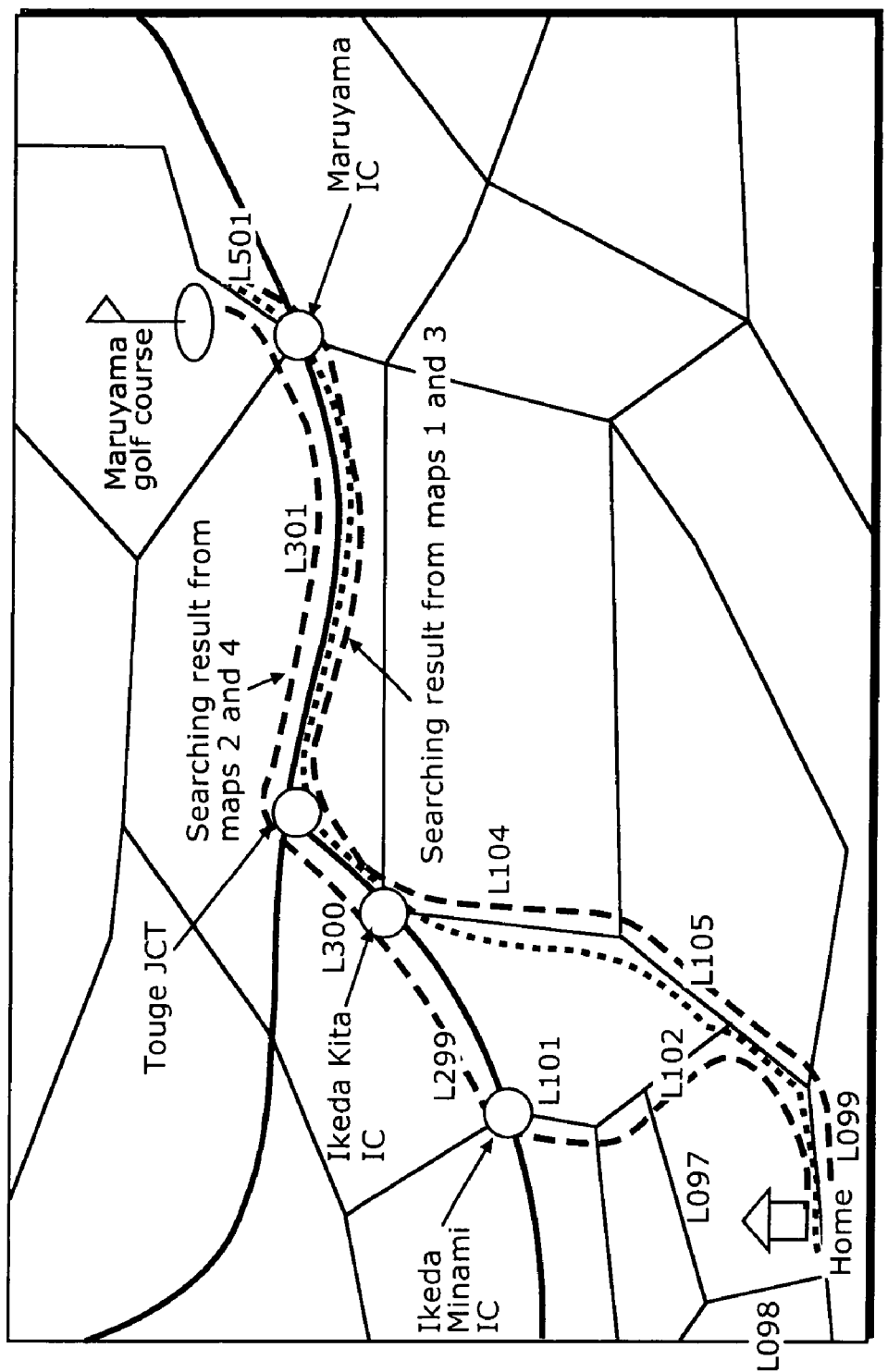
FIG. 50 is a diagram showing the result of route searching according to each map information.

The route searching result receiving unit 4508 is a communication interface and the like which receives a result of route searching using information of a pair of the departure point and destination selected by the route searching request generating unit 4507, based on the plural map information stored in the first to fourth map information storage unit 4503 to 4506. The result is shown in FIG. 49. FIG. 50 represents the result of route searching in FIG. 49 by showing the movement on a map.

When the departure point is home and the destination is Maruyama golf course in FIG. 49, L099, L105, L104, L300, L301, and L501 have been passed before reaching the destination according to the movement histories in FIG. 48. On the other hand, when the first and third maps are used, the same route as the actual driving route has been retrieved as the result of the route searching on the assumption that home is the departure point and Maruyama golf course is the destination, using each map information. On the other hand, when the second and fourth maps are used, although the searched result indicates the same departure point and the same destination, a different route is retrieved.

As shown in FIG. 50, according the first and third maps, the searching result shows that the route to Maruyama golf course is to take a toll highway from Ikeda Minami interchange (IC) or Ikeda Kita IC and get off the highway at Maruyama IC. This searching result is the result intending to reduce the use distance of toll highways and to save the toll fare, and corresponds to the actual driving route of the user (movement history). On the other hand, according to the second and fourth maps, as the object is to reach the destination in less time by taking a toll highway from an interchange in the vicinity of the home, the route result shows a route of taking the toll highway from Ikeda Minami IC.

The route comparing unit 4509 judges a matching feature of a driving route and time (matching or closeness) among routes having the same departure point and destination, based on the movement histories stored in the movement history storage unit 4502 and the searched result notified by the route searching result receiving unit 4508.

The map information selecting unit 4510 is a processing unit which selects map information in which the searched result is the closest to the actual driving route based on the result obtained in the route comparing unit 4509. More specifically, based on the comparison result in the route comparing unit 4509, the map information in which the driving route is the same as the actual route and the driving time is the closest to the time required for the actual driving route is selected from among the plural first to fourth map information. In the example shown in FIG. 49, the route searching result using the first and third maps which is the same as the actual driving route is outputted as the searched result, and the third map information is selected in which the predicted required time (99 minutes) is the closest to 101 minutes which is the actual driving time.

With this, when the driving route of the user is searched for, it is possible to search for a route corresponding to the actual driving route of the user and to predict the required time to the destination, using the selected map information. In the aforementioned example, map information suitable for the user who gives a higher priority to reducing the distance of driving toll highways and the cost, than the time required for reaching the destination without using any toll highways is selected.

Figure 51:
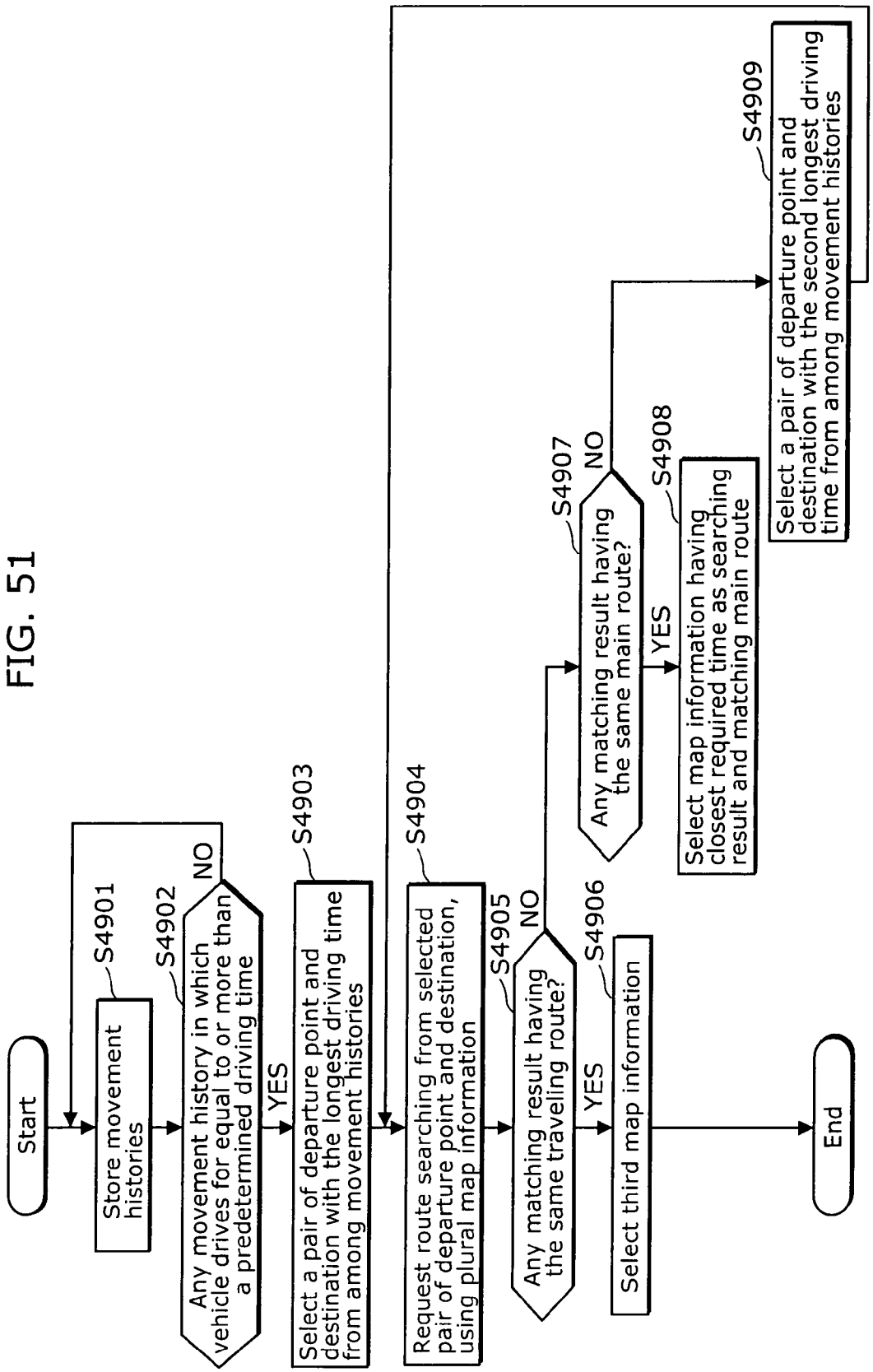
FIG. 51 is a flowchart showing the operation of the mobile terminal.

The details of the aforementioned processing are described using the flowchart in FIG. 51. The location information obtaining unit 4501 converts the obtained position information into a series of movement and stores it in the movement history storage unit 4502 (Step S4901). When the vehicle drives for a predetermined driving time (for example, 5 hours), the step proceeds to the next step (Step S4902). When the driving time is less than the predetermined time, Step S4901 is repeated. In driving for equal to or more than the predetermined time, the route searching request generating unit 4507 selects a pair of a departure point and a destination which has the longest driving time from among the movement histories stored in the movement history storage unit 4502 (Step S4903). Then, using the latitude/longitude information of the selected pair of departure point and destination, the route searching request generating unit 4507 issues a route searching request to the plural map information stored in the first map information storage unit 4503 to the fourth map information storage unit 4506 (Step S4904). The route searching result receiving unit 4508 receives route searching results from each map information, and the route comparing unit 4509 judges whether or not the received searching results include any result as the same results of the routes in the actual driving histories stored in the movement history storage unit 4502 (Step S4905). In the example of the searching result shown in FIG. 49, since the searching results of the first and third map information are common to the actual driving routes, the map information selecting unit 4510 selects those map information as candidates. Furthermore, the route comparing unit 4509 compares that the predicted required time is 105 minutes according to the result of the route searching in the first map information, whereas the required time is 99 minutes according to the result of the route searching in the third map information. Thus, the map information selecting unit 4510 judges that the third map information is more suitable for searching for a route closer to the actual driving route of the user, since the required time 99 minutes of the third map information is closer to the actual driving time 101 minutes, and finally selects the third map information (Step S4906).

On the other hand, when the route searching result matching the driving route of the user can not be obtained from among the plural first to fourth map information (No at Step S4905), the map information selecting unit 4510 selects map information which outputs the route searching result corresponding to the driving route at the main roads, according to the comparison in the route comparing unit 4509 (Step S4907). When plural map information in which the main roads are matched are present, the map information selecting unit 4510 selects the map information closer to the predicted required time (Step S4908). With this, it becomes possible to select map information that differs in details of the movement histories of the user but that has the same outline of routes. For example, in the normal movement histories, there are cases where the user visits the home of a friend who lives in the vicinity of the home of the user and after that, the user drives the vehicle for a long time. In this case, the map information is selected that differs in details of route information to the home but that outputs a route searching result in which the main roads are matched. With this, it is possible to select map information which matches the main movement patters of the user.

Furthermore, as a result of route searching using plural map information, when there is no route having the matched main roads (No at Step S4907), the movement history storage unit 4502 reselects a pair of a departure point and a destination with the second longest driving time from among the movement histories stored in the movement history storage unit 4502 (Step S4909), and the process returns to Step S4904. With this, even when movement histories of the user are unique and no result of the route searching is matched with such histories using any map information, it becomes possible to execute route searching using other movement histories and to select map information which matches the movement patterns of the user.

Note that although in the present embodiment, the movement history with the longest driving time is selected from among the movement histories stored in the movement history storage unit 4502 in FIG. 48, the departure points and destinations in the movement histories in which the movement frequency is high may be selected instead. With this, it becomes possible to select map information which matches the movement patterns of the user based on the routes which are the most frequently used by the user. In particular, it becomes possible to select map information which is similar to the actual movement patterns of the user and which is the information regarding routes frequently used for commuting to work, school, or the like.

Furthermore, although in the present embodiment, a map is selected based on only the movement history with the longest driving time from among the movement histories stored in the movement history storage unit 4502 in FIG. 48, all of the stored movement histories may be selected instead, and then the map information which outputs route searching results corresponding to the stored movement histories may be selected. In this case, the map information in which the predicted required time is closest to the actual traveling time may be selected. With this, even when the user normally drives with a moderate speed for safe driving, it is possible to select map information suitable for the user.

Furthermore, in the present embodiment, plural map information are stored, and by searching for a route in each map information and comparing the result with the actual driving result, the map information suitable for the user is selected. However, when single map information and plural route searching modules using the single map information are present, it is possible to select a route searching module which best matches the movement patterns of the user by inputting pairs of departure points and destinations in each route searching module and comparing those results. In this case, the route searching module in which a route can be searched in the shortest period of time may be selected, using searching time in route searching.

Furthermore, in the present embodiment, the optimal map information is selected from the first to fourth map information storage unit 4503 to 4506 without depending on the geographic areas in the movement histories. However, among plural map information, some require detailed map information with high precision for a specific region. Thus, depending on each region, a pair of a departure point and a destination may be selected so as to select map information which matches the movement patterns of the user in each region. For example, it is possible that the map information of provider X1 is selected as the information of Osaka Prefecture, and the map information of provider X2 is selected as the information of Hyogo Prefecture.

Furthermore, although the map information which is optimal to the user is selected from among the plural map information in the present embodiment, optimal (correct) audio guide information may be selected instead of the aforementioned optimal information or with the information. In general, for route searching, a route is guided to the user using audio guide and the like. However, depending on the map information, there are cases where a reading mode in an audio guide, for example, reading of an intersection, is different. For example, as shown in FIG. 52, in an intersection located at the same latitude/longitude, there are cases where a route navigation result can be obtained in which the intersection name is read "Higashi Kousaten" only with the second map information while the name is read "Azuma Kousaten" with other map information. In this case, when it is judged that the reading of the audio guide of the second map information is erroneous, and a navigation guide is provided for the user using the route searching result of the second map information, the audio guide may be provided by reading the name "Azuma Kousaten", instead of "Higashi Kousaten". In this case, a correct reading mode may be determined not based on majority rule but on the updated map information. In other words, it is possible to use, as correct information, the map information having the latest update date and time. As described above, using plural map information, it is possible to automatically correct a reading mode which erroneously reads names of points and the like in an audio guide.

Furthermore, although the mobile terminal 100b selects and obtains the map information suitable for the user from among the movement histories of the user and the search results provided by the plural map information storage units in the present embodiment, this method may be applies to selection of the update map information in the first and second embodiments. In other words, a single update map information storage unit may be selected from among the plural update map information storage units, based on the judgment criteria in the present embodiment, and the map information which has been retained may be updated with the update map information obtained from the selected map information storage unit.

Fourth Embodiment

Next, the fourth embodiment of the present invention is described.

The first embodiment describes that the category information of the destination where the user has arrived at is extracted from the movement histories, the type of the map preferred by the user is automatically selected, and the map is automatically updated. Furthermore, the second embodiment describes that the type of the map may be selected depending on the region. More specifically, the detour-exclusive maps are updated in familiar areas, such as "M62", "M63", and "M64" of FIG. 38, where the user frequently uses detours, and the restaurant-exclusive maps are updated in "M41" where the user frequently dines. Thus, it is possible to customize a map in which the movement characteristics of the user are more reflected by selecting and updating different types of maps according to the tendency of the user. As a result, the user can easily obtain necessary information without complicated operations, when the user has limitations in his/her tasks, in particular, while driving a vehicle.

The present embodiment describes the mobile terminal which selects map information depending on areas and the like.

Figure 53:
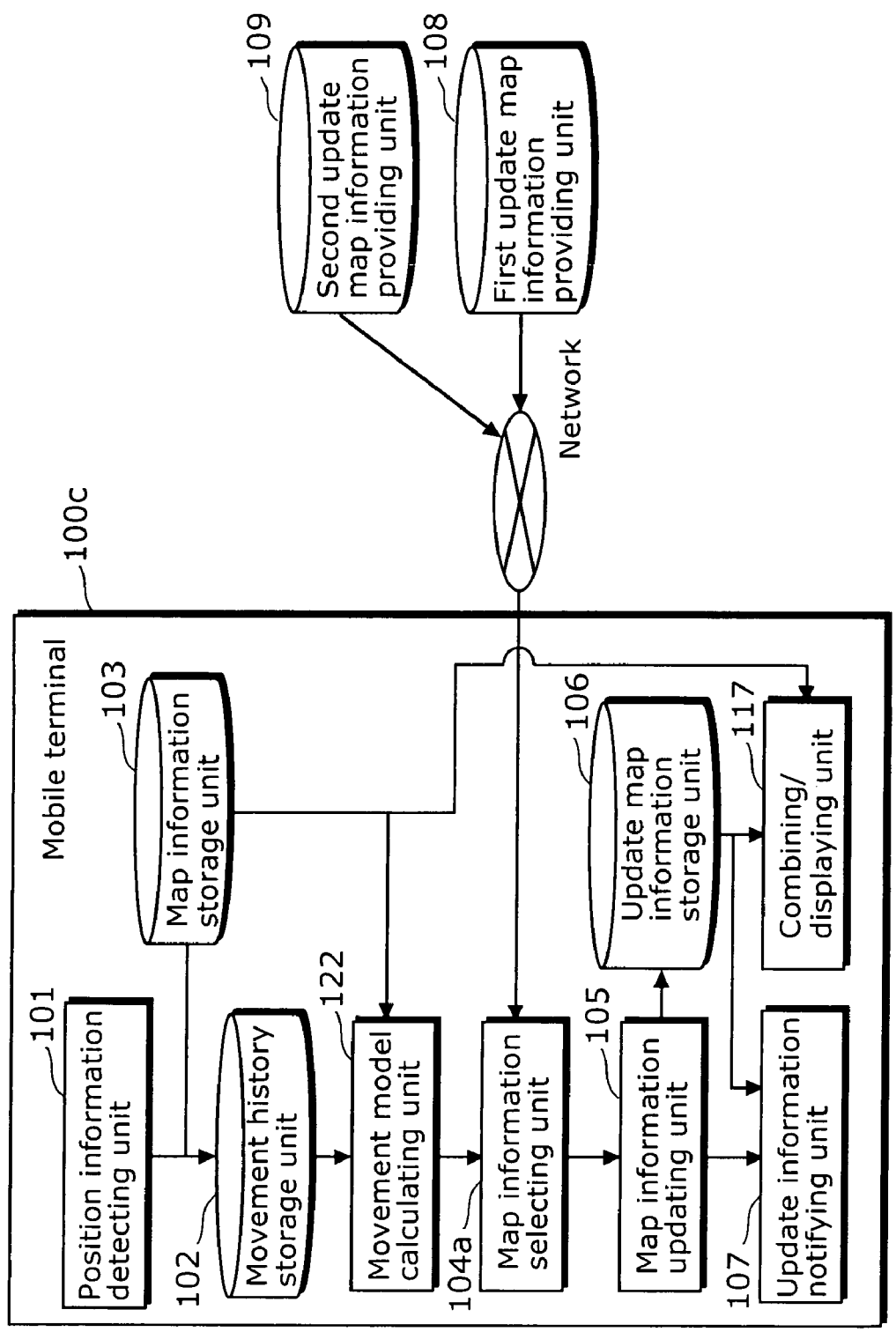
FIG. 53 is a block diagram showing the configuration of the mobile terminal in the fourth embodiment of the present invention.

FIG. 53 is a functional block diagram showing the configuration of the mobile terminal 100c in the fourth embodiment of the present invention. This mobile terminal 100c is a device which selects optimal update map information for the user from among plural update map information using route information, and includes the position information detecting unit 101, the movement history storage unit 102, the map information storage unit 103, a movement model calculating unit 122, a map information selecting unit 104a, the map information updating unit 105, the update map information storage unit 106, the update information notifying unit 107, and the combining/displaying unit 117. Note that the first update map information providing unit 108 and the second update map information providing unit 109 which are connected to this mobile terminal 100c via a communication network are described as well in the present diagram.

This mobile terminal 100c has the configuration similar to the mobile terminal 100 in the first embodiment, and differs in having the map information selecting unit 104a instead of the map information selecting unit 104 in the first embodiment, and in further having the movement model calculating unit 122. The landmark information extracting unit 110 provided in the mobile terminal 100 in the first embodiment is one of the elements of the movement model calculating unit 122. Hereinafter, the same unit numbers are given to the units having the same configuration as in the first embodiment, and the difference between the first and the fourth embodiments are mainly described hereinafter.

The position information detecting unit 101 is made up of, for example, a GPS as in the first embodiment, and detects latitude/longitude information indicating a position of the user. This position information detecting unit 101 converts the latitude/longitude information into a series of nodes based on the map information stored in the map information storage unit 103, and stores the series of nodes in the movement history storage unit 102 as movement histories.

FIG. 54 is a diagram showing an example of the movement histories which are stored in the movement history storage unit 102. In the present embodiment, the movement histories are stored in the movement history storage unit 102, for example, assuming that a point where the engine is started is a departure point and a point where the engine is stopped is a destination. The date and time information detected by the GPS is also stored in the movement history storage unit 102. For example, in the movement history ID "001" in the present diagram, the date and time "Sep. 20, 2003 (Sun)", the departure point "home (L100 which is a landmark ID)", and the destination "Maruyama golf course (L51)" are stored. Furthermore, the times when each node is passed, such as the time when leaving home at "6:45" and the time arriving at Maruyama golf course "8:50", are also stored. Similarly, the history in which the user has left "Maruyama golf course" for "home" on the date and time "Sep. 20, 2003 (Sun)" at "16:45" and has arrived at home at "19:05" is stored in the movement history ID "002". As described above, each of the movement detected according to the movements of the user is stored in the movement history storage unit 102 as a movement history.

In the present embodiment, the mobile terminal 100c calculates, based on the movement histories stored in the movement history storage unit 102, a model (hereinafter referred to as "movement model") which reflects the movement characteristics of the user, and selects and updates the map information necessary for the user based on the movement model.

Figure 55:
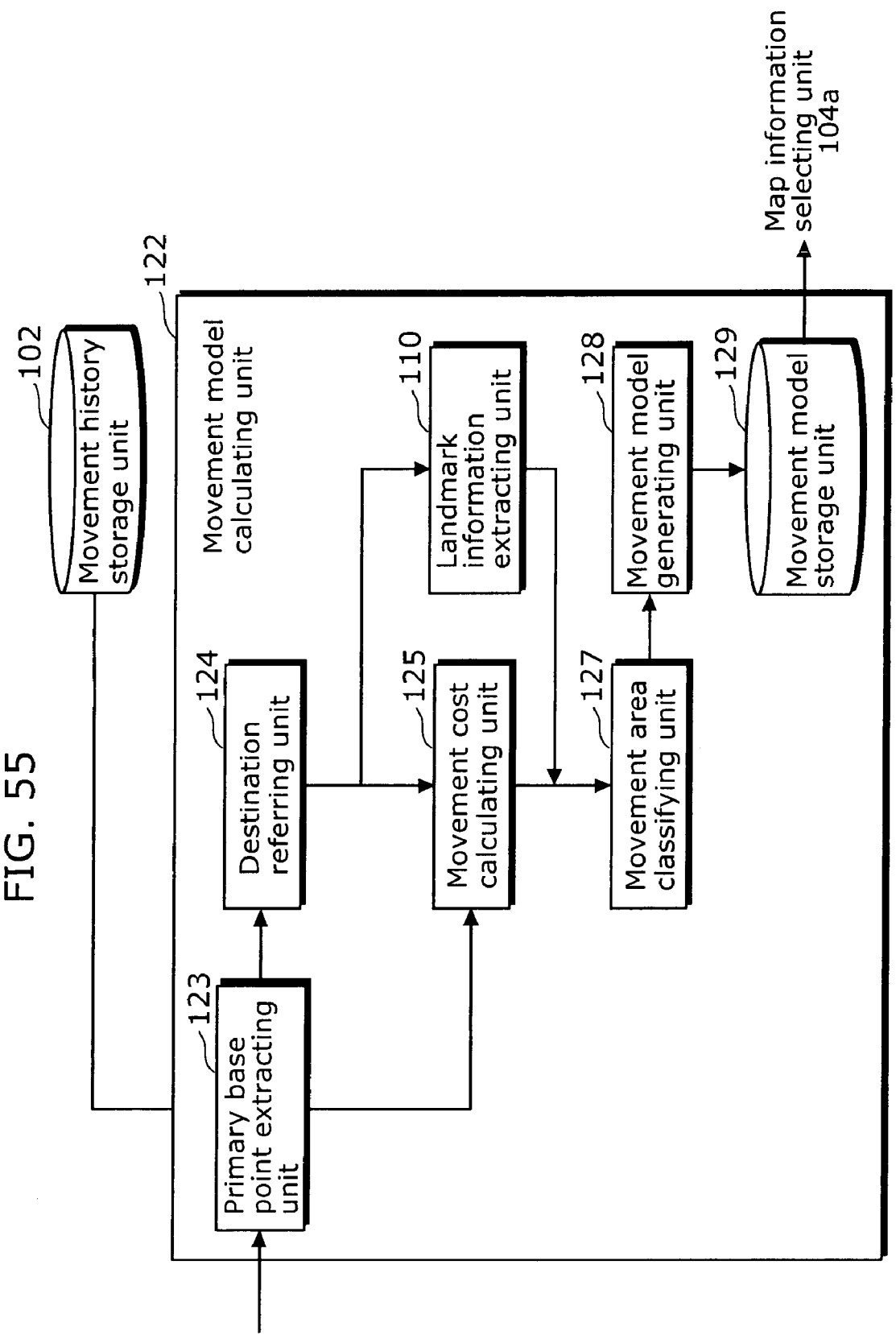
FIG. 55 is a block diagram showing the detailed configuration of the movement model calculation unit.

The movement model calculating unit 122 is a processing unit which calculates a movement model based on the movement histories stored in the movement history storage unit 102, and as shown in FIG. 55, includes a primary base point extracting unit 123, a destination referring unit 124, a movement cost calculating unit 125, a landmark information extracting unit 110, an movement area classifying unit 127, a movement model generating unit 128, and a movement model storage unit 129.

The primary base point extracting unit 123 is a processing unit which extracts, from movement histories, a point to be a base point of movement, such as home. For example, there are certain patterns of the movement of the user by a vehicle, and in many cases, the user moves to various points from primary base points, such as home and office. Then, the primary base point extracting unit 123 first extracts such primary points as primary base points. For example, the primary base points are extracted based on the arrival frequency and the period of a stay at the points.

Assuming that the destinations are stored as movement histories as shown in FIG. 54, the movement model calculating unit 122 calculates the frequency for each destination, and calculates a point having a high frequency as a primary base point. Alternatively, it is possible to calculate the point based on the period of a stay at the point, instead of the frequency or in addition to the frequency. For example, the arrival time at the destination "home" shown in the movement history ID "002" is "19:05", the start time from "home" shown in the next movement history ID "003" is "7:10" on the next day. Thus, the difference, 12 hours and 5 minutes is calculated as the period of a stay at home. Then, the movement model calculating unit 122 may calculates an average of these period of stays and extract a point with a longer period of stay on average as a primary base point.

FIG. 56 shows the arrival frequency and average period of a stay at each point. For example, the stay frequency at "home" which is a point ID "001" is 320 times, and the average period of stays is "16 hours 20 minutes". Thus, it is extracted as a primary base point. Furthermore, the stay frequency at "office" which is a point ID "002" is 189 times, and the average period of stay is "12 hours 20 minutes". Thus, it is also extracted as a primary base point. In this case, the primary base points may be extracted by setting a threshold, such as the stay frequency 100 times and the average period of stays, 3 hours. Generally, the points to be base points of movement of the user are extracted as the primary base points, such as home and office.

The destination referring unit 124 is a processing unit which refers to the destinations of the movement histories, and refers to (reads) the destinations for each base point calculated in the primary base point extracting unit 123 from the movement histories stored in the movement history storage unit 102.

FIG. 57 is a diagram showing the destinations referred by the destination referring unit 124 when the user leaves "home" which is extracted as a primary base point. Among the movement histories shown in FIG. 54, the movement history IDs and the destinations in which each primary base point has been "home", such as: "Maruyama golf course" of the movement history ID "001"; "office" of the movement history ID "003"; "Maruyama golf course" of the movement history ID "0021"; "Daiei A" of the movement history ID "025"; and "Yokado A" of the movement history ID "0031", and these are shown in FIG. 57.

The movement cost calculating unit 125 is a processing unit which calculates movement cost to each destination, for example, such as a distance. The landmark information extracting unit 110 is a processing unit which identifies a category of each destination. The movement area classifying unit 127 is a processing unit which classifies movement areas of the user (herein, the movement areas for each category of destinations), based on the distance for each destination obtained by the movement cost computation unit 125 and the category of destinations obtained by the landmark information extracting unit 110. The movement model generating unit 128 generates a result obtained in the movement area classifying unit 127, in other words, a table which associates categories of the destinations with the movement areas for each primary base point, and stores the result in the movement model storage unit 129 as the movement models. The movement model storage unit 129 is a hard disk and the like which stores the movement models generated by the movement model generating unit 128, and the map information selecting unit 104a refers to the models. Hereinafter, the generation of movement models is described using specific examples.

Figure 58:
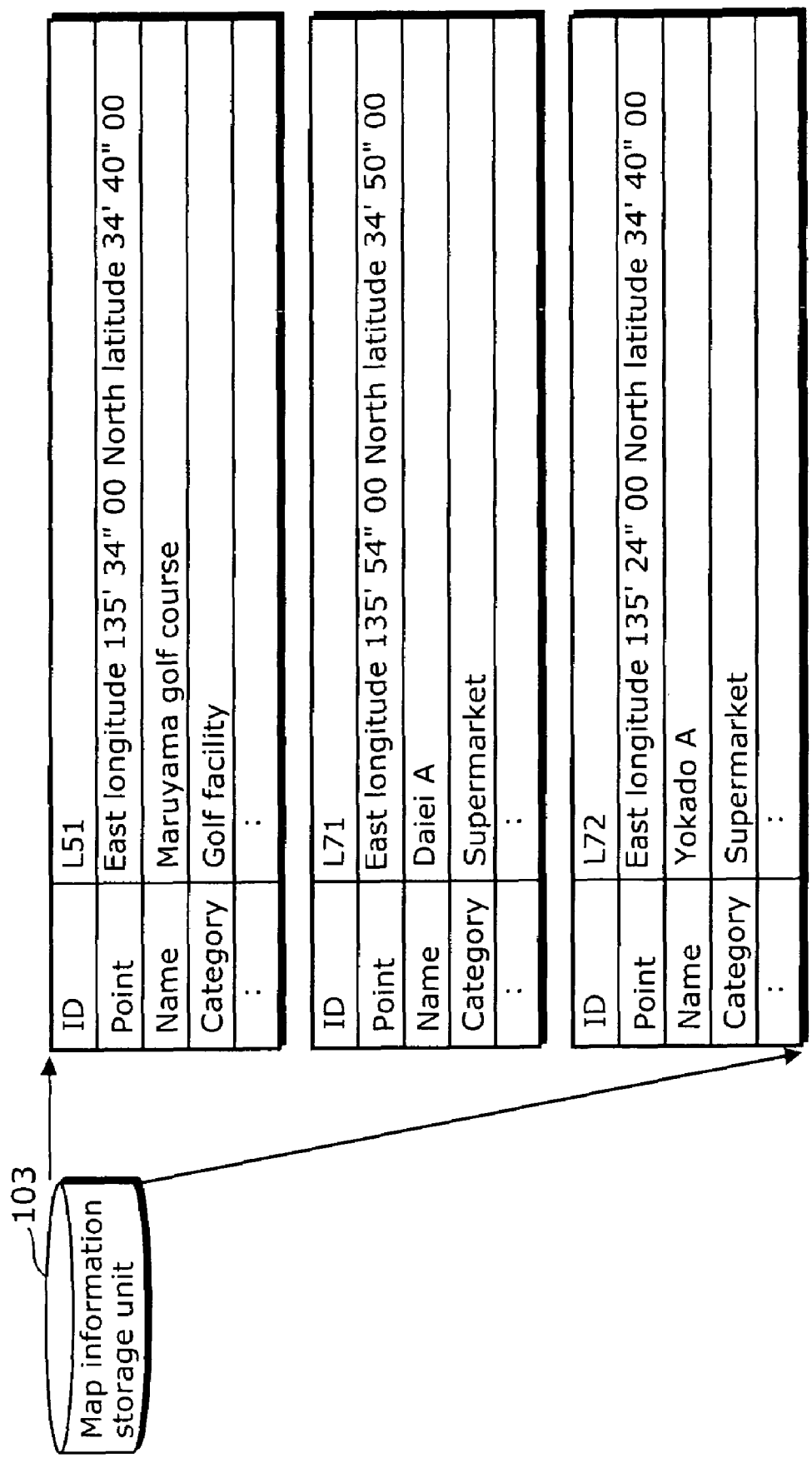
FIG. 58 is a diagram showing an example of map information.

First, the movement cost computation unit 125 calculates the movement cost (herein, distance) from the primary base point for each destination referred by the destination referring unit 124. At the same time, the landmark information extracting unit 110 identifies the category of the destinations referred by the destination referring unit 124. The category and the distance can be obtained, for example, from the map information stored in the map information storage unit 103. FIG. 58 shows detailed information of each facility registered in the map information stored in the map information storage unit 103. As shown in FIG. 58, the map information in the present invention, as described in the first embodiment, stores node IDs of facilities, positions expressed by the latitude/longitude and the like, node names, and categories of the nodes. The destination "Maruyama golf course" of the movement history ID "001" which is one of the destinations shown in FIG. 57 is located at the point of longitude 135 degrees 34 minutes 00 seconds east and latitude 34 degrees 40 minutes 00 seconds north, and the category is "golf facility". Likewise, the destination "Daiei A" of the movement history ID "0025" is located at the point of longitude 135 degrees 54 minutes 00 seconds east and latitude 34 degrees 50 minutes 00 seconds north, and the category is "supermarket". The movement cost computation unit 125 calculates, as movement cost, the direct distance between home as a primary base point and each node, based on the position information.

Figure 59:
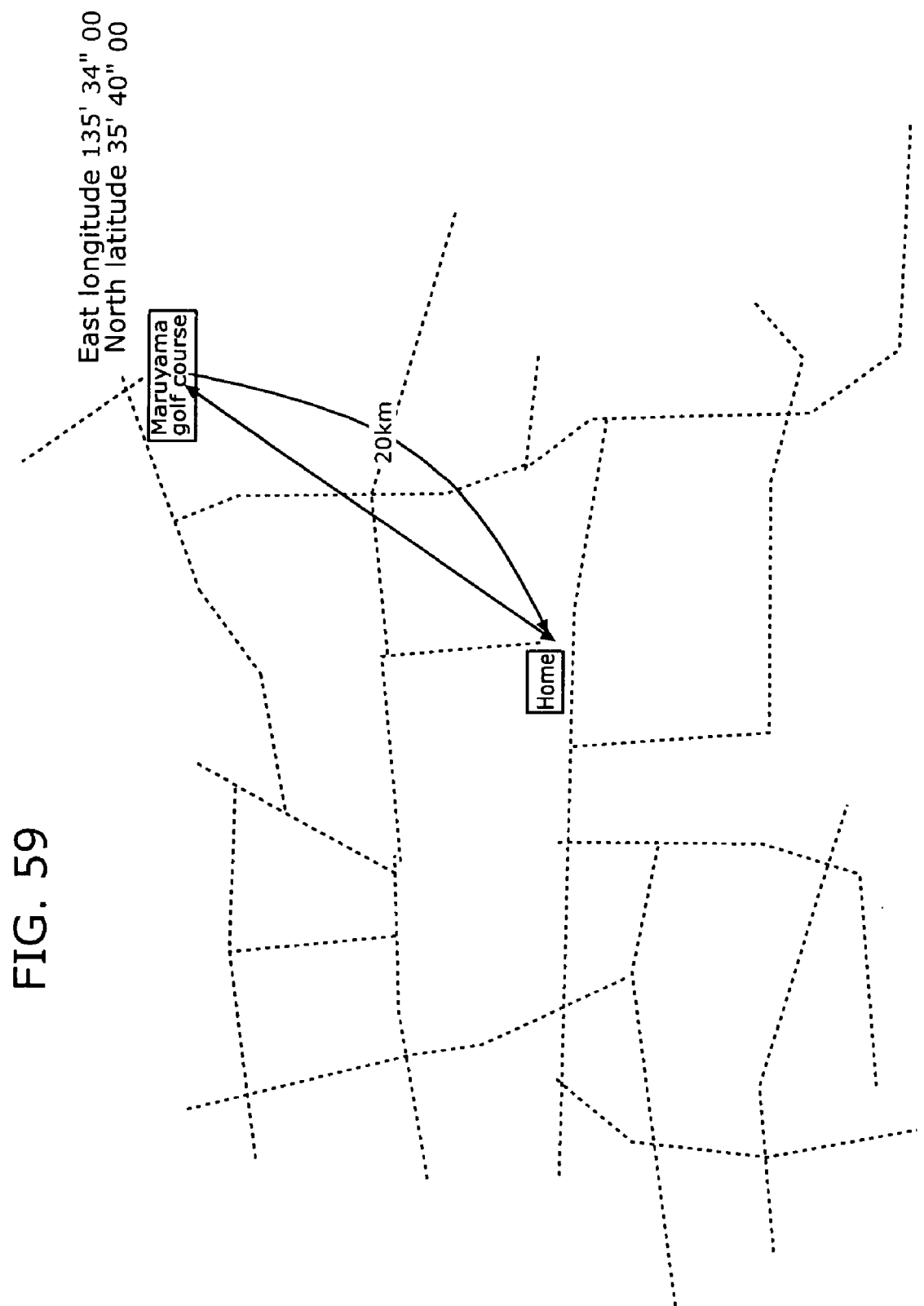
FIG. 59 is a diagram showing a calculation example of movement models.
Figure 60:
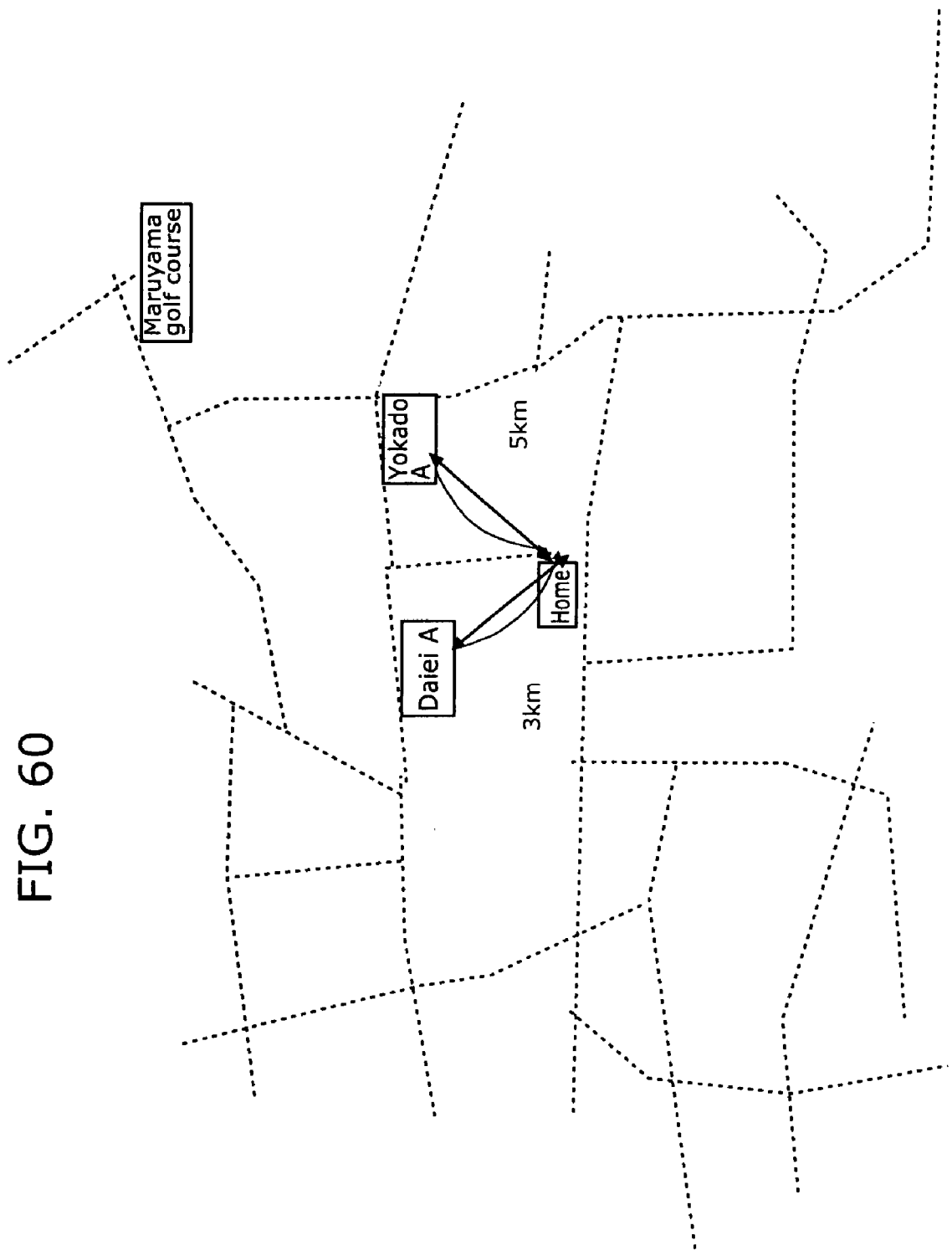
FIG. 60 is a diagram showing a calculation example of movement models.

FIG. 59 is a map indicating a position relationship between "Maruyama golf course" and home. According to the positions of home and Maruyama golf course, the distance is calculated as 20 km. On the other hand, FIG. 60 is a map indicating a position relationship among "Daiei A", "Yokado A", and home. The distance between home and a point is calculated on the map, such as the distance between home and "Daiei A" is 3 km, the distance between home and "Yokado A" is 5 km.

As described above, the user normally visits various facilities from a base point, such as home, and the preferences of the user are generally reflected in the category of the facilities. The user described in the present embodiment frequently visits golf courses, as his/her favorite pass time is golf. Furthermore, since the user also frequently goes shopping, such as to supermarkets, it is possible to judge the preference of the user based on the histories. On the other hand, only the facility information stored as a movement history does not always reflect the movement of the user. Although the user in the present embodiment goes to a golf course even when the distance is 20 km away from home, the user never goes to a supermarket 20 km away from home. Besides, the user goes to a supermarket relatively close to home, such as a supermarket 5 km away from home. Thus, even when a new supermarket has been built, and the type of map (for example, shopping-exclusive map) in which the information has been reflected is updated, it may be an appropriate map in an area in the vicinity of home. However, in a remote area, the shopping-exclusive map is not always the appropriate one for the user. Furthermore, even when a new golf course has been built and the type of map in which the information has been reflected is updated, there are possibilities that the user may visit a location up to 20 km away from home. However, it is not always useful for the user to update map information with the golfing-exclusive map for the area out of the expected range of the user, more than 20 km away from home.

Then, in the present embodiment, using the category of the destination and the movement cost (distance herein), the distance range expected for the user in each category of the destinations (hereinafter referred to as "expected range") is calculated, and it is calculated as a movement model.

In order to do so, the movement area classifying unit 127 calculates an expected range for each category of the destinations, and the movement model generating unit 128 generates, as a movement model, a table indicating the expected range, and stores it in the movement model storage unit 129. Here, the distance to "Maruyama golf course" categorized as a "golf facility" is 20 km, and the expected range for "golf facility" is defined as 20 km. Furthermore, the distance to "Daiei A" categorized as a "supermarket" is 3 km, and the distance to "Yokado A" also categorized as a "supermarket" is 5 km. Thus, the expected range for "supermarket" is defined as 5 km. This is because at least the distance up to 5 km which is further distance can be regarded as the expected range. As described above, the furthest distance among distances to plural facilities corresponding to each category is defined as the expected range. Note that an average distance may be calculated from the distances to the plural facilities corresponding to each category, and the average distance may be an expected range. This is because an expected range in which a noise is eliminated and the movement of the user is more reflected can be calculated by calculating the average distance of the facilities where the user frequently visits and which belong to a certain category. Furthermore, the expected range can be obtained by not simply calculating a direct distance but using time required in searching for a route. For example, when the destination is the golf course and the like, since the start time is important, the expected range may be determined based not on a direct distance to the destination, such as 20 km, but on the time required for driving to the destination, for example, a range of an area where the user can reach within 2 hours on a normal driving state. With this, it becomes possible to generate a movement model in which not the direct distance but an actual route situation is reflected.

FIG. 61 is a table showing the movement model of the user which is generated by the movement model generating unit 128. Here, the expected ranges are calculated for each category of destinations in the case where "home" is a primary base point, such as the expected range of "golf facility" is "20 km" and the expected range of "supermarket" is "5 km".

Figure 62:
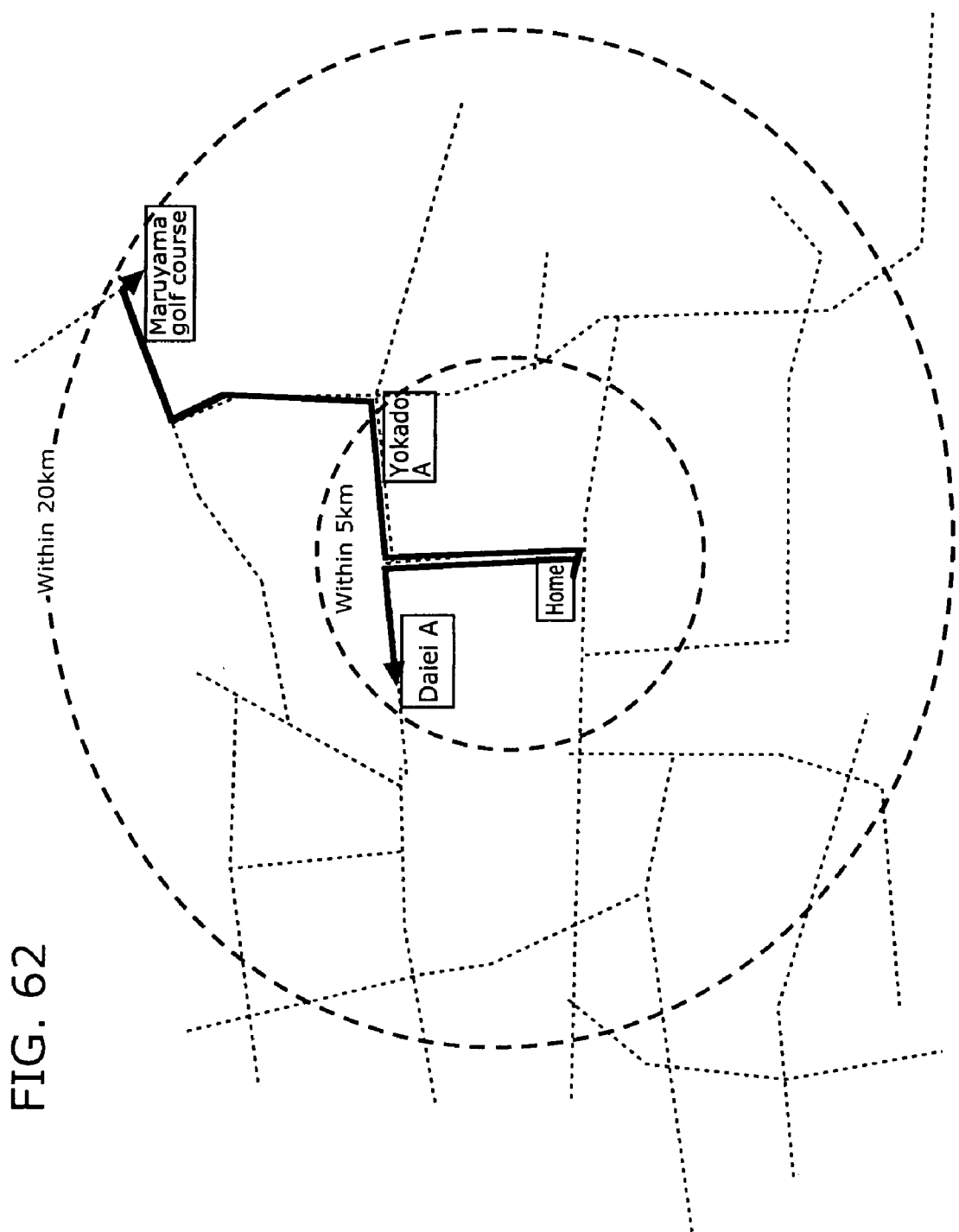
FIG. 62 is a map showing the movement models.

FIG. 62 is a map indicating the expected ranges shown in FIG. 61. Here, the expected ranges and the corresponding facilities with respect to home are shown herein. Within the expected range of 5 km, "Daiei A" and "Yokado A" which are categorized as "supermarket" are shown on the map.

Furthermore, within the expected range of 20 km, "Maruyama golf course" which is categorized as "golf facility" is shown on the map. The facilities to which the user travel generally have an expected range of distance and time, depending on the purposes and categories. Although the user of the present embodiment goes to a golf course which is far from home, approximately 20 km away from home, the user never goes all the way to a supermarket and the like located far away from home, and tends to do all of the shopping in nearby supermarkets located within 5 km away from home. Thus, a movement model in which these movement characteristics are reflected is shown in the present embodiment.

The map information selecting unit 104a is a processing unit which selects an appropriate map from a processing unit which provides each type of map information, such as the first update map information providing unit 108 and the second update map information providing unit 109, based on the movement model stored in the movement model storage unit 129. As in the first embodiment, the map information updating unit 105 stores the selected map in the update map information storage unit 106, and updates it as the update map information. The update information notifying unit 107 notifies the user of the update map information stored in the update map information storage unit 106, or the combining/displaying unit 117 combines the update map information with the map information stored in the map information storage unit 103 and displays the combined map information.

Figure 63:
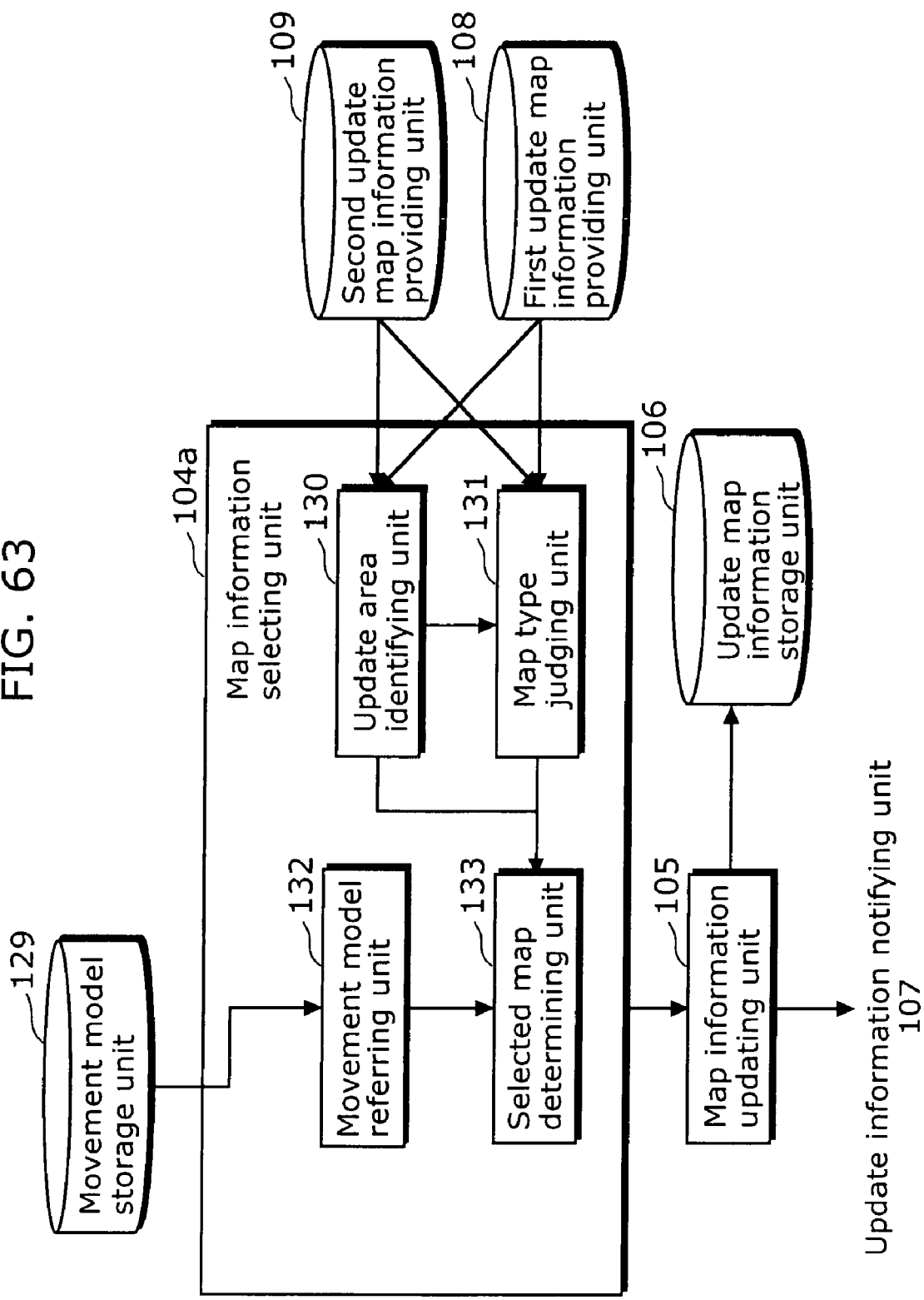
FIG. 63 is a block diagram showing the detailed configuration of the map information selecting unit.

FIG. 63 is a block diagram showing the detailed configuration of the map information selecting unit 104a. The map information selecting unit 104a in the present embodiment includes, an update area identifying unit 130, a map type judging unit 131, a movement model referring unit 132, and a selected map determining unit 133.

The update area identifying unit 130 is a processing unit which identifies an area in which the original map has been updated. In general, the map is divided into predetermined areas as described in the first embodiment. More specifically, as shown in FIG. 4, the map is divided into meshes for each predetermined area, and the information is stored with layers as shown in FIG. 5. The update area identifying unit 130 identifies which area of the map is to be updated with the map updated by each provider.

Figure 64:
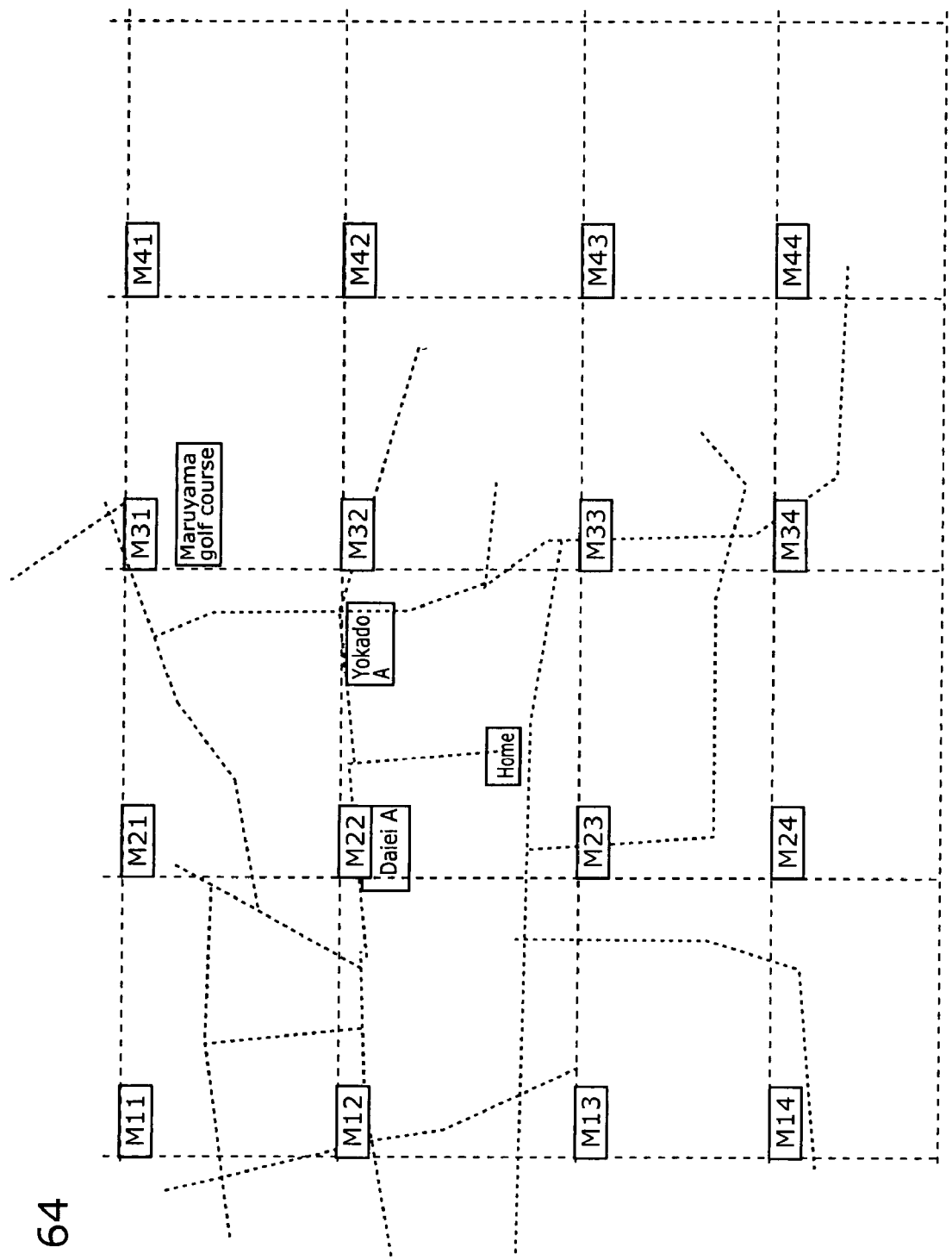
FIG. 64 is a diagram describing the processing of selecting update map.

FIG. 64 is a map indicating the same area as shown in FIG. 62. Here, the map is divided into meshes, and the map information is shown in which each mesh has respective IDs, such as "M11" and "M12". The map provided by the provider A and stored in the first update map information providing unit 108 and the map provided by the provider B and stored in the second update map information providing unit 109 are assumed to be divided into areas with meshes and provided per area. The update area identifying unit 130 identifies an update area (for example, mesh ID) of the map provided by each provider.

Figure 65:
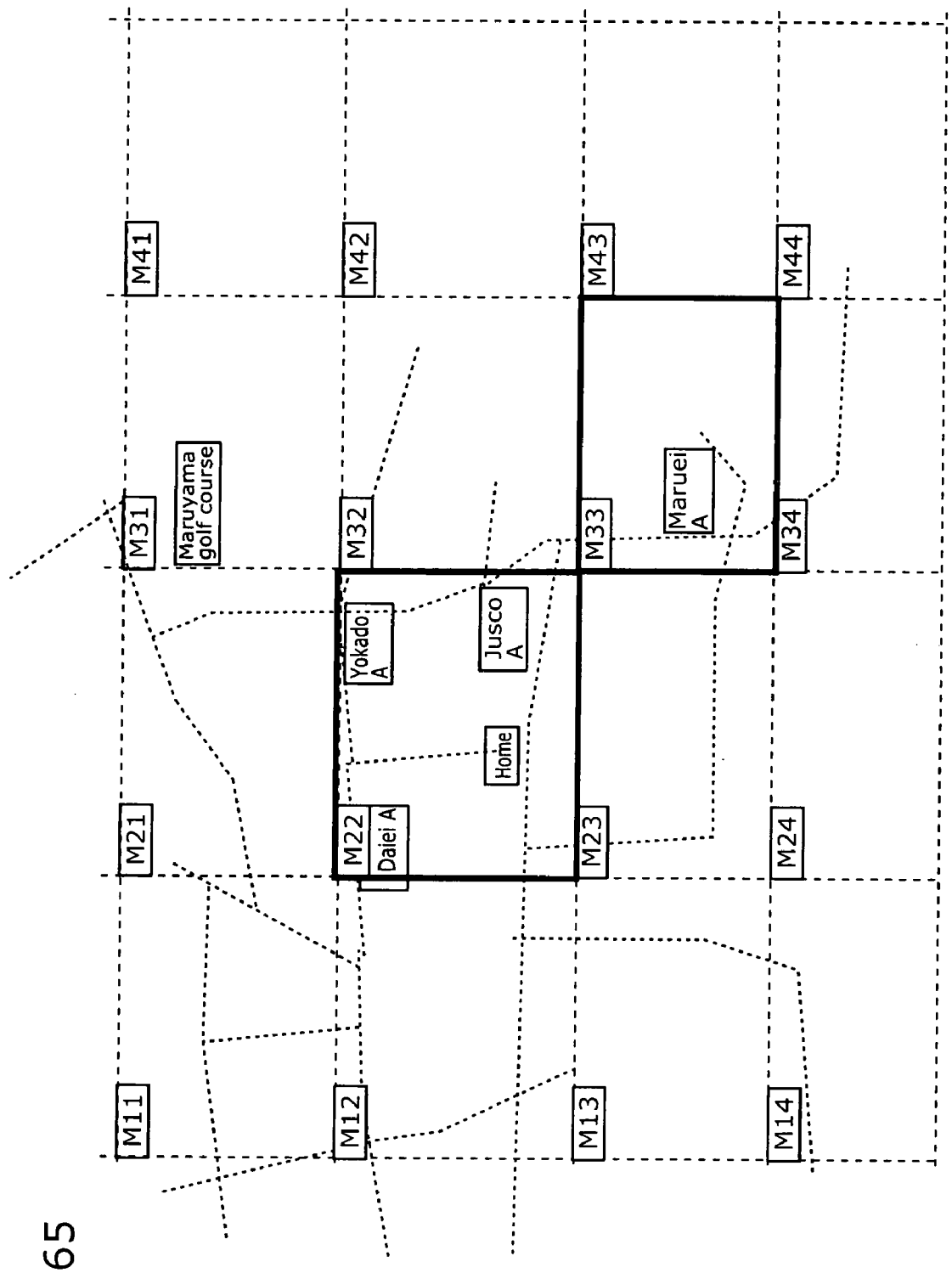
FIG. 65 is a diagram describing the processing of selecting update map.

FIG. 65 is a diagram showing a map provided by the provider A. The map of this provider A is a "shopping"-exclusive map and is a map sufficiently providing commercial information and facilities, such as supermarkets. Compared to FIG. 64, the mesh IDs "M22" and "M33" have been updated. In the mesh ID "M22", a new supermarket "Jusco A" has been added, and the map in which the facility information and the landmark have been added is provided. Furthermore, "Maruei A" has been newly added in the mesh ID "M33", and the facility information and the landmark are shown in the diagram.

Figure 66:
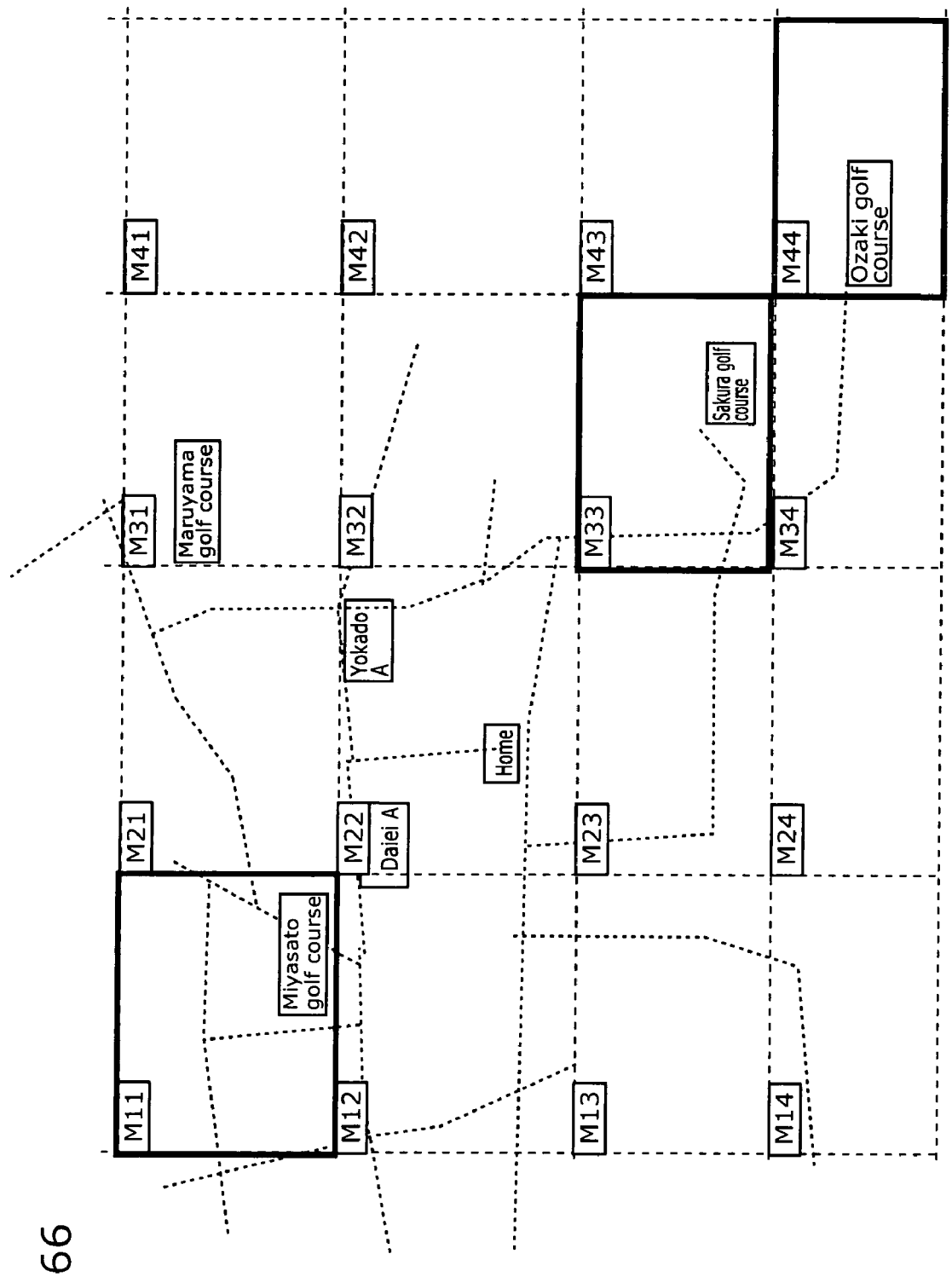
FIG. 66 is a diagram describing the processing of selecting update map.

FIG. 66 is a diagram showing a map provided by the provider B. The map of this provider B is a "golfing"-exclusive map and is a map sufficiently providing information including golf courses and golf shop information. Compared to FIG. 64, the mesh IDs "M11", "M33", and "M44" have been updated. A new golf course "Miyasato golf course" in the mesh ID "M11", another new golf course "Sakura golf course" in the mesh ID "M33", and another new golf course "Ozaki golf course" in the mesh ID "M44" have been added, and the respective facility information and landmarks are shown in the diagram. The update area identifying unit 130 is a processing unit which identifies an area on the map which has been partially updated by each of the providers, and identifies that "M22" and "M33" are updated with the map provided by the provider A and "M11", "M33", and "M44" are updated with the map provided by the provider B.

The map type judging unit 131 is a processing unit which judges a type of a map provided by each of the providers. As shown in FIG. 9 according to the first embodiment, it is assumed that the map to be provided stores information regarding "type of map", and the map type judging unit 131 identifies the type of a map using this information. Here, the map type judging unit 131 identifies a type of a map, such as that the map provided by the provider A and shown in FIG. 65 is a shopping-exclusive map, and the map provided by the provider B is a golfing-exclusive map.

The movement model referring unit 132 is a read-out processing unit which refers to a movement model stored in the movement model storage unit 129.

The selected map determining unit 133 determines the updated map to be selected using the referred movement model. For example, when the updated map includes a part of the calculated area as the movement model, the selected map determining unit 133 determines that the area of the map is updated with the type of the map corresponding to the movement model (the type of the area identified by the update area identifying unit 130 and judged by the map type judging unit 131). Note that when there are plural types of the map, the type of the map with a higher covered ratio of a movement area in a mesh area is selected. The following describes the specific example.

Figure 67:
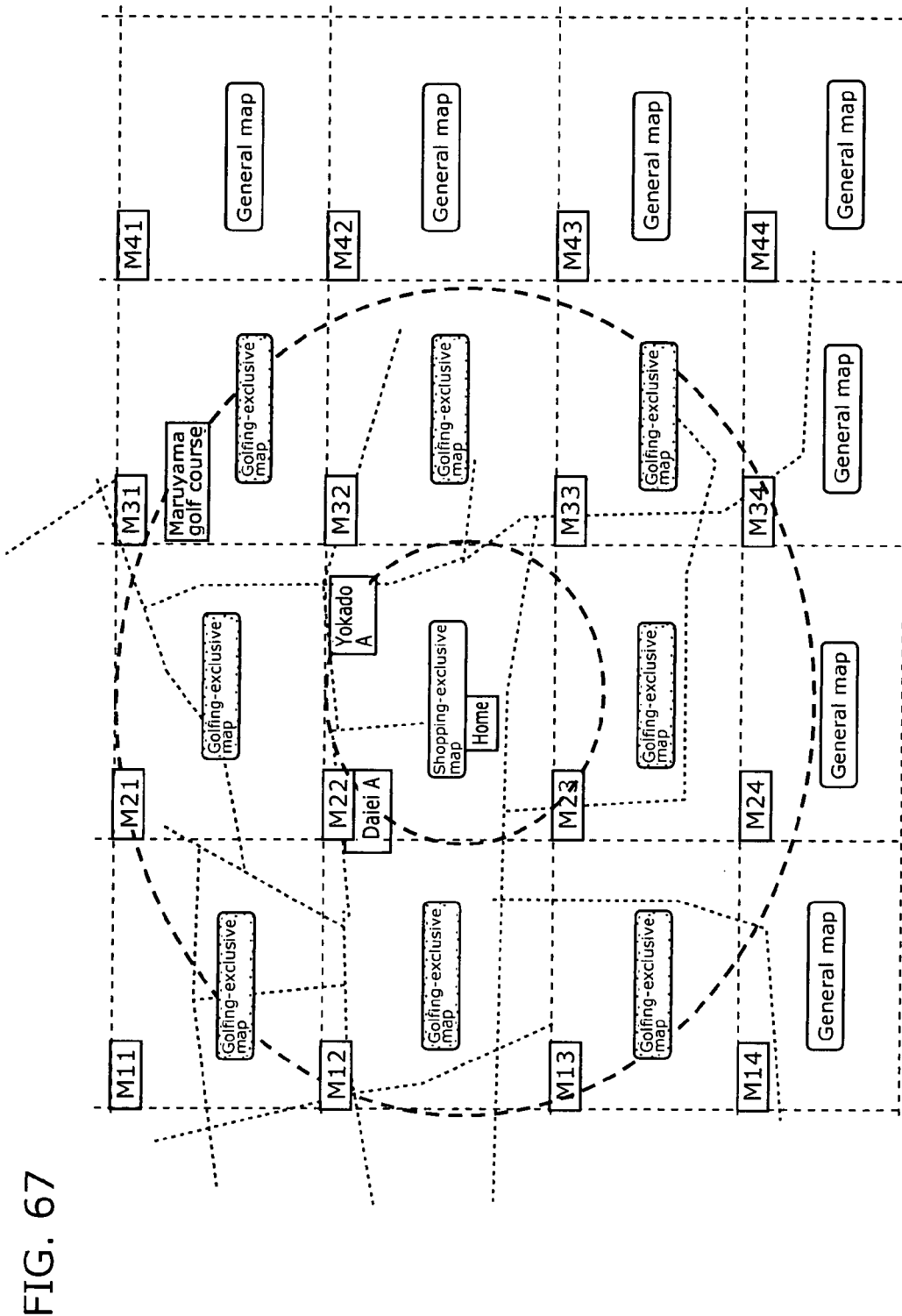
FIG. 67 is a diagram describing the processing of selecting update map.

Here, as shown in FIG. 61, the movement model of the user is calculated in which the golf facilities within the expected range of 20 km, the supermarkets within the expected range of 5 km, and the like are shown. FIG. 67 shows this movement model on the map of FIG. 64. In FIG. 67, the movement models in which the golf facilities within the expected range of 20 km, the supermarkets within the expected range of 5 km, and the like are shown are shown by dotted circles. Since the mesh ID "M11" corresponds to the expected range of 20 km which is one of the movement model, it is updated with the golfing-exclusive map. Likewise, since the large portions of the mesh IDs "M12", "M13", "M21", "M23", "M24", "M31", "M32", and "M33" are within the expected range of 20 km, the map is updated with the golfing-exclusive map. On the other hand, since the large portion of the mesh ID "M22" is within the expected range of 5 km, the map is updated with the shopping-exclusive map.

Figure 68:
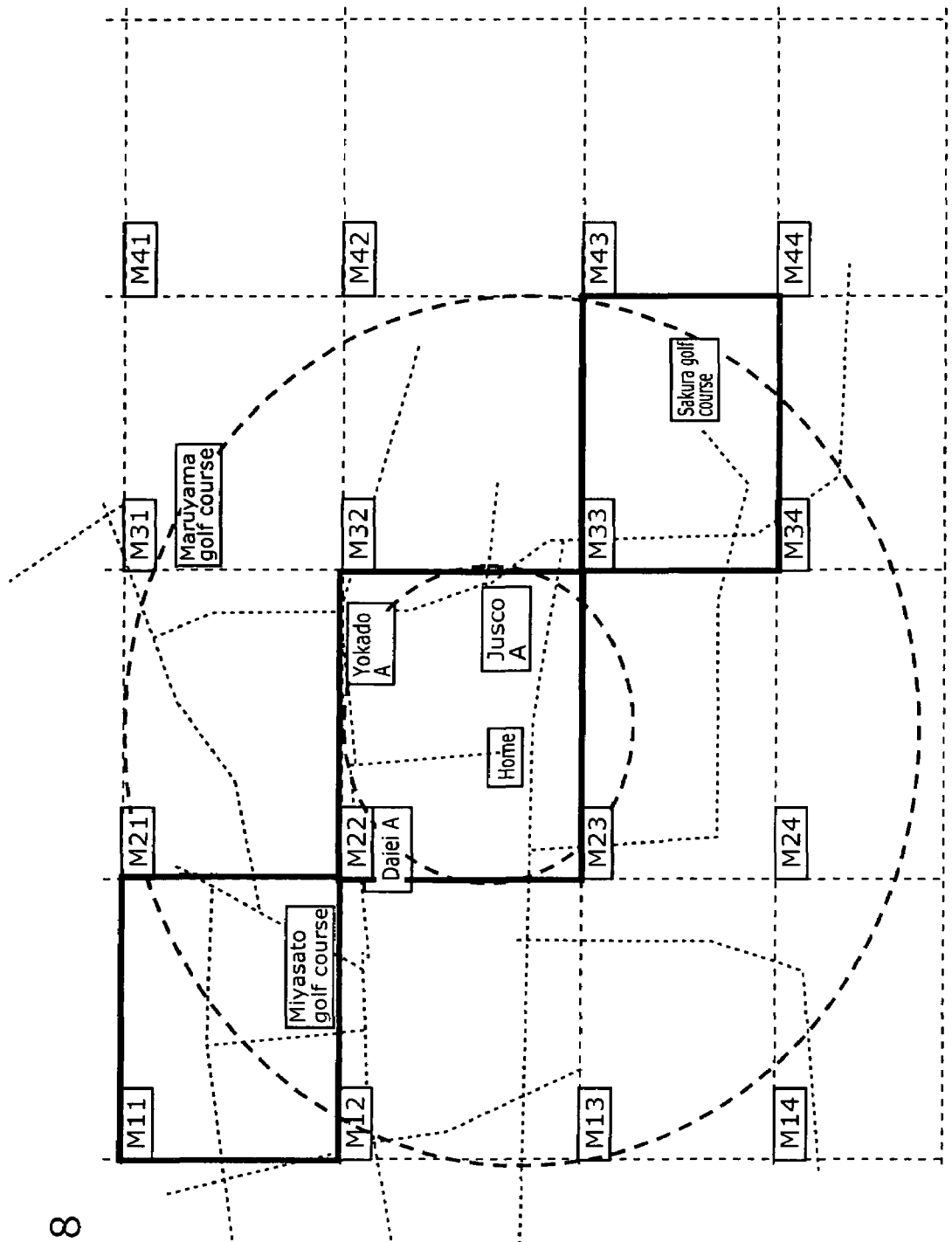
FIG. 68 is a diagram describing the processing of selecting update map.

FIG. 68 shows a diagram which has been updated with the movement model. More specifically, since the mesh ID "M11" is updated with the golfing-exclusive map, it has been updated with the mesh ID "M11" provided by the provider B, and thus, "Miyasato golf course" has been newly added on the map. Since the mesh ID "M22" is updated with the shopping-exclusive map according to the movement model, it has been updated with the mesh ID "M22" provided by the provider A, and it is obvious that "Jusco A" has been newly added on the map.

Since the mesh ID "M33" is updated with the golfing-exclusive map according to the movement model, it has been updated with the mesh ID "M33" provided by the provider B, and it is obvious that "Sakura golf course" has been newly added on the map. Although it is possible to update this "M33" with the update map provided by the provider A as shown in FIG. 65, the present user updates the map with the golfing-exclusive map which is provided by the provider B. This is because there are cases where the map which refers to the movement model in which the movement characteristics of the user are reflected is not always suitable for the update. In other words, although the user of the present embodiment moves within a radius of 5 km with respect to home for the purpose of shopping and the like, the user never goes shopping no further than 5 km. Thus, it is not always appropriate to update the map with the shopping-exclusive map, and there are cases where the update is unnecessary. On the other hand, since there are cases where the user moves within a radius of 20 km for golfing, such characteristic is reflected and calculated as a movement model. Thus, based on the movement model, the mesh ID "M33" is updated with the golfing-exclusive map.

On the other hand, although the mesh ID "M44" which is further away from home has been updated with the golfing-exclusive map, the mesh ID "M44" on the map of the present user is not updated with it. This is because the movement model is also reflected. In other words, although the present user moves, for the purpose of golfing and the like, to the mesh ID "M33" which is within a radius of 20 km with respect to home, the user never goes to a golf course no further than that. Thus, it is not necessary for the user to update the area with the golfing-exclusive map.

Generally, the movement histories can reflect the preferences of each user, and based on the movement histories, it is possible to judge a facility, such as a golf course which the user prefers to visit, the category, and the genre. However, there are cases where the preferences of the user are not limited to these. For example, although the user prefers to go to a distant golf course within a radius of up to 20 km, the user chooses to go shopping in a neighborhood of home when only going to a supermarket and the like. Thus, there exist respective expected ranges for each user. Thus, it becomes possible to provide a map which meets the needs of the user by selectively updating the map according to a movement model, using the movement model.

Furthermore, in an environment where a map is updated with the information to be provided in real time and the information is obtainable in an arbitrary timing, it becomes necessary for the user to obtain only a portion of a map. On the other hand, in the case where a car navigation and the like is being used, it is not preferable to interfere the driving operation of the user while driving. Thus, the necessary map is automatically selected and updated based on the movement model so that the user can safely drive and the present invention becomes more effective.

Figure 69:
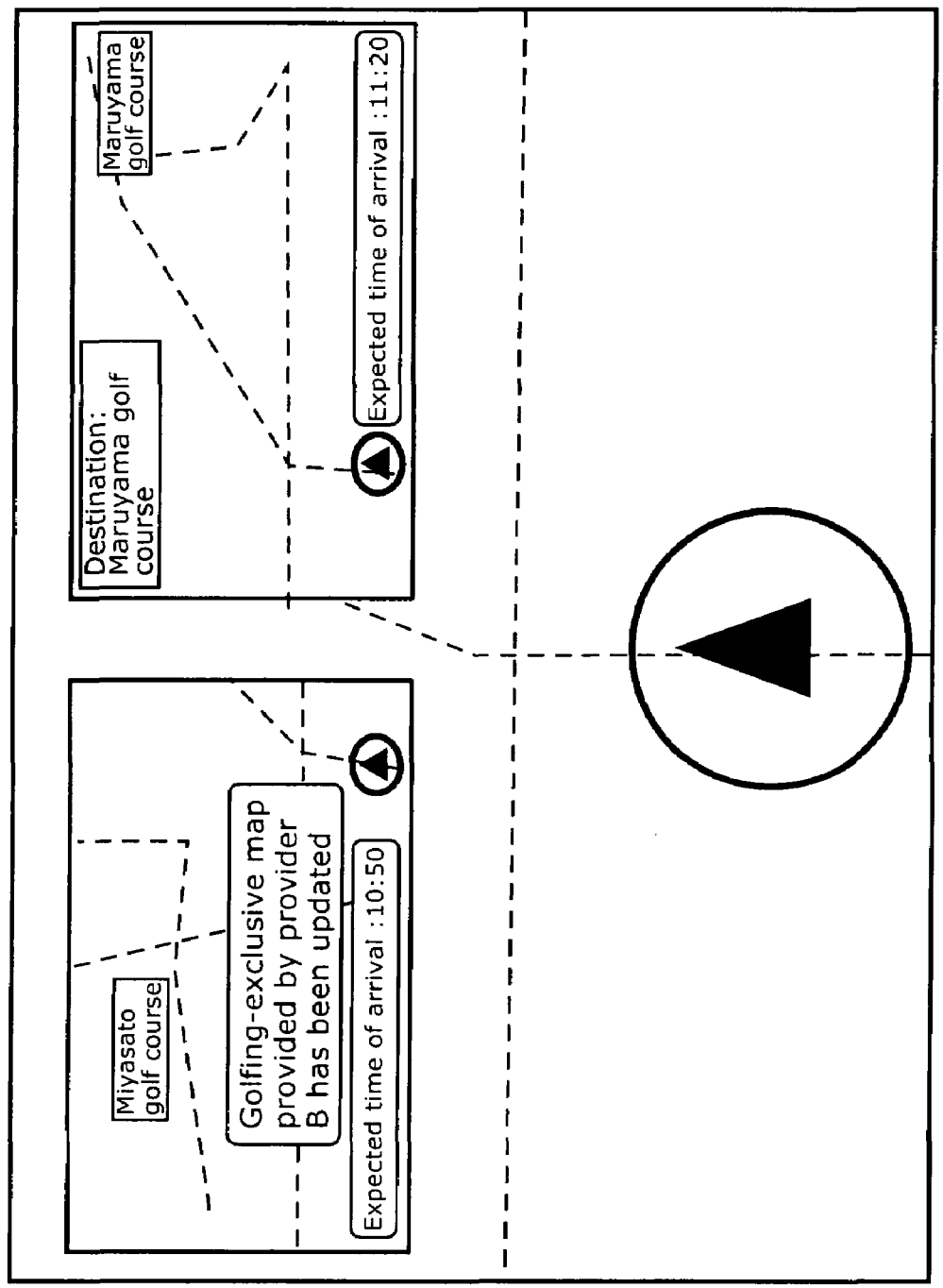
FIG. 69 is a diagram showing a notification example of update information.

FIG. 69 is a diagram showing a notification example of an update map notified by the update information notifying unit 107. As in the first embodiment, the map provided by the provider B is updated on the left of a screen of a car navigation system, and it is notified that "Miyasato golf course" has been newly added.

Note that the category and the expected range for each primary base point are calculated in the present embodiment. Thus, it becomes possible to more flexibly update the map according to the movement characteristics of the user. Hereinafter, the definition of a primary base point is described using diagrams.

FIG. 70 is a diagram showing an example of a table (movement model) including destination categories and expected ranges which are calculated with respect to "office" which is another primary base point. As the destination categories, "restaurant" and "supermarket" are identified, and the expected ranges according to the movement of each user are calculated. In other words, there are cases where after work, the present user stops by a supermarket for shopping, and stops by a restaurant and the like for dinner, and such movement is reflected.

Figure 71:
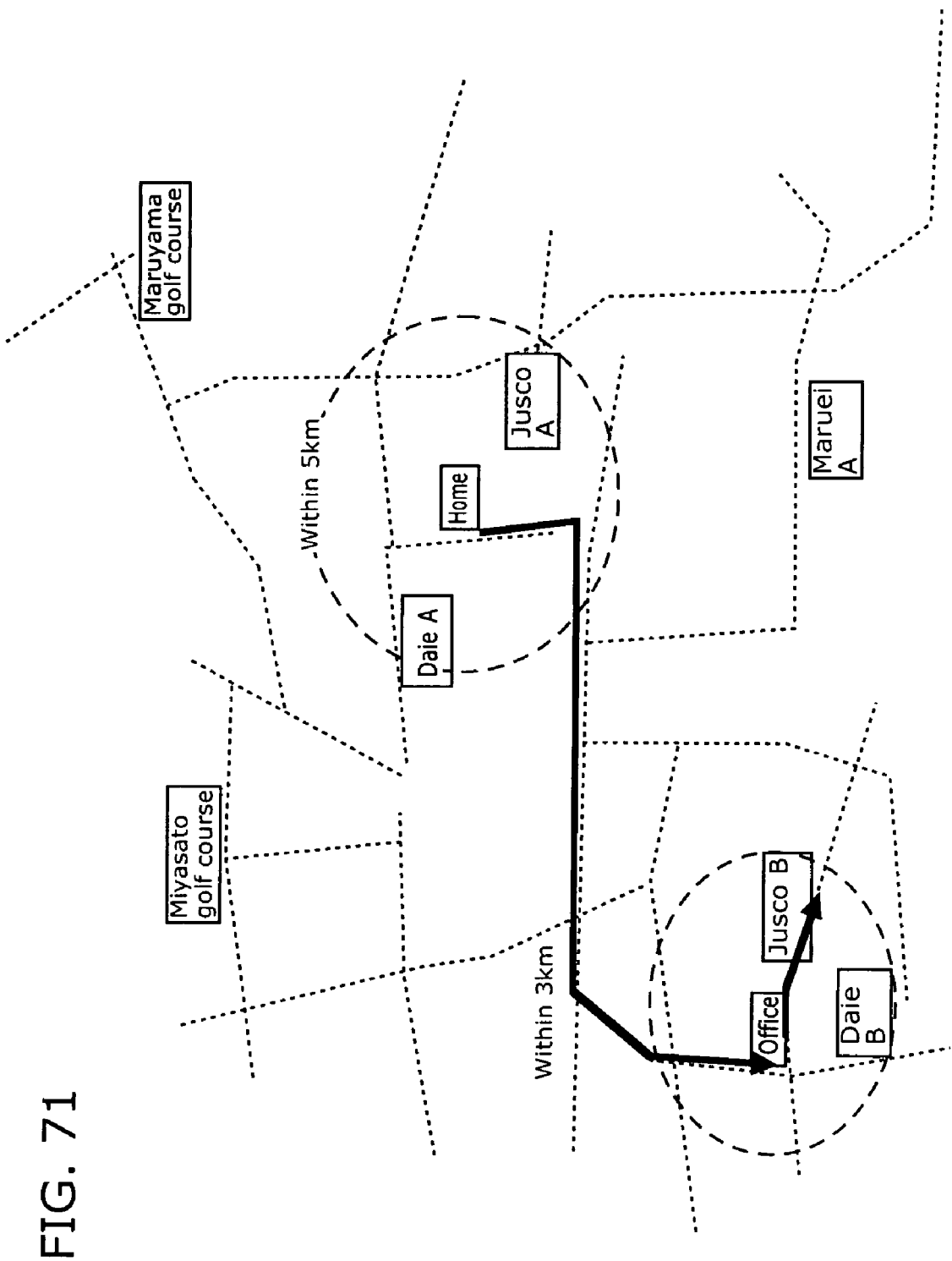
FIG. 71 is a map showing the movement models.

FIG. 71 is a diagram showing, on the map, the expected range of "supermarket" among the movement models as in FIG. 67 and the like. The radius of 3 km with respect to "office" is shown as the expected range of supermarket. Since the present user stops by "Jusco B" after work, the movement model in which this is reflected is shown.

Figure 72:
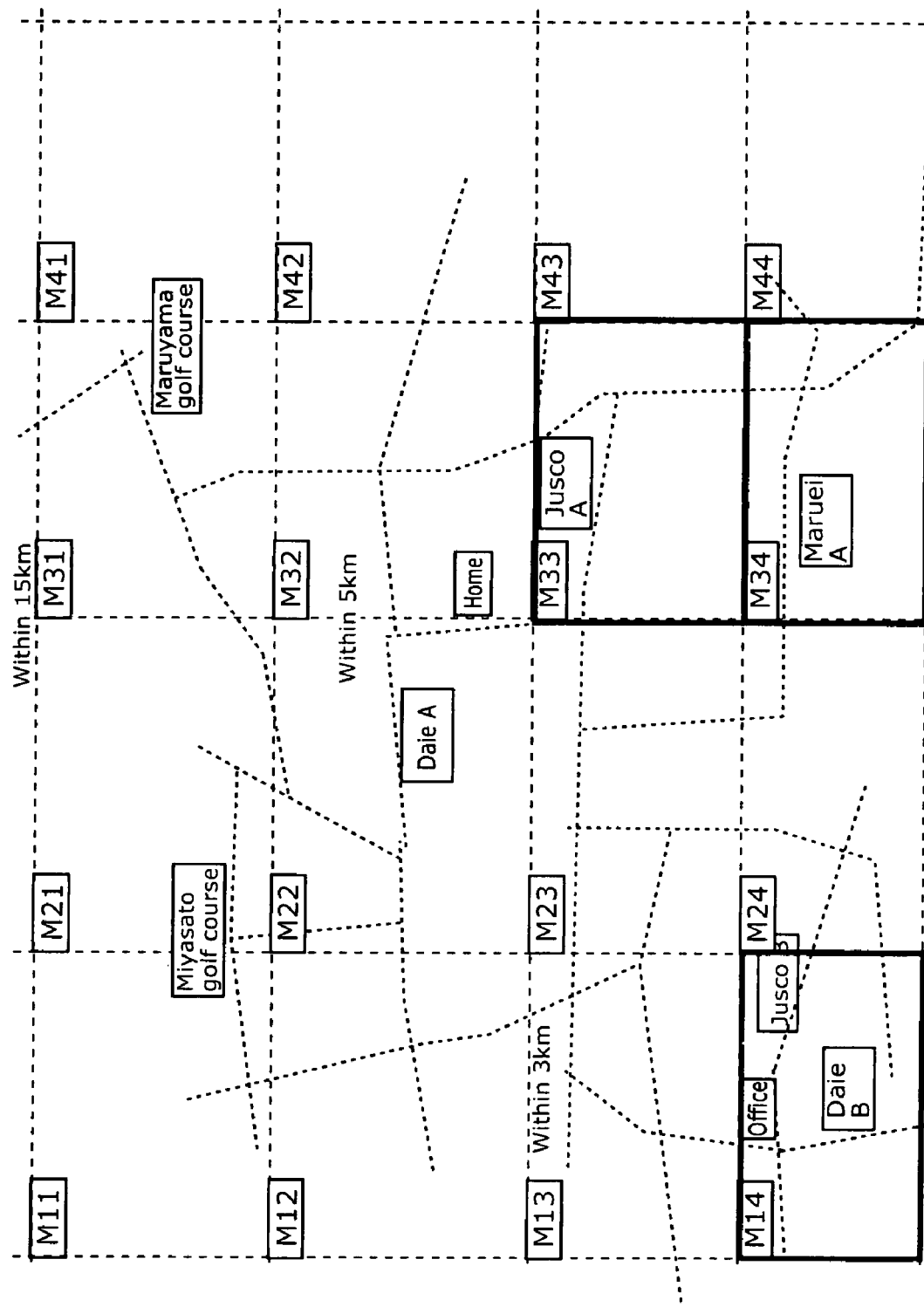
FIG. 72 is a diagram describing the processing of selecting update map.

FIG. 72 is a map showing an area which has been updated with the shopping-exclusive map which is provided by the provider A. Compared to FIG. 71, it is shown that the mesh IDs "M14", "M33", and "M34" have been updated. More specifically, "Daie B" has been newly added in the mesh ID "M14", "Jusco A" has been newly added in the mesh ID "M33", and "Maruei A" has been newly added in the mesh ID "M34", and each of the facility information and the landmark are shown in the diagram.

Figure 73:
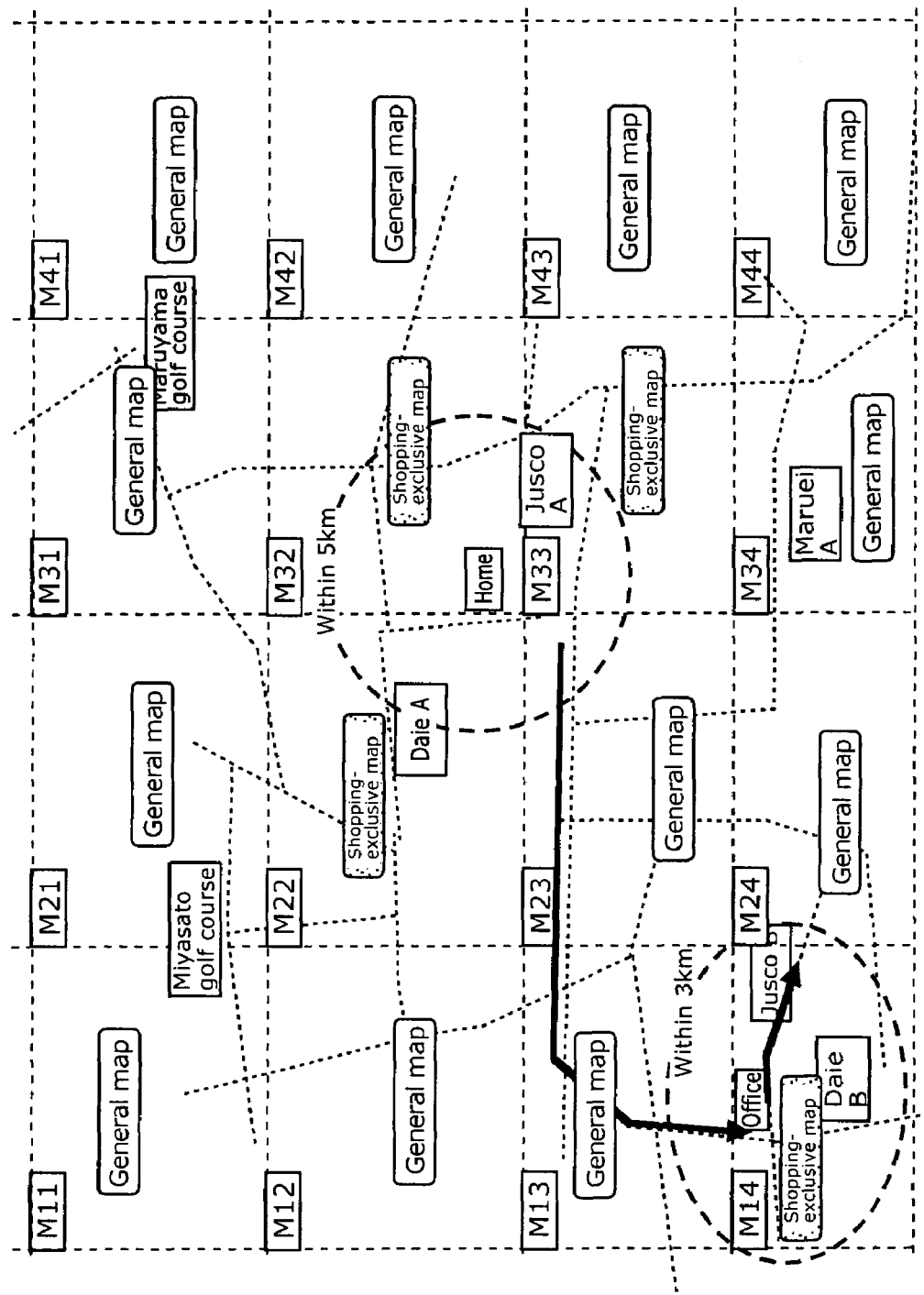
FIG. 73 is a diagram describing the processing of selecting update map.

FIG. 73 shows a map in which the movement model shown in FIG. 71 is reflected in the map which is provided by the provider A and shown in FIG. 72. Since the mesh IDs "M22", "M32", and "M33" are within an expected range of a destination category "supermarket" which is a radius of 5 km with respect to home as shown in FIG. 61, the type of the map used for the update is shopping-exclusive type. Furthermore, since a radius of 3 km with respect to office is within the expected range of the destination category "supermarket" as shown in FIG. 70, "M14" which includes this area is assumed to be updated with the shopping-exclusive map. Since the mesh IDs, such as "M11" and "M12" do not have the corresponding movement models, it is assumed that the type of the map for the updated is "general map" type. Furthermore, "M34" is assumed to be updated with "general map". Thus, the movement model referring unit 132 refers to the movement model stored in the movement model storage unit 129, the selected map determining unit 133 determines the map, and the map information updating unit 105 updates the determined map.

Figure 74:
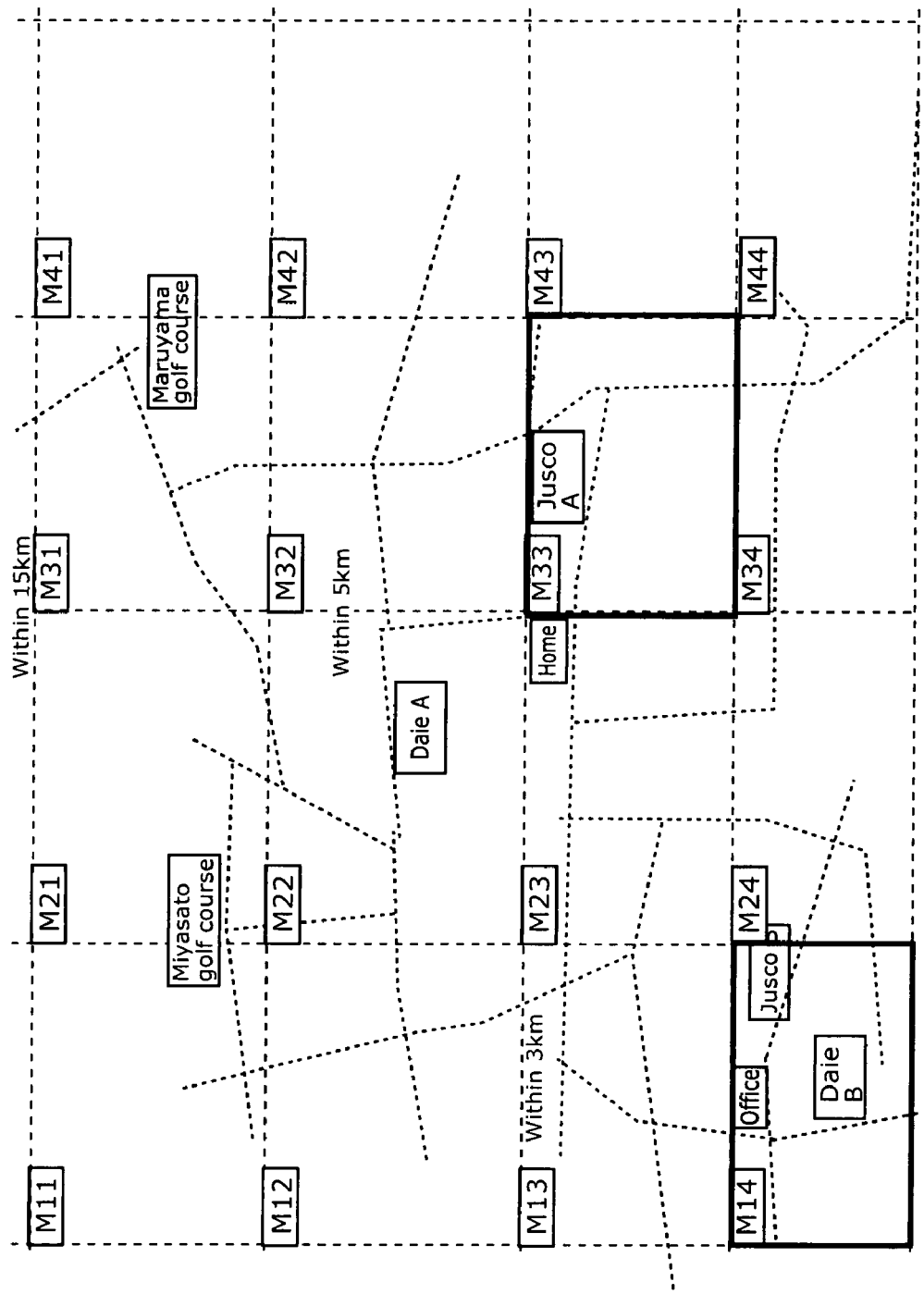
FIG. 74 is a diagram describing the processing of selecting update map.

FIG. 74 is a diagram showing an example of updating the mesh areas with reference to the movement model shown in FIG. 73 among the mesh areas of the map provided in FIG. 72, compared to the map shown in FIG. 71. In FIG. 74, the areas of mesh IDs "M14" and "M33" have been updated. As shown in FIG. 72, the updated mesh areas shown in the plural mesh IDs, such as "M14", "M33", and "M34" are provided in which new stores and the like have been added. The areas indicating movement areas are calculated for each purpose and each user, such as the 5 km radius area with respect to home and 2 km radius area with respect to office, and based on the movement models, the necessary portions of the map are selected and updated. Aside from Maruei A which is located outside of the radius of 5 km from home, since the supermarkets where the user stops by after work become important for the user, it is highly possible that "Jusco B" is necessary information for the user. Thus, it becomes possible to notify appropriate information according to the movement of the user by using the movement model calculated per primary base point.

Next, the operations of the mobile terminal 100c in the present embodiment are described based on the flowchart shown in FIGS. 75, 76, 77, and 78. In the flowchart of the present embodiment, Steps S101 to S103 are the same as those in the first embodiment.

First, the position information detecting unit 101 detects a current position of the mobile terminal 101c (Step S101). Next, the position information detecting unit 101 extracts a destination by referring to a map based on the detected position information (Step S102). The details of the destination are as shown in FIG. 15.

Next, the position information detecting unit 101 makes the movement history storage unit 102 store the destination as a movement history (Step S103). As the movement histories shown in FIG. 54, the destination "Maruyama golf course", the arrival time at the destination "8:50" and the like are stored as the movement history ID "001".

Next, the movement model calculating unit 122 calculates the movement model based on the movement history (Step S1042).

More specifically, the primary base point extracting unit 123 first calculates the primary base point. Here, the calculation is performed based on the arrival frequency and average period of stays at the destination. More specifically, the primary base point extracting unit 123 refers to the destination ID and arrival time of the movement history (Step S901 in FIG. 76). Then, the primary base point extracting unit 123 refers to the start time of the departure point in the next movement history (Step S902). Then, the primary base point extracting unit 123 calculates the period of the stay corresponding to the ID (Step S903). In the movement histories as shown in FIG. 54, the primary base point extracting unit 123 calculates 5 hours 55 minutes (16:45-8:50) as a period of stay based on the arrival time 8:50 at Maruyama golf course (N51) and the start time 16:45 in the next movement history "002".

Next, the primary base point extracting unit 123 increments the frequency of the corresponding ID by 1 (Step S904), and adds the period of stay (Step S905). Then, the primary base point extracting unit 123 judges whether or not all of the histories are referred to (Step S906), and when they are referred to (Yes at Step S906), the process proceeds to Step S908. If not (No at Step S906), it proceeds to Step S901, and then the calculation of the frequency of each ID and the period of stays are repeated.

After the frequencies of all IDs and the period of stays are calculated (Yes at Step S906), the primary base point extracting unit 123 refers to the frequency of each of the IDs and the period of stay (Step S908) and divides the period of the stay by the frequency (Step S909) so as to calculate the average period of stay of corresponding ID (Step S910). Then, the primary base point extracting unit 123 judges whether or not the frequency and the average period of stay are equal to or more than the threshold (Step S911). When the value is equal to or more than the threshold (Yes at Step S911), the ID (node) is assumed to be the primary base point (Step S912). When the value is less than the threshold (No at Step S911), the process proceeds to Step S913. Then, the primary base point extracting unit 123 judges whether or not all of the histories are referred to (Step S913), and if not (No at Step S913), it refers to the next ID (Step S914). When all IDs are judged (Yes at Step S913), the process ends. With the repetition of this operation, for example, as shown in FIG. 56, the primary base points of the user are extracted, such as the stay frequency at home (N100) "320 times'" and average period of stay "16 hours 20 minutes".

Next, the destination referring unit 124 refers to the destinations for each of the extracted primary base points (Step S915 in FIG. 77). Then, the movement cost computation unit 125 refers to the position of the departure point (Step S916), and calculates the movement cost (distance herein) based on the positions of the destination and departure point (Step S917). Furthermore, the landmark information extracting unit 110 identifies the category of the destination (Step S918).

The movement area classifying unit 127 judges whether or not the movement cost of the corresponding category (distance) is larger than the movement costs of the corresponding categories which have already been calculated (the initial value is assumed to be 0) (Step S919). When it is larger, the process proceeds to Step S920, and when smaller, the process returns to Step S915. When it is larger (Yes at Step S919), the cost is determined to be within the expected range of the corresponding category (Step S920). The movement area classifying unit 127 judges whether or not the judgment is performed on all movement histories (Step S921). When it is not performed yet (No at Step S921), the process proceeds to Step S915, and when performed on all histories (Yes at Step S921), the process proceeds to Step S922. Then, the movement model generating unit 128 stores the obtained category and expected range in the movement model storage unit 129 as a movement model (Step S922). The movement area classifying unit 127 judges whether or not the judgment is performed on all categories (Step S923). When it is not performed yet (No at Step S923), the movement area classifying unit 127 refers to the next category (Step S924), and the process returns to Step S922. On the other hand, when it is performed on all categories (Yes at Step S923), the movement model generating unit 128 stores the generated movement model in the movement model storage unit 129 (Step S925).

Then, the map information selecting unit 104 refers to the generated movement model and selects map information (Step S1051).

Figure 78:
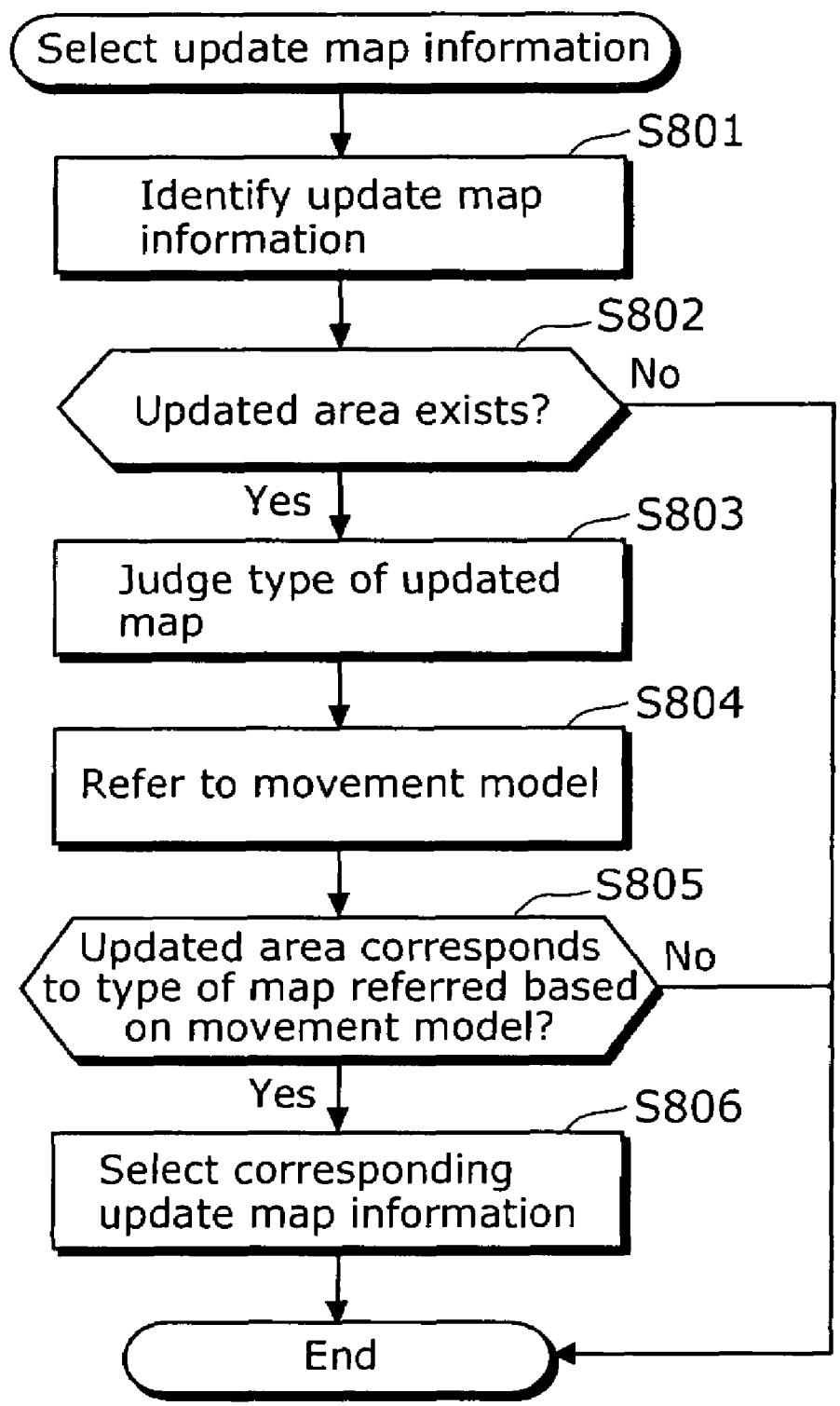
FIG. 78 is a flowchart showing the operation of the mobile terminal (selection of update map information).

More specifically, the update area identifying unit 130 identifies the update map information from among the provided plural map information (Step S801 in FIG. 78). The update area identifying unit 130 judges whether or not the area to be updated exists (Step S802). When it exists (Yes at Step S802), the process proceeds to Step S803, and if not, the process ends (No at Step S802). When it exists (Yes at Step S802), the map type judging unit 131 judges the type of the update map (Step S803). On the other hand, the movement model referring unit 132 refers to the movement model stored in the movement model storage unit 129 (Step S804). Then, the selected map determining unit 133 judges whether or not the type of the updated area which is identified by the update area identifying unit 130 (the type judged by the map type judging unit 131) corresponds to the type of the map referred based on the movement model (Step S805). When corresponding to it (Yes at Step S805), the selected map determining unit 133 selects the corresponding map (Step S806), and if not (No at Step S805), the process ends.

Figure 75:
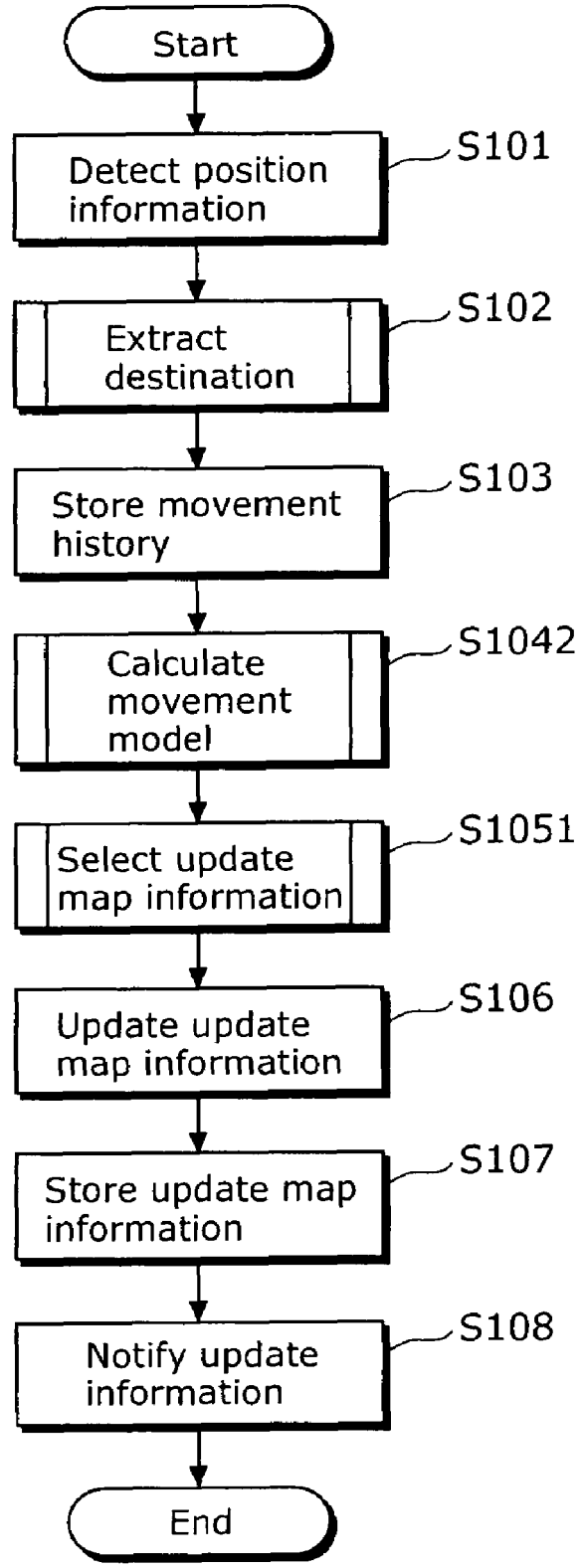
FIG. 75 is a flowchart showing the operation of the mobile terminal.
Figure 76:
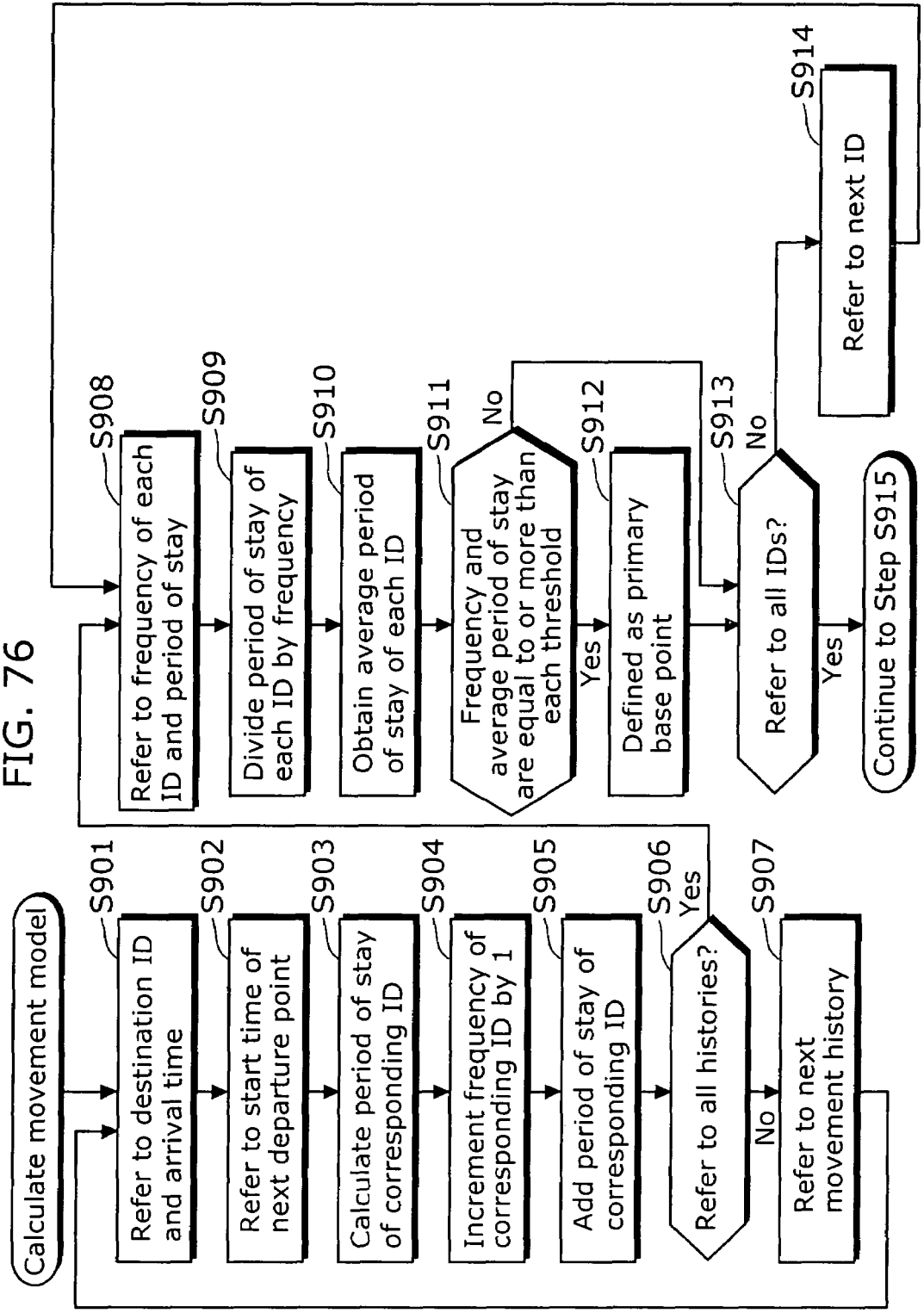
FIG. 76 is a flowchart showing the operation of the mobile terminal (calculation of movement models).

Note that Steps S106 to Step S108 in FIG. 75 are the same as those in the first embodiment. In other words, the map information selecting unit 104a updates the selected map (Step S106), and stores it in the map information storage unit 106 (Step S107). Then, the update information notifying unit 107 notifies the user of the updated map information (Step S108).

Note that the extraction of the primary base point in the present embodiment is performed based on the destinations which the user has reached in the past. In other words, the primary base point extracting unit 123 extracts a point to be the primary base point, based on the destinations in the movement histories stored in the movement history storage unit 102. Then, the expected range for each category is obtained from the point, and the movement model is calculated. However, the points which the user defines as the base points are not limited to the destinations. For example, normal routes for commuting, main intersections and the like may be the primary base points. Hereinafter, another example of the primary base point is described using FIG. 79.

Figure 79:
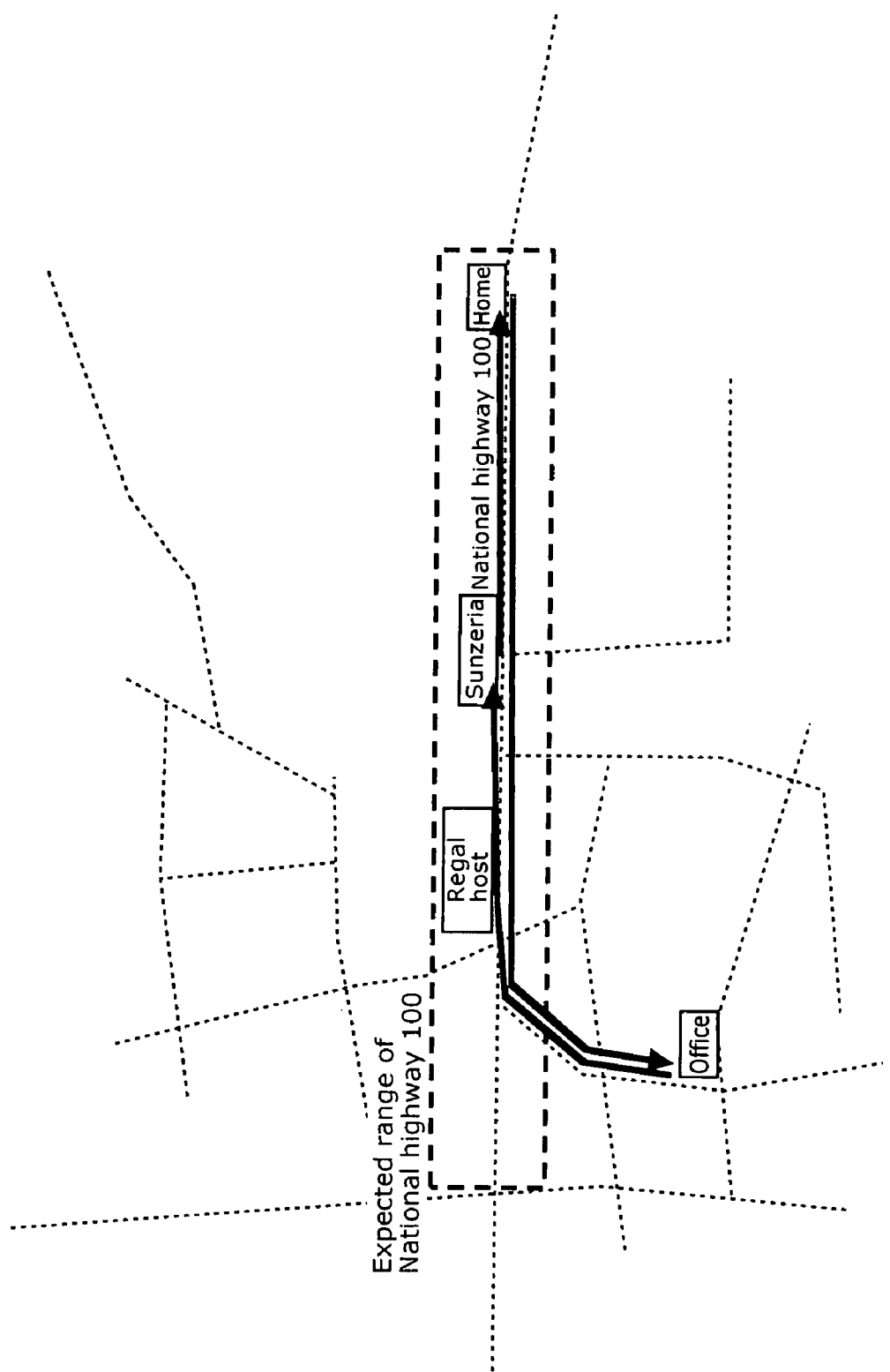
FIG. 79 is a map describing another example of a movement model.

On the map shown in FIG. 79, as in FIG. 71 and the like, the movement of the user when commuting from home to office is indicated by a thick black line. The line shows that the traveling route is "National road 100". It is assumed that the user of the present embodiment customarily stops by a restaurant "Sunzeria" after work. In the present embodiment, although only departure points and destinations are stored as the movement histories as shown in FIG. 54, it becomes possible to extract, by storing traveling routes as shown in FIG. 34 and the like, main routes and the like in which the movement characteristics of the user are reflected. In the case of the user of the present embodiment, "National road 100" is extracted as a primary base point. Then, as the movement model, the category "restaurant" is calculated for the primary base point "National road 100". Furthermore, when the primary base point is a route, the expected range may be defined as the area along the route. With this, the movement model is calculated in which the movement of the user is reflected, such as traveling along the National road 100 for commuting and dining at a restaurant on National road 100.

It is assumed that the map shown in FIG. 79 has been updated and information that a new restaurant "Regal host" has opened is obtained. In this case, since "National road 100" and "restaurant" are accordingly calculated as the movement model and the new restaurant "Regal host" corresponds to the movement model, the portion of the map which corresponds to the area is updated and it is notified to the user. When a new restaurant has been built along the route for commuting, in many cases, the information is necessary for the present user, who normally dines at a restaurant while commuting. Since the information is automatically updated, the user can easily obtain necessary map information without complicated operations.

Figure 80:
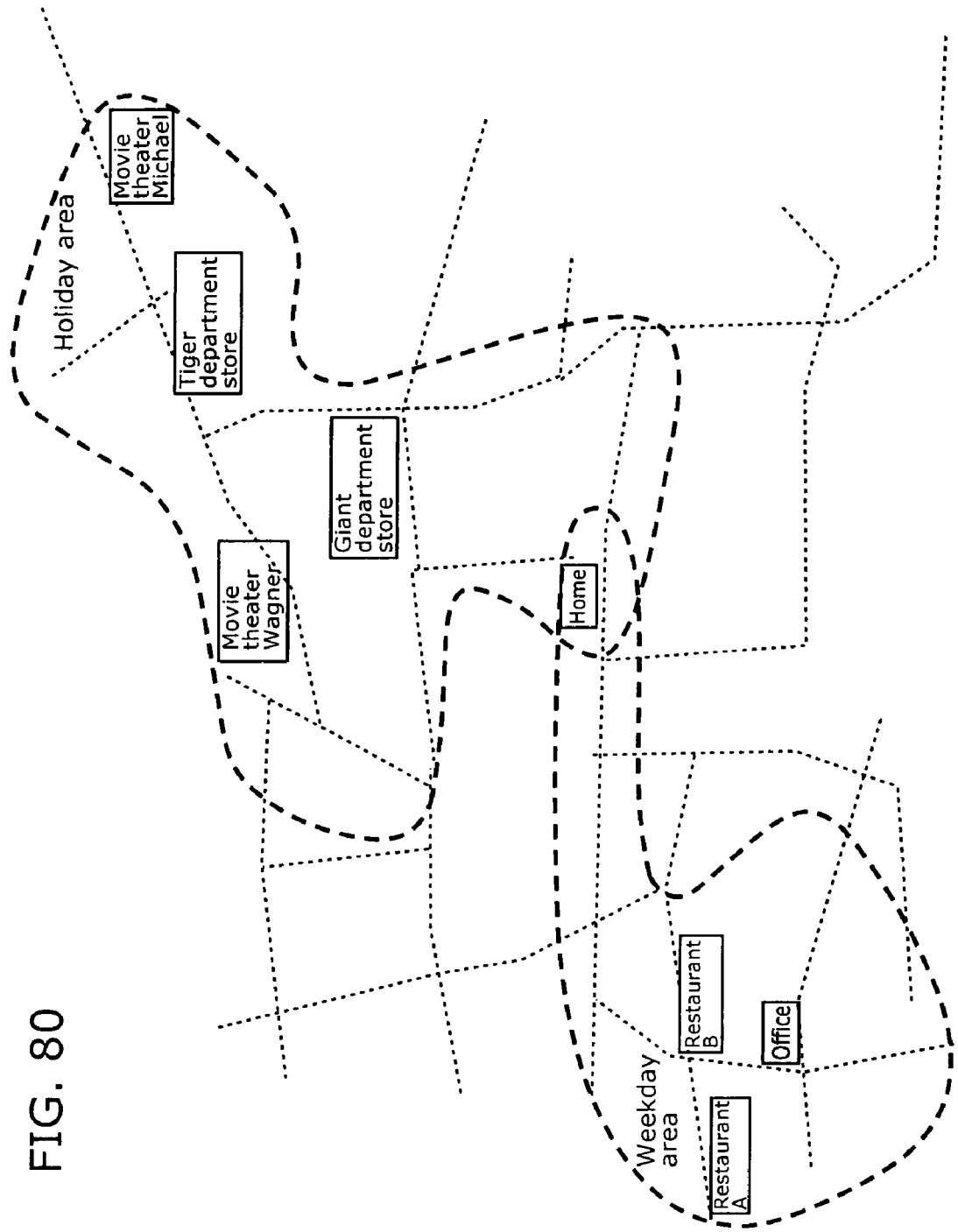
FIG. 80 is a map describing another example of movement models.

Furthermore, although in the present embodiment, the movement model is calculated by determining the expected range for each category of the locations, based on the point and the distance, the method of calculating the movement model is not limited to such. For example, the movement model may be calculated using date and time information from the movement histories. In many cases, the movement areas of the user are generally different between weekdays and holidays. In many cases, the movement of the user depends on the date and time. For example, during weekdays, the movement area of the user ranges from the commuting route to its vicinity, as the user commutes to work and the like, and during holidays, the user moves to recreational facilities, urban areas and the like. Besides, the user moves in the vicinity of home, regardless of weekdays and holidays. Thus, based on the movement histories, the movement areas may be categorized, depending on whether the user moves during weekdays or holidays so as to calculate the movement model. Hereinafter, the specific example is described using diagrams. In the map shown in FIG. 80, the areas are shown in which the area is categorized into "holiday area" and "weekday area" respectively indicated by dotted circles. It is possible to identify the category of the areas based on the date and time information stored as the movement histories. The routes between home and office and its vicinity show the movement area of the user of the present embodiment during weekdays. Thus, by mapping the histories during weekdays, it is possible to identify the weekday area. On the other hand, during holidays, the user tends to moves for recreation, such as shopping and going to movies, and thus, by mapping the histories during holidays, it is possible to identify the holiday area.

FIG. 81 is a diagram showing an example of a movement model in which the categories corresponding to these areas are extracted. As the weekday area, the corresponding category "restaurant" is stored. On the other hand, as the weekend area, the categories "movie" and "department" are stored. There are cases where the movement area is different, depending on the user. Thus, even when a new movie theater has been built in the vicinity of the office to which the user commutes only during weekdays, the information is not always necessary for the user. However, when a new movie theater has been built in an area where the user acts during holidays, in many cases, the information is necessary for the user. Thus, when a map is to be updated with a movie-exclusive map which details movie information and the like, it is possible to selectively update the map according to the needs of the user. For example, while the update is performed on the selected holiday area, the update is not performed on the weekday area.

Furthermore, it becomes possible to reduce the charge and communication cost by selecting and updating necessary areas. For example, special-purpose maps detailing specific areas have the added values, and there are cases where they are more costly than general maps. Although it is more costly to update all areas with such special-purpose maps, the communication cost and cost for obtaining a map can be reduced by updating an area of a map with a necessary type of a map according to the area and for each user.

Furthermore, in the present embodiment, when the map information is selected based on the calculated movement model, the information indicating the type of the map is given to the map information so as to select and update the type of the map corresponding to the movement model. Furthermore, as shown in the first embodiment, even when the map is selected and updated based on the landmark information extracted by the landmark information extracting unit 110, the map is selected based on the type of the map specified in advance. Thus, under the environment where different types of maps are provided from different map providers, it is necessary to identify a type of a map and to select a map necessary for the user. For example, as in the case of the map type, the golfing-exclusive map shown in FIG. 11, when the type of the map is clearly specified on the map, the update map can be selected and the original map is updated using the update map selected based on the type of the map. However, the type of a map is not always specified on each map. Thus, the first embodiment describes that the type of the map can be judged by analyzing the text described on the map information (refer to FIG. 25). The present embodiment further describes a method of identifying facilities common to both maps, and judging a type of a map based on the information regarding the identified facilities.

Figure 82:
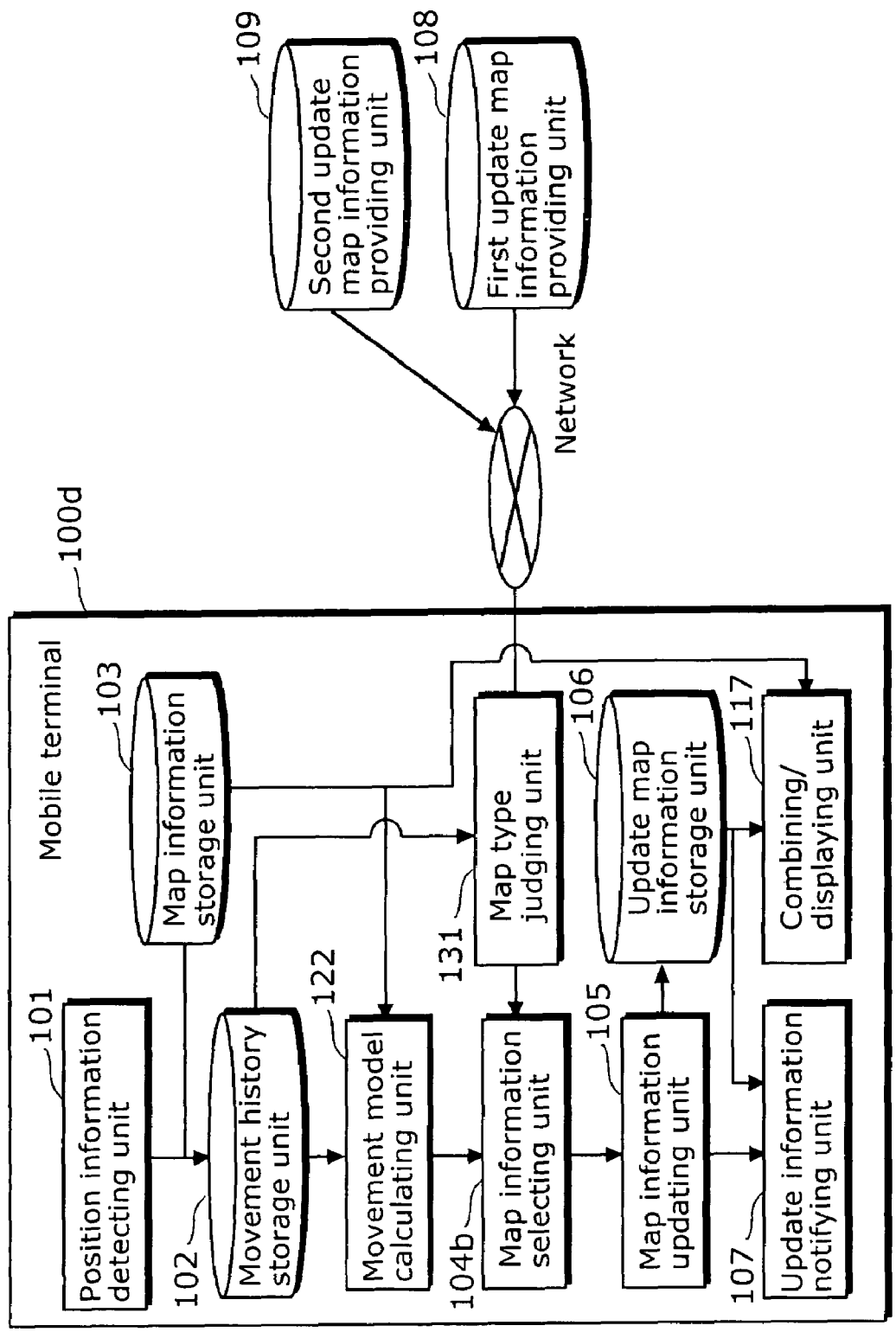
FIG. 82 is a diagram showing the configuration of the mobile terminal according to the variation of the fourth embodiment of the present invention.

FIG. 82 is a block diagram showing the configuration of the mobile terminal 100*d* as a variation of the present embodiment. This mobile terminal 100*d* has the configuration similar to the mobile terminal 100*c* in the fourth embodiment shown in FIG. 53, and differs from the fourth embodiment in having the map information selecting unit 104*b* instead of the map information selecting unit 104*a* in the fourth embodiment, and in further having the map type judging unit 131. Hereinafter, the same unit numbers are given to the units having the same configuration as in the fourth embodiment, and the difference between the first and the fourth embodiments are mainly described.

Figure 83:
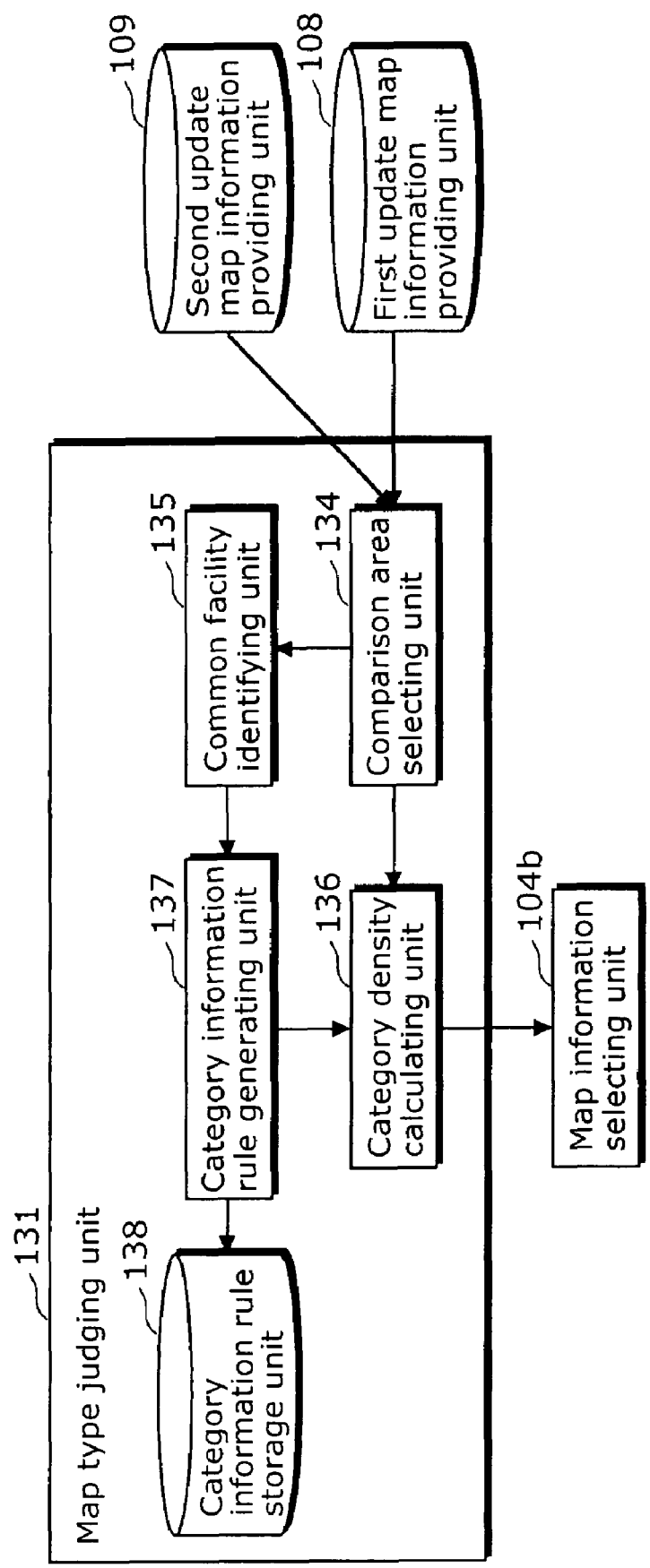
FIG. 83 is a block diagram showing the detailed configuration of the map type judging unit.

The map type judging unit 131 is a processing unit which judges a type of each of the update map information respectively provided by the first update map information providing unit 108 and the second update map information providing unit 109, and as shown in FIG. 83, it includes a comparison area selecting unit 134, a common facility identifying unit 135, a category density calculating unit 136, a category information rule generating unit 137, and a category information rule storage unit 138.

The comparison area selecting unit 134 is a processing unit which selects an area to be compared to, from the first map provided by the first update map information providing unit 108 and the second map provided by the second update map information providing unit 109. For example, the comparison area selecting unit 134 selects areas as areas to be updated and in which the common area is compared.

Figure 84:
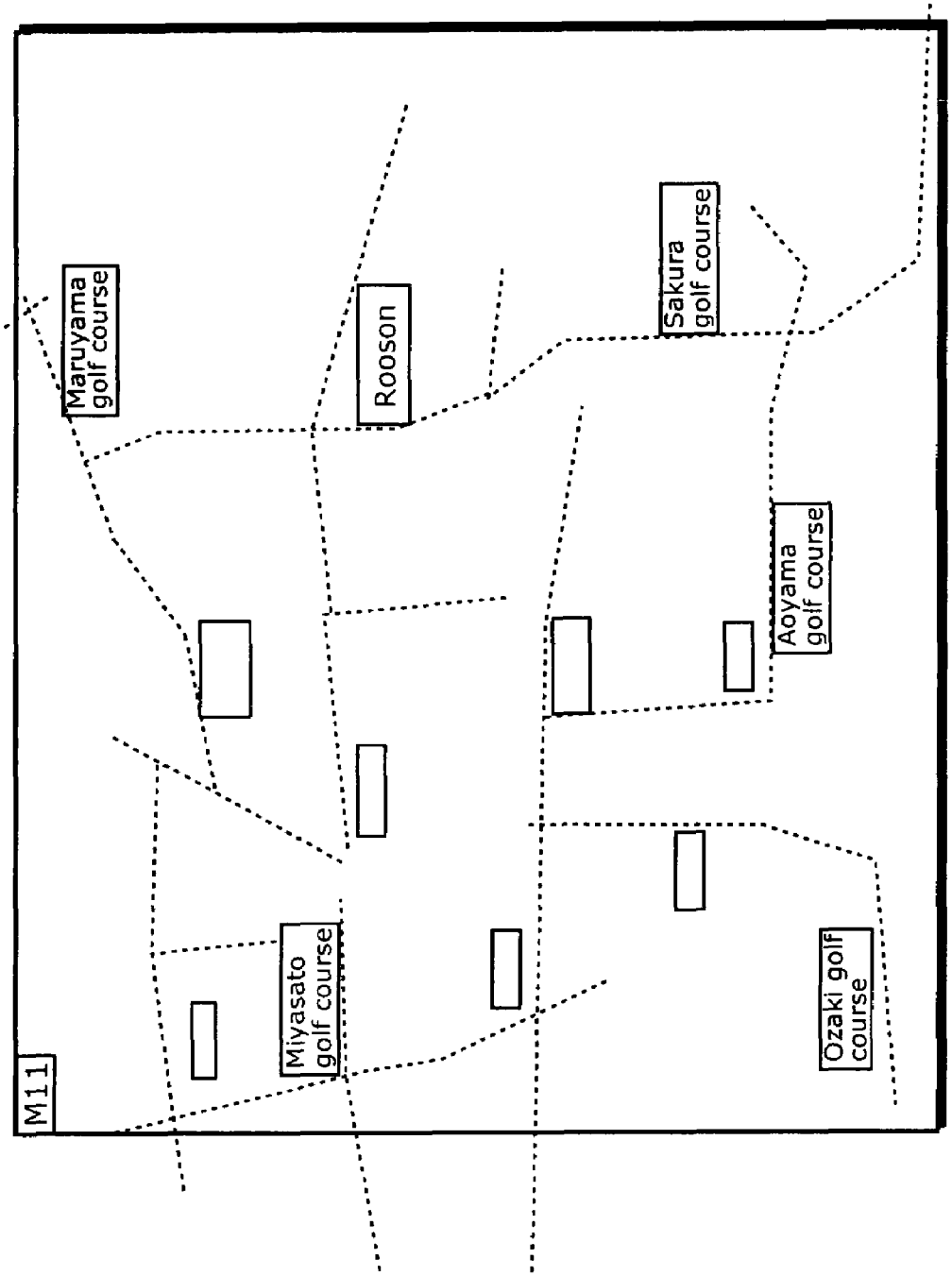
FIG. 84 is a diagram showing an example of the first map information.
Figure 85:
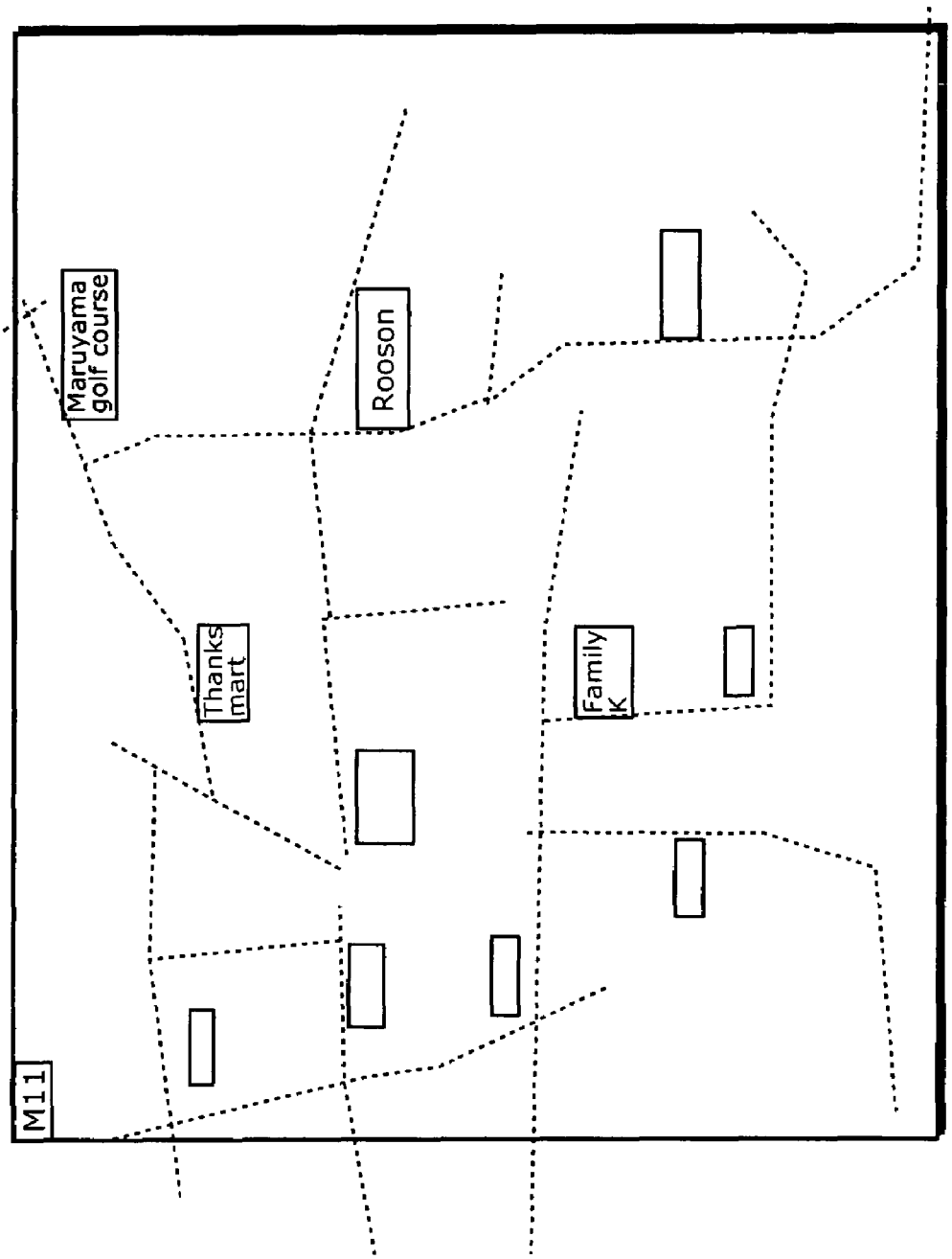
FIG. 85 is a diagram showing an example of the second map information.

FIG. 84 is an update map stored in the first update map information providing unit 108, and is a map provided by the provider A. The first map provided by this provider A is a detailed map related to golfing. Then, it is assumed that the area of the mesh ID "M11" has been updated. On the other hand, FIG. 85 is an update map stored in the second update map information providing unit 109, and is a map provided by the provider B. The second map provided by the provider B is a map detailing commercial information, such as convenience store information. Then, it is assumed that the area of the mesh ID "M11" has been updated.

The comparison area selecting unit 134 identifies "M11" as an area to be compared to in this example. The common facility identifying unit 135 is a processing unit which identifies a common facility on the maps to be compared to.

The category information rule generating unit 137 is a processing unit which generate a rule of information regarding the categories so as to compare different types of map information from among the plural information regarding a facility identified as the common facility, and the category information rule generating unit 137 stores the generated rule of the information in the category information rule storage unit 138.

The category density calculating unit 136 calculates the density of landmarks which belong to a category according to the category information rule generated by the category information rule generating unit 137, and judges the type of the map. Hereinafter, the following describes the specific example.

Figure 86:
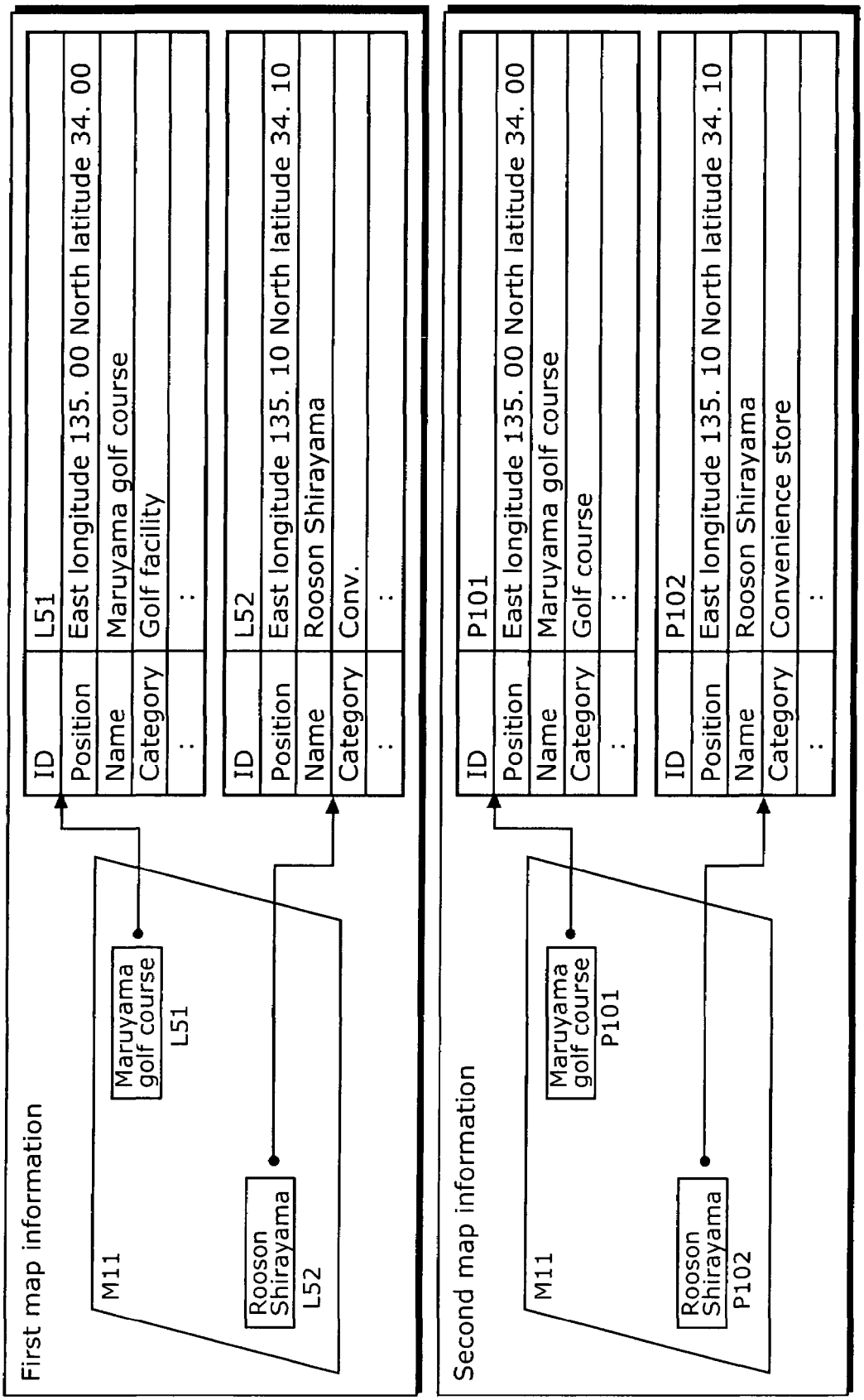
FIG. 86 is a diagram showing landmark information on the first and second map information.

At present, the map information is configured in the layers as shown in FIG. 4 according to the first embodiment. The layers include layers of the landmark information indicating the detailed information of facilities and the like. FIG. 86 is a diagram showing the comparison of the layers of landmark information between the first map shown in FIG. 84 and the second map shown in FIG. 85. Herein, the information regarding "Maruyama golf course" which is one of the facilities is stored in each map. More specifically, the ID "L51", the point of longitude 135 degrees 00 minutes east and latitude 34 degrees 00 minutes north, the name "Maruyama golf course", and the category "golf facility" are stored in the first map. The ID "P101", the point of longitude 135 degrees 00 minutes east and latitude 34 degrees 00 minutes north, the name "Maruyama golf course", and the category "golf course" are also stored in the second map. Similarly, the information regarding "Rooson Shirayama" is also stored in each map. More specifically, the ID "L52", the point of longitude 135 degrees 10 minutes east and latitude 34 degrees 10 minutes north, the name "Rooson Shirayama", and the category "conv." are stored in the first map. The ID "P102", the point of longitude 135 degrees 10 minutes east and latitude 34 degrees 10 minutes north, the name "Rooson Shirayama", and the category "convenience store" are stored in the second map.

As shown in FIGS. 10 and 12, when the map information includes the types of map, it is possible to select and update the type of the map based on the extracted movement characteristics of the user. However, the types of the maps are not always specified. In this case, it is necessary to compare the plural map information, for example, using the number of landmarks which belong to a category of the facilities where the user frequently visit, and then to judge the type of the map, to select the map, and to update the original map using the selected map. However, since the maps are different from one another and the categories of the facilities are not always common, there are cases where the accurate comparison becomes difficult. In the present embodiment, since "Maruyama golf course" indicates the common facility in each map information, it is obvious that the position is the same. On the other hand, as "category" indicating an attribute of a facility, "Maruyama golf course" is stored as "golf facility" in the first map, while it is stored as "golf course" in the second map. As described above, even when the map information indicates the same geographic information, in the case where the providers are different from one another and the like, the maps are stored in different systems. In addition, even when the number and the density of landmarks which belong to certain categories are simply compared to, since the systems of both of the maps are not unified, it is not possible to compare the maps. Thus, in the present embodiment, the common facility is identified, and the rule of the category information is generated so as to compare the maps based on the identified information of the common facility.

The common facility identifying unit 135 identifies a common facility based on the information regarding the positions of the facilities among the landmark information. For example, as shown in the example in FIG. 86, the facilities indicating "Maruyama golf course" are located at the same point of longitude 135 degrees 00 minutes east and latitude 34 degrees 00 minutes north. Thus, these are identified as the common facility.

The category information rule generating unit 137 generates a rule of the category based on the facility identified as the same facility. For example, it is obvious that "Maruyama golf course" is categorized as "golf facility" in the first map provided by the provider A, because the golf courses in the first map are all stored as the category "golf facility". On the other hand, it is obvious that "Maruyama golf course" is categorized as "golf course" in the second map provided by the provider B, because the golf courses in the second map are all stored as the category "golf course". Thus, the category information rule generating unit 137 generates a rule that the category "golf facility" and the category "golf course" indicate the same type of facility, and stores the rule in the category information rule storage unit 138 so that the landmarks on both of the maps can be accurately compared to.

FIG. 87 is a diagram showing an example of a rule regarding the category information which has been generated in the category information rule generating unit 137 and stored in the category information rule storage unit 138. The category information rule generating unit 137 generates a rule indicating that the category "golf facility" and the category "golf course" are the common type of a facility (hereinafter, the category indicating the same type of a facility is referred to as "common category"), and the category information rule storage unit 138 stores the rule. "Rooson Shirayama" is categorized as "conv." in the first map, because the convenience stores are all stored as the category "conv." in the first map. On the other hand, Rooson Shirayama is categorized as "convenient store" in the second map, because the convenience stores are all stored as the category "convenient store" in the second map. In this example, the category information rule generating unit 137 generates a rule that the category "conv." and the category "convenient store" indicate the same type of a facility, and stores the rule in the category information rule storage unit 138 so that both of the landmarks can be accurately compared to. In other words, as shown in FIG. 87, it is shown that the category "conv." and the category "convenient store" belongs to the common category.

The category density calculating unit 136 is a processing unit which calculates the density of landmarks on the area to be selected and compared by the comparison area selecting unit 134, and which judges the type of the map based on the density of the landmarks.

FIG. 88 is a diagram displaying, as a list, the landmarks present on the mesh ID "M11" which is a comparison area of the first map shown in FIG. 84, and showing the number of landmarks for each category which is calculated by the category density calculating unit 136 (category density). In the mesh ID "M11" on the first map, it is calculated that there are five locations which belong to the category "golf facility", such as "Maruyama golf course" and "Sakura golf course". On the other hand, it is calculated that a "single location", in other word, "Rooson Shirayama" is present as the category "conv." on the map. Note that the area is common each other, and the density of the landmarks is proportioned to the number of the landmarks. Thus, the category is expressed by the number of the points (locations).

On the other hand, FIG. 89 is a diagram displaying, as a list, the landmarks present on the mesh ID "M11" which is a comparison area of the second map shown in FIG. 85, and showing the number of the landmarks for each category which is calculated by the category density calculating unit 136 (category density). In the mesh ID "M11" on the second map, it is calculated that there are locations which belong to the category "golf course", such as "Maruyama golf course" and "Ozaki golf course". On the other hand, it is calculated that there are total "three locations" including "Rooson Shirayama", as the category "convenience store".

Herein, when both of the maps are compared to, it is not possible to perform comparison by simply comparing each category. Depending on the maps, the terms indicating categories of facilities are not always used in common. The present embodiment uses different terms, such as the categories "golf facility" and "golf course", and the categories "conv." and "convenience store". As the variation of the present embodiment, the category information rule generating unit 137 generates a rule that the aforementioned categories are common each other as a category information rule, and stores the generated category information rule in the category information rule storage unit 138. Thus, by referring to the category information rule, it is possible to compare both of the maps and to judge the specialty of the map.

For example, since the category information rule that the categories "golf facility" and "golf course" belongs to the common category is stored, it is possible to compare the first map with the second map. The map information selecting unit 104b can judge that there is more golf specialty in the first map, as the density of category "golf facility" is higher than the second map. Through these processes, as in the first embodiment, the first map is selected and updated by the map information updating unit 105. Alternatively, since the category information rule that the categories "conv." and "convenience store" belongs to the common category is stored, it is possible to compare the first map with the second map. The map information selecting unit 104b can judge that there is more specialty in the second map as a map regarding convenience stores, as the density of category "convenience store" is higher than the first map. Thus, the second map can be selected and updated by the map information updating unit 105.

As described above, each of the map information to be provided is generally stored in each different format. Thus, in order to select and update these maps according to the movement models of the user, it is necessary to judge which area of a specialty each map has. Then, in the variation of the present embodiment, it becomes possible to perform accurate comparison by identifying a common facility on the maps to be compared to and generating a rule indicating a relationship between the categories of the facilities, and to judge the specialty of each map.

Figure 90:
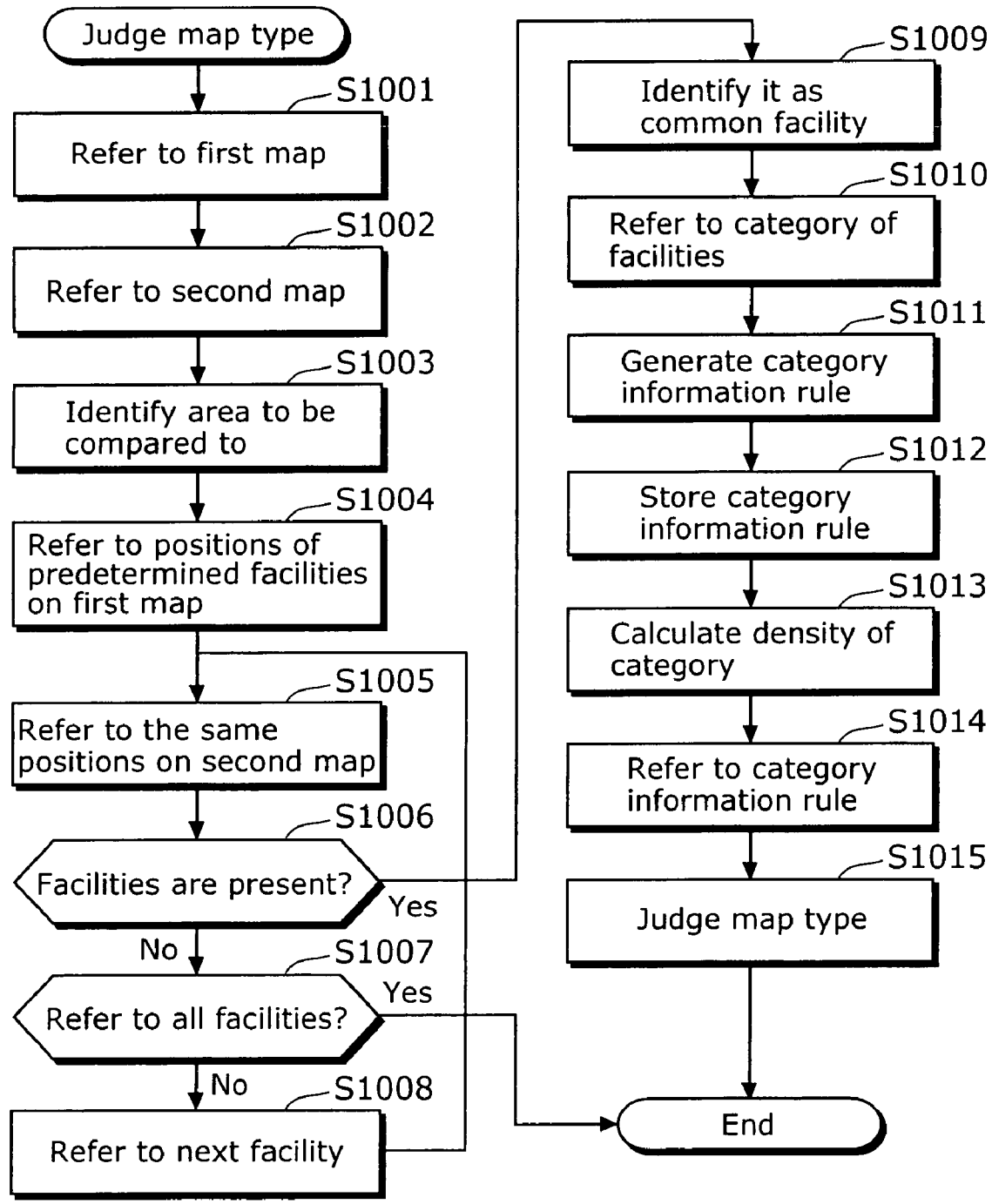
FIG. 90 is a flowchart showing the operation of the mobile terminal according to the variation.

Next, the operation of judging a map type by the map type judging unit 131 of the mobile terminal 100d according to the variation of the present embodiment is described using a flowchart shown in FIG. 90.

First, the comparison area selecting unit 134 refers to the first map (Step S1001), then refers to the second map (Step S1002), and identifies an area to be compared to (Step S1003).

Then, the common facility identifying unit 135 refers to positions of predetermined facilities on the first map, for example, the position of facilities in ascending order by ID (Step S1004), and by referring to the same positions on the second map (Step S1005), it judges whether or not the facilities are present (Step S1006). When the positions are present (Yes at Step S1006), the process proceeds to Step S1009. On the other hand, when not present (No at Step S1006), the common facility identifying unit 135 judges that all facilities are referred to (Step S1007). When not referred yet (No at Step S1007), the next facility is referred to (Step S1008), and the process returns to Step S1005. When all facilities are referred to, the process ends (Yes at Step S1007).

When the facilities are present (Yes at Step S1006), the common facility identifying unit 135 identifies them as the common facility (Step S1009). Then, the category information rule generating unit 137 refers to the category of the facilities (Step S1010) and generates a category information rule (Step S1011), and stores the generated category information rule in the category information rule storage unit 138 (Step S1012).

Next, the category density calculating unit 136 calculates the density of the facilities which belong to the category (Step S1013). Then, the category density calculating unit 136 refers to the category information rule (Step S1014), and judges the type of the map by comparing the maps (Step S1015).

Note that the generated category information rule is stored in the category information rule storage unit 138 in the variation of the present embodiment. This is for reflecting the updated map. Hereinafter, the effect is described. In the first embodiment, the landmarks are extracted from the destinations of the user stored in the movement history storage unit 102 so as to select a map. In this case, the category of destinations is calculated using the categories of the landmarks of the facilities stored in the map information storage unit 103. However, while the present mobile terminal is being used, plural different types of maps are being stored. Thus, it is not always possible to calculate the category of the destinations preferred by the user. In other words, even when the user who likes golf visits the common golf facility, a certain location is stored as "golf facility", and another location is stored as "golf course". Thus, the locations are counted as different facilities. Then, the generated category information rule may be stored in the category information rule storage unit 138, and the category information rule may be referred by the landmark information extracting unit 110 according to the first embodiment and by the movement model calculating unit 122 according to the fourth embodiment. With this, it becomes possible to accurately extract the movement characteristics of the user from the systems in which different types of maps are stored.

As described above, although the map information updating apparatus according to the present invention is described based on the first to fourth embodiments, the embodiments are not limited to these. For example, the present invention includes the variations which can be conceived based on these embodiments by a person of ordinary skill in the art, without departing from the scope and spirit of the present invention. Furthermore, the present invention includes the map information updating apparatus which can be achieved with the arbitrary combinations of the units described in the first to fourth embodiments without functionally contradicting the scope.

INDUSTRIAL APPLICABILITY

The present invention is useful as a map information updating apparatus used for a car navigation system, a cellular phone, and a mobile information terminal, which updates installed map information, in particular, as a map information updating apparatus used for a mobile terminal, which provides, for the user, appropriate map information at an appropriate timing from among plural update map information.

What is claimed is:

1. A map information updating apparatus which is connected to plural map information providing devices that provide plural different types of update map information, and which updates map information stored within said apparatus itself, said map information updating apparatus comprising:

a map information storage unit which stores map information;

a position detecting unit operable to detect a current position;

a movement history storage unit which stores, as movement histories, a series of positions detected by said position detecting unit;

a map information selecting/updating unit operable to select one of the plural update map information based on the movement histories stored in said movement history storage unit, and to obtain the selected update map information from the corresponding map information providing device;

an update map information storage unit which stores the update map information obtained by said map information selecting/updating unit;

a combining/displaying unit operable to combine the map information with the update map information, and to display the combined map information so as to display a geographic area with the corresponding update map information from among the geographic areas each having the map information stored in said map information storage unit;

a movement model calculating unit operable to calculate a movement model indicating a characteristic of movement of a user based on the movement histories stored in said movement history storage unit, wherein said map information selecting/updating unit is operable to select update map information corresponding to the movement model calculated by said movement model calculating unit, and to obtain the selected update map information from the corresponding map information providing device, wherein said movement model calculating unit is operable to calculate, as the movement model, movement areas of the user for each category of destinations to which the user moves, based on the movement histories stored in said movement history storage unit, and wherein said map information selecting/updating unit is operable to select map information as the update map information, the map information being map information regarding the movement area indicated by the movement model calculated by said movement model calculating unit and the map information detailing the category.

2. The map information updating apparatus according to claim 1, wherein said movement model calculating unit includes:

a primary base point extracting unit operable to extract a primary base point to be a base point of the movement of the user, based on the movement histories stored in said movement history storage unit;

a movement cost calculating unit operable to calculate a movement cost from the primary base point to a destination in the movement histories;

a landmark information extracting unit operable to identify the category of the destination by referring to landmark information included in the map information stored in said map information storage unit;

a movement area classifying unit operable to classify, into the categories of the destinations as the movement areas, respective expected range of the destinations within which the user moves, based on the categories of the destinations identified by said landmark information extracting unit and the movement cost calculated by said movement cost calculating unit; and a movement model generating unit operable to generate, as the movement model, a table indicating each category of the destinations which is classified by said movement area classifying unit.

3. The map information updating apparatus according to claim 1, wherein said map information selecting/updating unit includes:

an update area identifying unit operable to identify areas to be updated with the plural map information provided by the plural map information providing devices, from the plural map information stored in said map information storage unit;

a map type judging unit operable to judge types of the plural map information provided by the plural map information providing devices;

a movement model referring unit operable to obtain the movement model calculated by said movement model calculating unit, and to refer to the obtained movement model;

a selected map determining unit operable to select map information as the update map information from among the plural map information provided by the plural map information providing devices, the map information having details in which: at least a part of the movement area indicated by the movement model referred by said movement model referring unit is included in the area identified by said update area identifying unit; and the category of the destination indicated by the movement model corresponds to the type of the map judged by said map type judging unit.

4. A map information updating apparatus which is connected to plural map information providing devices that provide plural different types of update map information, and which updates map information stored within said apparatus itself, said map information updating apparatus comprising:

a map information storage unit which stores map information;

a position detecting unit operable to detect a current position;

a movement history storage unit which stores, as movement histories, a series of positions detected by said position detecting unit;

a map information selecting/updating unit operable to select one of the plural update map information based on the movement histories stored in said movement history storage unit, and to obtain the selected update map information from the corresponding map information providing device;

an update map information storage unit which stores the update map information obtained by said map information selecting/updating unit; and a combining/displaying unit operable to combine the map information with the update map information, and to display the combined map information so as to display a geographic area with the corresponding update map information from among the geographic areas each having the map information stored in said map information storage unit, wherein the map information stored in said map information storage unit includes landmark information regarding a landmark, wherein said map information updating apparatus further comprises a landmark information extracting unit operable to extract, from the movement histories stored in said movement history storage unit and the plural map information stored in said map information storage unit, the landmark information in the map information corresponding to a destination in the movement histories, and wherein said map information selecting/updating unit is operable to select the update map information based on the landmark information extracted by said landmark information extracting unit.

5. The map information updating apparatus according to claim 4, wherein the landmark information includes category information indicating a type of the landmark, and wherein said map information selecting/updating unit is operable to select a type of update map information which belongs to a category indicated by the category information included in the landmark information extracted by said landmark information extracting unit.

6. The map information updating apparatus according to claim 5, further comprising an update map type judging unit operable to judge types of the plural update map information, wherein said update map type judging unit is operable to judge a type of a map by analyzing text of the landmark information stored in the map information.

7. The map information updating apparatus according to claim 5, further comprising an update map type judging unit operable to judge types of the plural update map information, wherein said update map type judging unit is operable to judge a type of a map based on a density of landmarks which are present in a predetermined area of the map information.

8. The map information updating apparatus according to claim 7, wherein said update map type judging unit includes:

a common facility identifying unit operable to identify a facility used in the plural update map information in common;

a category information rule calculating unit operable to calculate a rule of category information which is information which includes terms of categories indicating the common facility, based on the common facility identified by said common facility identifying unit; and a landmark density calculating unit operable to calculate the density of the landmarks by referring to the rule of category information calculated by said category information rule calculating unit, wherein said map information selecting/updating unit is operable to select the update map information including a high density of the landmarks which belong to a category indicated by the category information included in the landmark information extracted by said landmark information extracting unit.

9. A map information updating apparatus which is connected to plural map information providing devices that provide plural different types of update map information, and which updates map information stored within said apparatus itself, said map information updating apparatus comprising:

a map information storage unit which stores map information;

a position detecting unit operable to detect a current position;

a movement history storage unit which stores, as movement histories, a series of positions detected by said position detecting unit;

a map information selecting/updating unit operable to select one of the plural update map information based on the movement histories stored in said movement history storage unit, and to obtain the selected update map information from the corresponding map information providing device;

an update map information storage unit which stores the update map information obtained by said map information selecting/updating unit; and a combining/displaying unit operable to combine the map information with the update map information, and to display the combined map information so as to display a geographic area with the corresponding update map information from among the geographic areas each having the map information stored in said map information storage unit, wherein the plural map information providing devices respectively include a searching/outputting unit operable to search for an optimal route which connects a departure point to a destination, and to output the searched result, wherein said map information updating apparatus further comprises:

a route searching requesting unit operable to request the plural map information providing devices respectively to search for the route which connects the departure point to the destination which are stored in said movement history storage unit; and a route comparing unit operable to compare, with the requested route stored in the movement history storage unit, the route outputted from each of the map information providing devices in response to the request issued by said route searching requesting unit, and wherein said map information selecting/updating unit is operable to select update map information provided by the corresponding map information providing device which outputs a route nearest to the requested route stored in the movement history storage unit, based on the comparison result obtained by said route comparing unit.

10. The map information updating apparatus according to claim 9, wherein the plural map information providing devices further respectively include a calculating/outputting unit operable to calculate an amount of time required to travel along the route obtained by the search, and to output the calculated result, wherein said route comparing unit is operable to compare the required time outputted from each of the plural map information providing devices with a required time stored in the movement history storage unit, and wherein said map information selecting/updating unit is operable to output a route nearest to the route stored in the movement history storage unit, based on the comparison result obtained by said route comparing unit, and to select the update map information provided by the corresponding map information providing device which outputs the required time closest to the required time stored in the movement history storage unit.

11. The map information updating apparatus according to claim 9, wherein said route searching requesting unit is operable to request the plural map information providing devices respectively to search for a route which connects the departure point to the destination which are stored in the movement history storage unit in which movement time is the longest among the movement histories stored in said movement history storage unit.

12. A map information updating apparatus which is connected to plural map information providing devices that provide plural different types of update map information, and which updates map information stored within said apparatus itself, said map information updating apparatus comprising:

a map information storage unit which stores map information;

a position detecting unit operable to detect a current position;

a movement history storage unit which stores, as movement histories, a series of positions detected by said position detecting unit;

a map information selecting/updating unit operable to select one of the plural update map information based on the movement histories stored in said movement history storage unit, and to obtain the selected update map information from the corresponding map information providing device;

an update map information storage unit which stores the update map information obtained by said map information selecting/updating unit; and a combining/displaying unit operable to combine the map information with the update map information, and to display the combined map information so as to display a geographic area with the corresponding update map information from among the geographic areas each having the map information stored in said map information storage unit, wherein said map information selecting/updating unit is further operable to select the update map information according to a ratio of an area displaying the map information to a whole display area, the map information being stored in said map information storage unit and the whole display area being displayed by said combining/displaying unit.

13. A map information updating method comprising:

a map information storage step of storing map information in a map information storage unit;

a position detecting step of detecting a current position;

a movement history storage step of storing in a movement history storage unit, as movement histories, a series of positions detected in said position detecting step;

a map information selecting/updating step of selecting one of plural different types of update map information provided by plural map information providing devices based on the movement histories stored in the movement history storage unit, and obtaining the selected update map information from the corresponding map information providing device;

an update map information storage step of storing the update map information obtained in said map information selecting/updating step;

a combining/displaying step of combining the map information with the update map information, and displaying the combined map information so as to display a geographic area with the corresponding update map information from among the geographic areas each having the map information stored in the map information storage unit;

a movement model calculating step of calculating a movement model indicating a characteristic of movement of a user based on the movement histories stored in the movement history storage unit, wherein said map information selecting/updating step comprises selecting update map information corresponding to the movement model calculated in said movement model calculating step, and obtaining the selected update map information from the corresponding map information providing device, wherein said movement model calculating step comprises calculating, as the movement model, movement areas of the user for each category of destinations to which the user moves, based on the movement histories stored in the movement history storage unit, and wherein said map information selecting/updating step comprises selecting map information as the update map information, the map information being map information regarding the movement area indicated by the movement model calculated in said movement model calculating step and the map information detailing the category.

14. A map information updating method comprising:

a map information storage step of storing map information in a map information storage unit;

a position detecting step of detecting a current position;

a movement history storage step of storing in a movement history storage unit, as movement histories, a series of positions detected in said position detecting step;

a map information selecting/updating step of selecting one of plural different types of update map information provided by plural map information providing devices based on the movement histories stored in the movement history storage unit, and obtaining the selected update map information from the corresponding map information providing device;

an update map information storage step of storing the update map information obtained in said map information selecting/updating step;

a combining/displaying step of combining the map information with the update map information, and displaying the combined map information so as to display a geographic area with the corresponding update map information from among the geographic areas each having the map information stored in the map information storage unit;

wherein the map information stored in the map information storage unit includes landmark information regarding a landmark, wherein said map information updating method further comprises a landmark information extracting step of extracting, from the movement histories stored in the movement history storage unit and the plural map information stored in the map information storage unit, the landmark information in the map information corresponding to a destination in the movement histories, and wherein said map information selecting/updating step comprises selecting the update map information based on the landmark information extracted in said landmark information extracting step.

15. A map information updating method comprising:

a map information storage step of storing map information in a map information storage unit;

a position detecting step of detecting a current position;

a movement history storage step of storing in a movement history storage unit, as movement histories, a series of positions detected in said position detecting step;

a map information selecting/updating step of selecting one of plural different types of update map information provided by plural map information providing devices based on the movement histories stored in the movement history storage unit, and obtaining the selected update map information from the corresponding map information providing device;

an update map information storage step of storing the update map information obtained in said map information selecting/updating step;

a combining/displaying step of combining the map information with the update map information, and displaying the combined map information so as to display a geographic area with the corresponding update map information from among the geographic areas each having the map information stored in the map information storage unit;

wherein the plural map information providing devices respectively include a searching/outputting unit operable to search for an optimal route which connects a departure point to a destination, and to output the searched result, wherein said map information updating method further comprises:

a route searching requesting step of requesting the plural map information providing devices respectively to search for the route which connects the departure point to the destination which are stored in the movement history storage unit; and a route comparing step of comparing, with the requested route stored in the movement history storage unit, the route outputted from each of the map information providing devices in response to the request issued in said route searching requesting step, and wherein said map information selecting/updating step comprises selecting update map information provided by the corresponding map information providing device which outputs a route nearest to the requested route stored in the movement history storage unit, based on the comparison result obtained in said route comparing step.

16. A map information updating method comprising:

a map information storage step of storing map information in a map information storage unit;

a position detecting step of detecting a current position;

a movement history storage step of storing in a movement history storage unit, as movement histories, a series of positions detected in said position detecting step;

a map information selecting/updating step of selecting one of plural different types of update map information provided by plural map information providing devices based on the movement histories stored in the movement history storage unit, and obtaining the selected update map information from the corresponding map information providing device;

an update map information storage step of storing the update map information obtained in said map information selecting/updating step; and a combining/displaying step of combining the map information with the update map information, and displaying the combined map information so as to display a geographic area with the corresponding update map information from among the geographic areas each having the map information stored in the map information storage unit, wherein said map information selecting/updating step comprises selecting the update map information according to a ratio of an area displaying the map information to a whole display area, the map information being stored in the map information storage unit and the whole display area being displayed in said combining/displaying step.

17. A computer-readable recording medium having recorded thereon a program for causing a computer to execute a map information updating method, the method comprising:

a map information storage step of storing map information in a map information storage unit;

a position detecting step of detecting a current position;

a movement history storage step of storing in a movement history storage unit, as movement histories, a series of positions detected in said position detecting step;

a map information selecting/updating step of selecting one of plural different types of update map information provided by plural map information providing devices based on the movement histories stored in the movement history storage unit, and obtaining the selected update map information from the corresponding map information providing device;

an update map information storage step of storing the update map information obtained in said map information selecting/updating step;

a combining/displaying step of combining the map information with the update map information, and displaying the combined map information so as to display a geographic area with the corresponding update map information from among the geographic areas each having the map information stored in the map information storage unit;

a movement model calculating step of calculating a movement model indicating a characteristic of movement of a user based on the movement histories stored in the movement history storage unit, wherein said map information selecting/updating step comprises selecting update map information corresponding to the movement model calculated in said movement model calculating step, and obtaining the selected update map information from the corresponding map information providing device, wherein said movement model calculating step comprises calculating, as the movement model, movement areas of the user for each category of destinations to which the user moves, based on the movement histories stored in the movement history storage unit, and wherein said map information selecting/updating step comprises selecting map information as the update map information, the map information being map information regarding the movement area indicated by the movement model calculated in said movement model calculating step and the map information detailing the category.

18. A computer-readable recording medium having recorded thereon a program for causing a computer to execute a map information updating method, the method comprising:

a map information storage step of storing map information in a map information storage unit;

a position detecting step of detecting a current position;

a movement history storage step of storing in a movement history storage unit, as movement histories, a series of positions detected in said position detecting step;

a map information selecting/updating step of selecting one of plural different types of update map information provided by plural map information providing devices based on the movement histories stored in the movement history storage unit, and obtaining the selected update map information from the corresponding map information providing device;

an update map information storage step of storing the update map information obtained in said map information selecting/updating step;

a combining/displaying step of combining the map information with the update map information, and displaying the combined map information so as to display a geographic area with the corresponding update map information from among the geographic areas each having the map information stored in the map information storage unit;

wherein the map information stored in the map information storage unit includes landmark information regarding a landmark, wherein said map information updating method further comprises a landmark information extracting step of extracting, from the movement histories stored in the movement history storage unit and the plural map information stored in the map information storage unit, the landmark information in the map information corresponding to a destination in the movement histories, and wherein said map information selecting/updating step comprises selecting the update map information based on the landmark information extracted in said landmark information extracting step.

19. A computer-readable recording medium having recorded thereon a program for causing a computer to execute a map information updating method, the method comprising:

a map information storage step of storing map information in a map information storage unit;

a position detecting step of detecting a current position;

a movement history storage step of storing in a movement history storage unit, as movement histories, a series of positions detected in said position detecting step;

a map information selecting/updating step of selecting one of plural different types of update map information provided by plural map information providing devices based on the movement histories stored in the movement history storage unit, and obtaining the selected update map information from the corresponding map information providing device;

an update map information storage step of storing the update map information obtained in said map information selecting/updating step;

a combining/displaying step of combining the map information with the update map information, and displaying the combined map information so as to display a geographic area with the corresponding update map information from among the geographic areas each having the map information stored in the map information storage unit;

wherein the plural map information providing devices respectively include a searching/outputting unit operable to search for an optimal route which connects a departure point to a destination, and to output the searched result, wherein said map information updating method further comprises:

a route searching requesting step of requesting the plural map information providing devices respectively to search for the route which connects the departure point to the destination which are stored in the movement history storage unit; and a route comparing step of comparing, with the requested route stored in the movement history storage unit, the route outputted from each of the map information providing devices in response to the request issued in said route searching requesting step, and wherein said map information selecting/updating step comprises selecting update map information provided by the corresponding map information providing device which outputs a route nearest to the requested route stored in the movement history storage unit, based on the comparison result obtained in said route comparing step.

20. A computer-readable recording medium having recorded thereon a program for causing a computer to execute a map information updating method, the method comprising:

a map information storage step of storing map information in a map information storage unit;

a position detecting step of detecting a current position;

a movement history storage step of storing in a movement history storage unit, as movement histories, a series of positions detected in said position detecting step;

a map information selecting/updating step of selecting one of plural different types of update map information provided by plural map information providing devices based on the movement histories stored in the movement history storage unit, and obtaining the selected update map information from the corresponding map information providing device;

an update map information storage step of storing the update map information obtained in said map information selecting/updating step; and a combining/displaying step of combining the map information with the update map information, and displaying the combined map information so as to display a geographic area with the corresponding update map information from among the geographic areas each having the map information stored in the map information storage unit, wherein said map information selecting/updating step comprises selecting the update map information according to a ratio of an area displaying the map information to a whole display area, the map information being stored in the map information storage unit and the whole display area being displayed in said combining/displaying step.

* * * * *